(12) United States Patent
Petersen

(10) Patent No.: US 6,483,831 B1
(45) Date of Patent: Nov. 19, 2002

(54) ASYNCHRONOUS TRANSFER MODE SWITCH

(75) Inventor: Lars-Göran Petersen, Tumba (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/188,101

(22) Filed: Nov. 9, 1998

Related U.S. Application Data

(60) Provisional application No. 60/071,010, filed on Dec. 19, 1997, and provisional application No. 60/086,619, filed on May 22, 1998.

(51) Int. Cl.[7] ............ H04L 12/50; H04L 12/28; H04L 12/56; H04Q 11/00
(52) U.S. Cl. ............ 370/380; 370/381; 370/395.1
(58) Field of Search ............ 370/351, 389, 370/395–399, 392, 395.1, 360, 362–364, 370–371, 374, 380, 381, 383

(56) References Cited

U.S. PATENT DOCUMENTS

| | | | |
|---|---|---|---|
| 4,692,917 A | | 9/1987 | Fujioka |
| 4,973,956 A | | 11/1990 | Lin et al. |
| 5,038,343 A | | 8/1991 | Lebizay et al. |
| 5,079,762 A | | 1/1992 | Tanabe |
| 5,126,999 A | | 6/1992 | Munter et al. |
| 5,128,931 A | | 7/1992 | Yamanaka et al. |
| 5,140,582 A | | 8/1992 | Tsuboi et al. |
| 5,144,293 A | | 9/1992 | Rouse |
| 5,150,358 A | | 9/1992 | Punj et al. |
| 5,345,445 A | * | 9/1994 | Hiller et al. ......... 370/358 |
| 5,467,347 A | | 11/1995 | Petersen |
| 5,499,239 A | | 3/1996 | Munter |
| 5,539,733 A | * | 7/1996 | Anderson et al. ...... 370/362 |
| 5,570,362 A | | 10/1996 | Nishimura |
| 5,724,348 A | | 3/1998 | Basso et al. |
| 5,909,428 A | * | 6/1999 | Saito et al. ......... 370/244 |
| 5,946,309 A | | 8/1999 | Westberg et al. |
| 5,963,564 A | | 10/1999 | Petersen et al. |
| 6,330,237 B1 | * | 12/2001 | Suda et al. ......... 370/369 |

FOREIGN PATENT DOCUMENTS

| | | |
|---|---|---|
| EP | 0 405 042 A1 | 1/1991 |
| EP | 0 800 324 A2 | 10/1997 |
| WO | WO 95/30318 | 11/1995 |

OTHER PUBLICATIONS

US 5,361,257, 11/1994, Petersen (withdrawn).
Stephens et al, "Large–Scale ATM Switching Systems for B–ISDN", IEEE Journal, vol. 9, No. 8, Oct. 1991, pp. 1157–1160.

(List continued on next page.)

*Primary Examiner*—Kwang Bin Yao
*Assistant Examiner*—Kevin C. Harper
(74) *Attorney, Agent, or Firm*—Nixon & Vanderhye, P.C.

(57) ABSTRACT

An asynchronous transfer mode (ATM) switch (20) has plural switch ports (24) connected by respective bidirectional links (27, 28) to a switch core (22). Connected to each switch port is a corresponding row column unit (40), each row column unit managing the writing of service cells to one row of cross point units (32) and the reading of service cells from one column of cross point units. The bidirectional links between each switch port and its corresponding row column unit of the switch core carry both service cells and control cells. Cells of differing sizes are carried on the bidirectional links between the switch core and the switch ports. Service cells have a differing cell size than the control cells, and the cell size of the service cells need not necessarily be uniform. Differing types of control cells—link connection control (LCC) cells and link synchronization control (LSC) cells are provided. The link connection control cells (LCC) are used e.g., to read and write control data into and from control registers of the switch core. The link connection control cells (LCC) include cells of two formats—a bitmapped format (for reading/writing with respect to bitmapped control registers) and a "coded" format (used for input/output operations for some bitmapped as well as non-bitmapped registers).

26 Claims, 21 Drawing Sheets

OTHER PUBLICATIONS

Chao, "A Recursive Modular Terabit/Second ATM Switch", IEEE Journal, vol. 9, No. 8, Oct. 1991, pp. 1161–1172.

Tobagi et al, "Architecture, Performance, and Implementation of the Tandem Banyan Fast Packet Switch" IEEE Journal, vol. 9, No. 8, Oct. 1991, 1173–1193.

Urushidani, "Rerouting Network: A High–Performance Self-Routing Switch for B–ISDN", IEEE Journal, vol. 9, No. 8, Oct. 1991, pp. 1194–1204.

Yang et al., "A Reconfigurable ATM Switch Fabric for Fault Tolerance and Traffic Balancing", IEEE Journal, vol. 9, No. 8, Oct. 1991, pp. 1205–1217.

Itoh, "A Fault–Tolerant Switching Network for B–IDSN", IEEE Journal, vol. 9, No. 8, Oct. 1991, pp. 1218–1226.

Banwell et al., "Physical Design Issures for Very Large ATM Switching Systems", IEEE Journal, vol. 9, No. 8, Oct. 1991, pp. 1227–1238.

Kozaki et al, "32×32 Shared Buffer Type ATM Switch VLSI's for B–ISDN's", IEEE Journal, vol. 9, No. 8, Oct. 1991, pp. 1239–1247.

Shobatake et al, "A One–Chip Scalable 8 * 8 ATM Switch LSI Employing Shared Buffer Architecture", IEEE Journal, vol. 9, No. 8, Oct. 1991, pp. 1248–1254.

Banniza et al, "Design and Technology Aspects of VSLI's for ATM Switches", IEEE Journal, vol. 9, No. 8, Oct. 1991, pp. 1255–1264.

Katevenis et al, "Weighted Round–Robin Cell Multiplexing in a General–Purpose ATM Switch Chip", IEEE Journal, vol. 9, No. 8, Oct. 1991, pp. 1265–1279.

Itoh et al, "Practical Implementation and Packaging Technologies for a Large–Scale ATM Switching Systems", IEEE Journal, vol. 9, No. 8, Oct. 1991, pp. 1280–1288.

Giacopelli et al, "Sunshine: A High–Performance Self-Routing Broadband Packet Switch Architecture", IEEE Journal, vol. 9, No. 8, Oct. 1991, pp. 1289–1298.

Fischer et al, "A Scalable ATM Switching System Architecture", IEEE Journal, vol. 9, No. 8, Oct. 1991, pp. 1299–1307.

Matsunaga et al, "A 1.5 Gb/s 8X8 Cross–Connetct Switch Using a Time Reservation Algorithm" IEEE Journal, vol. 9, No. 8, Oct. 1991, pp.1308–1317.

Schroeder et al, "Autonet: A High–Speed, Self–Configuring Local Area Network Using Point–to–Point Links", IEEE Journal, vol. 9, No. 8, Oct. 1991, pp. 1318–1335.

Stavrakakis, "Efficient Modeling of Merging and Splitting Processes in Large Networking Structures", IEEE Journal, vol. 9, No. 8, Oct. 1991, pp. 1336–1347.

Cisneros et al, "A Large ATM Switch Based on Memory Switches and Optical Star Couplers", IEEE Journal, vol. 9, No. 8, Oct. 1991, pp. 1348–1360.

DOI et al, "A High–Speed ATM Switch Architectre for FTTH–An ATM Switch Architecture with Input and Cross–Point Bffers", ISS '95, World Telecommunications Congress (International Switching Symposium), Advanced Switching Technologies for Universal Telecommunications at the Beginning of the $21^{st}$ Century, Berlin Apr. 23–28, 1995, vol. 1, No. SYMP 15, Apr. 23, 1995, pp. 384–388.

Weller et al., "Scheduling Nonuniform Traffic in a Packet Switching System with Small Propagation Delay", Proceedings of the Conference on Computer Communications (INFOCOM), Toronto, Jun. 12–16, 1994, vol. 3, Jun. 12, 1994, pp. 1344–1351.

* cited by examiner

|        | Bit 7 | | | | | | Bit 0 | |
|--------|---|---|---|---|---|---|---|---|
| byte 0 | PRI=25,26,28,30 5 bits | | | | | | CBQ 2 bits | FBP 1 bit |
| byte 1 | NU | NU | RE | RE | RE | RE | BCD 15 | SBP 1 bit |
| byte 2 | BCD 14 | | | | | | BCD 7 | BCD 7 |
| byte 3 | BCD 6 | | | | | | BCD 0 | LWP 1 bit |

RE=Reserved bits
NU=Not Used bits

LCC cell bitmap format

FIG. 4B(1)

|        | Bit 7 | | Bit 0 | |
|--------|---|---|---|---|
| byte 0 | PRI=31 5 bits | NU 1 bit | LSI=0 1 bit | FBP |
| byte 1 | Address 5 bits | Write 1 bit | Read 1 bit | SBP |
| byte 2 | Data 8 bits | | | |
| byte 3 | unused=0 3 bits | CBQ 2 bits | RPC 2 bits | LWP |

LCC-cell coded format operation field

FIG. 4B(2)

|        | Bit 7 | | | | | | Bit 0 | |
|--------|---|---|---|---|---|---|---|---|
| byte 0 | 1 | 1 | 1 | 1 | 1 | 1 | 1 | 0 |
| byte 1 | 0 | 0 | 0 | 1 | 1 | 1 | SSC | SSC |
| byte 2 | 0 | 0 | 0 | 0 | 0 | 0 | 0 | 0 |
| byte 3 | 0 | 1 | 1 | 1 | 1 | 1 | 1 | 1 |

LSC-cell format

FIG. 4B(3)

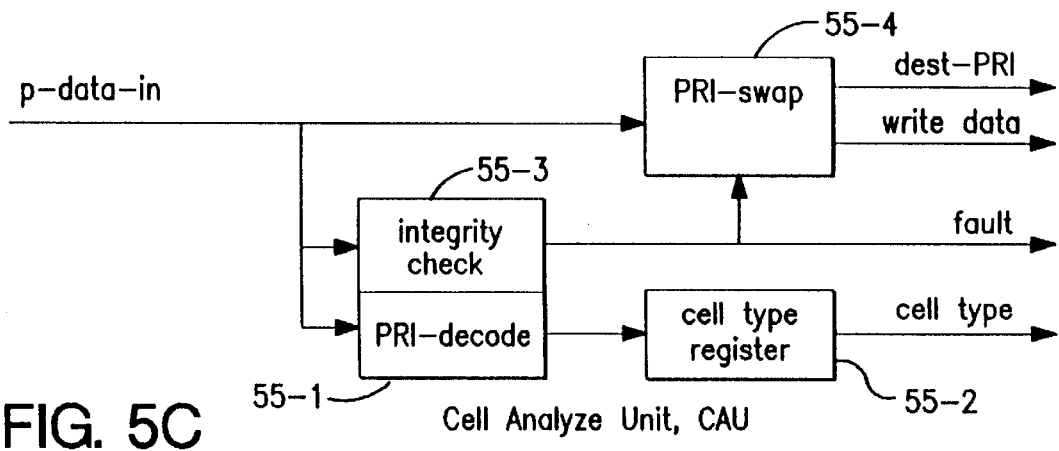
FIG. 5C  Cell Analyze Unit, CAU
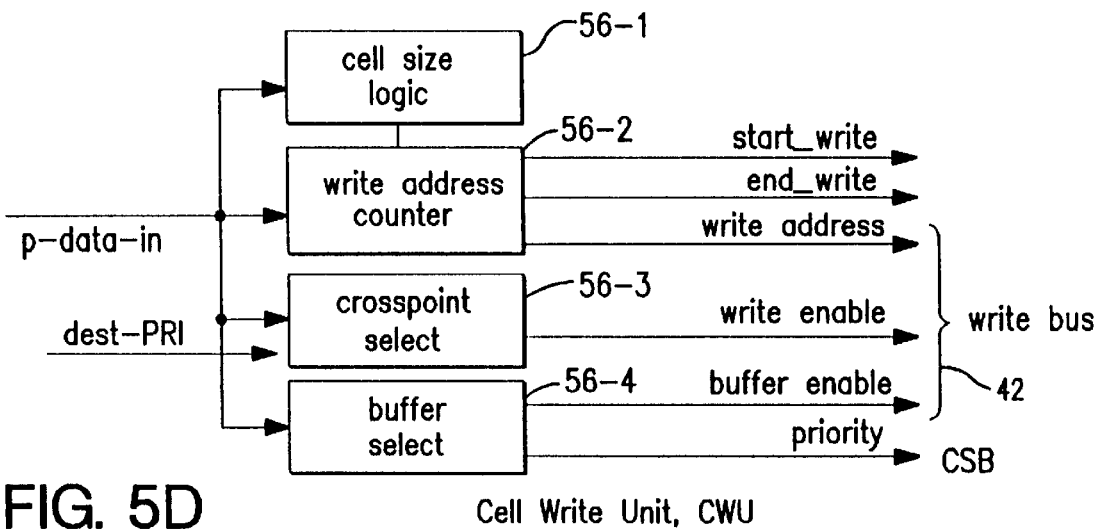
FIG. 5D  Cell Write Unit, CWU
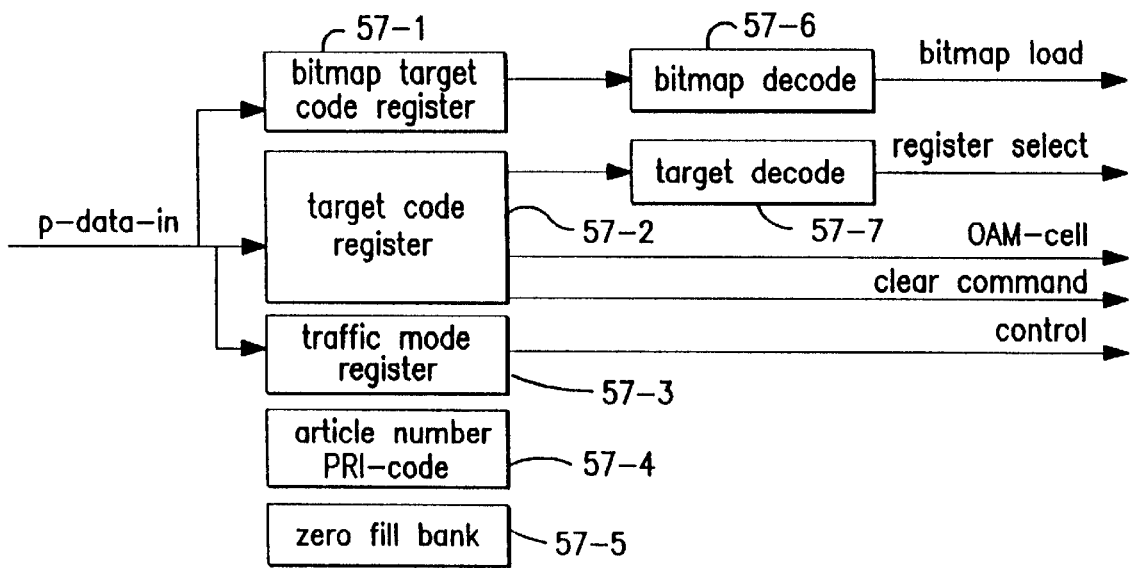
FIG. 5E  Operation & Maintenance Unit, OMU

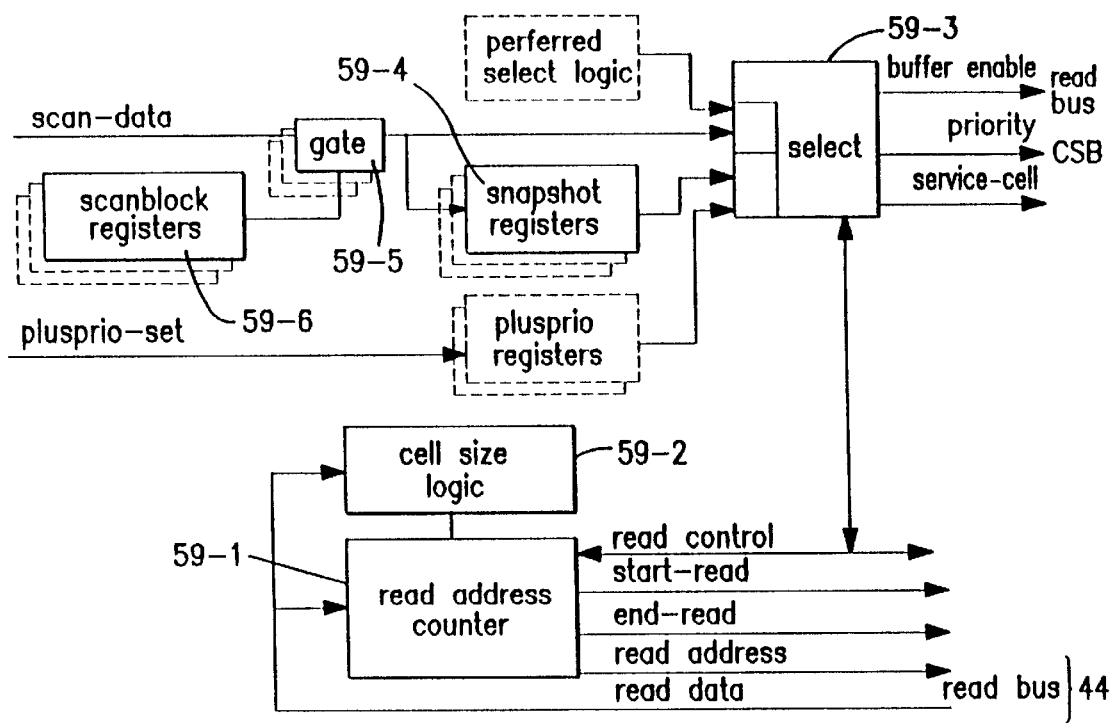
FIG. 5F  Cell Read Unit, CRU
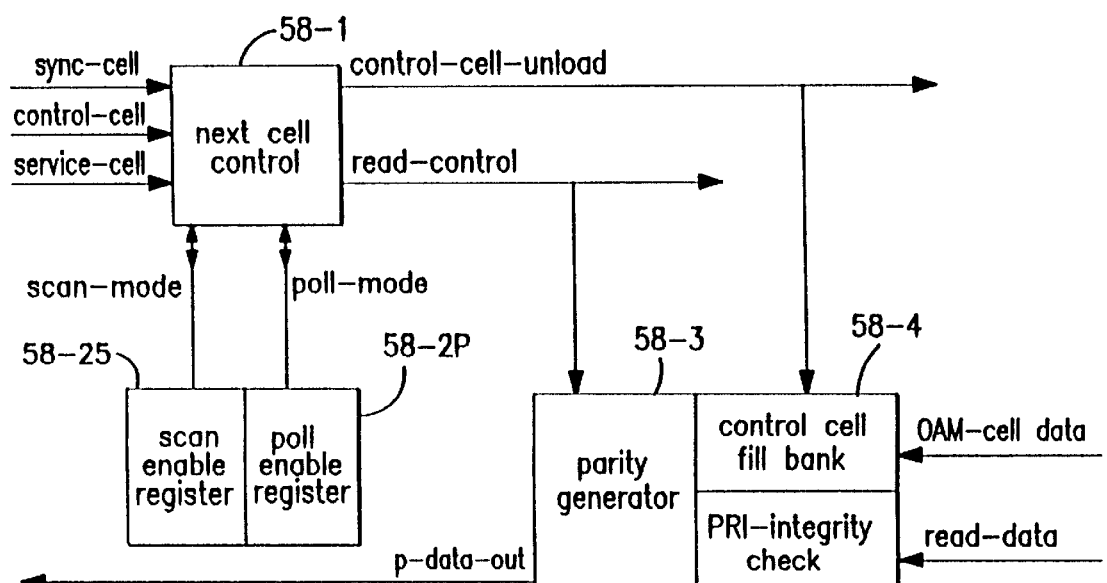
FIG. 5G  Cell Generator Unit

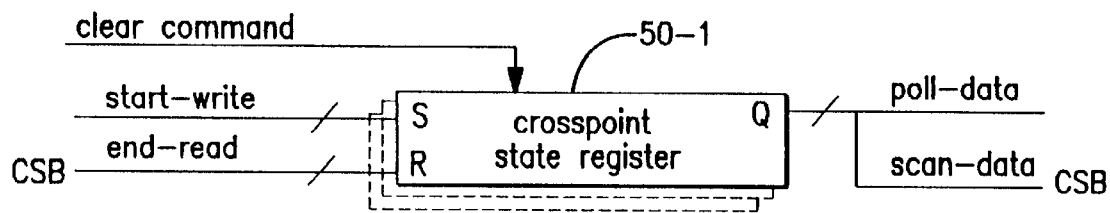
FIG. 5H(1) Simple crosspoint status function implementation
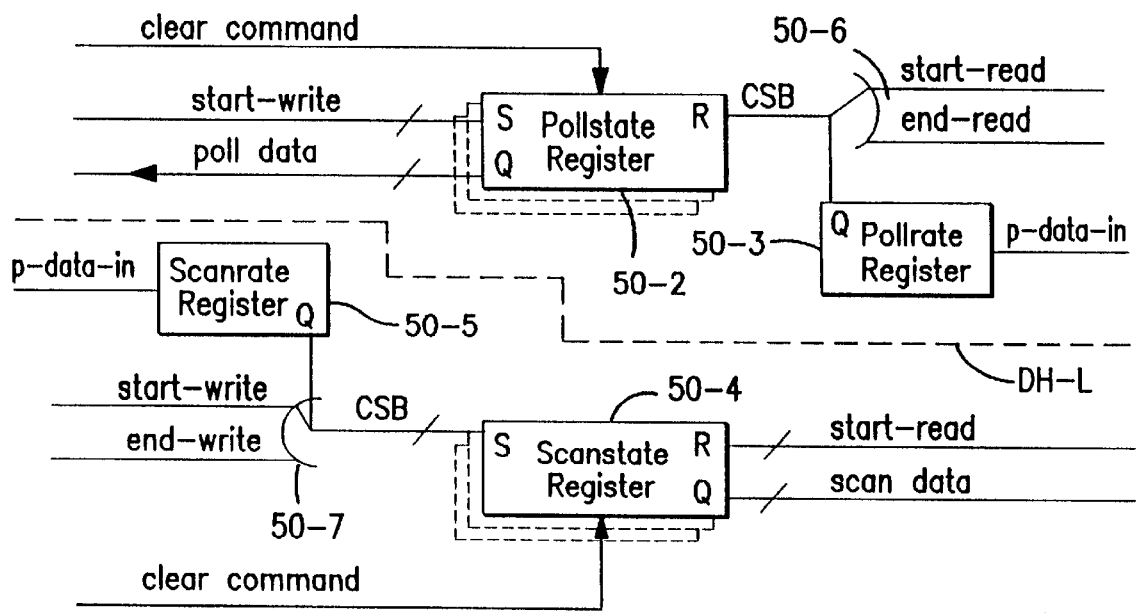
FIG. 5H(2)
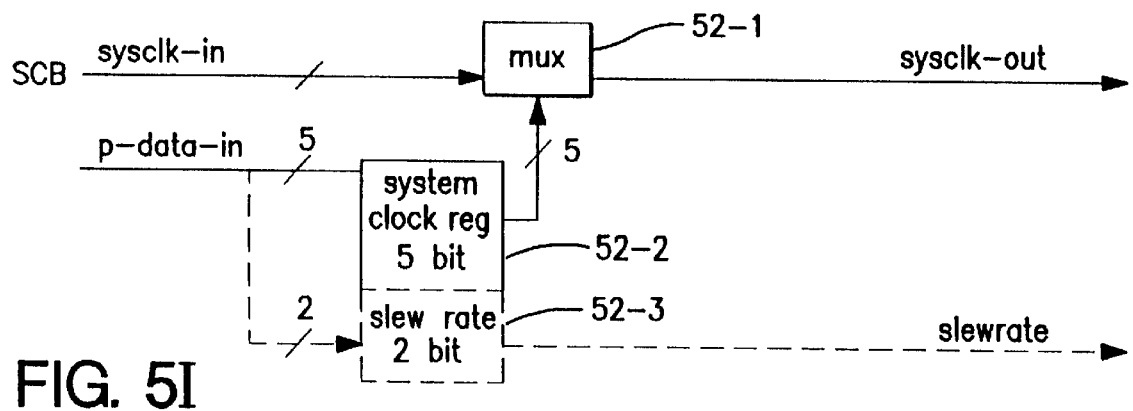
FIG. 5I

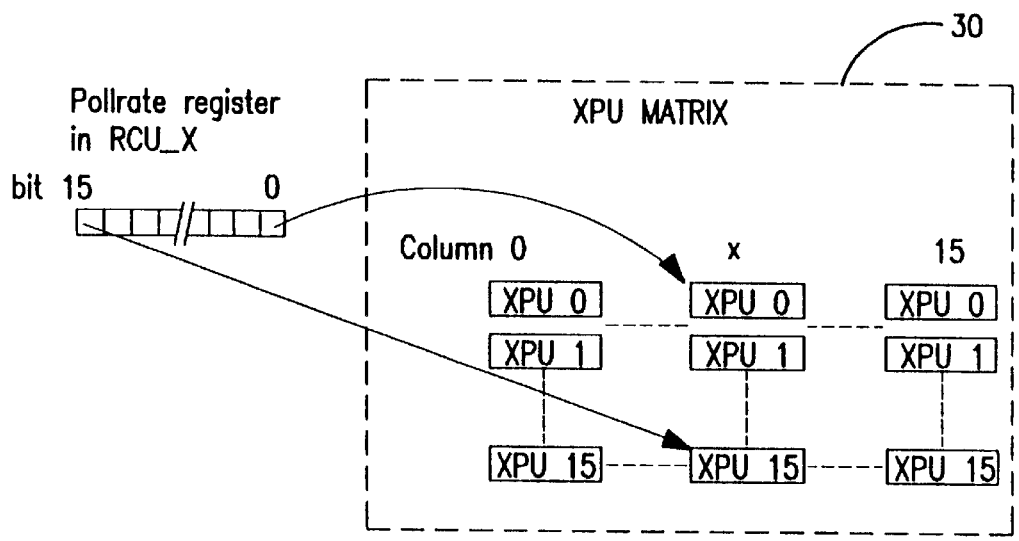
FIG. 11 Pollrate register bits and XPU association
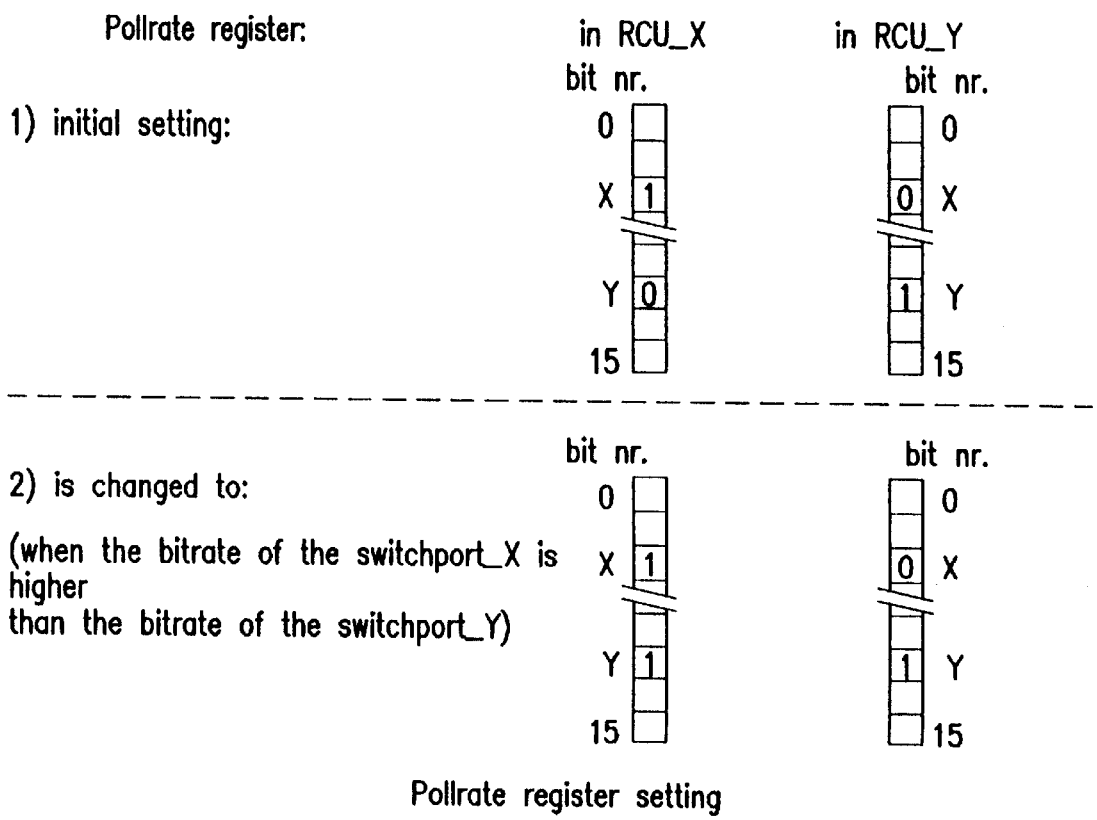
FIG. 12

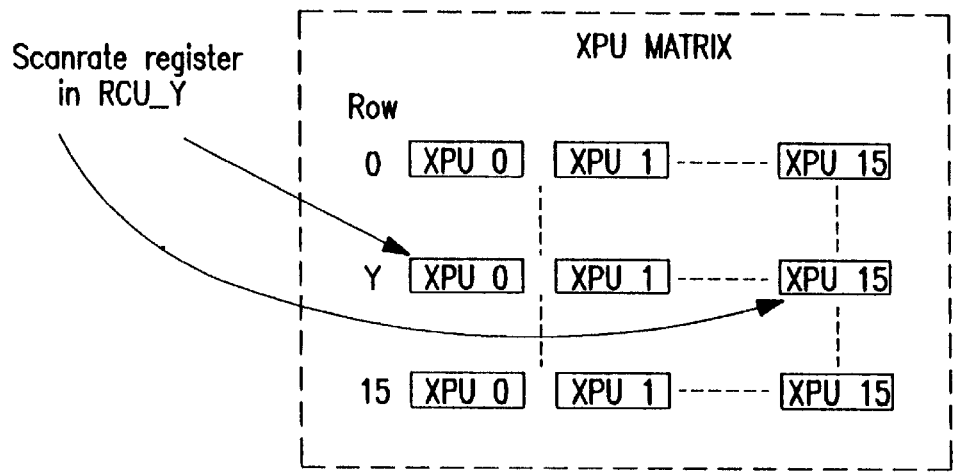
FIG. 13   Scanrate register bits and XPU association
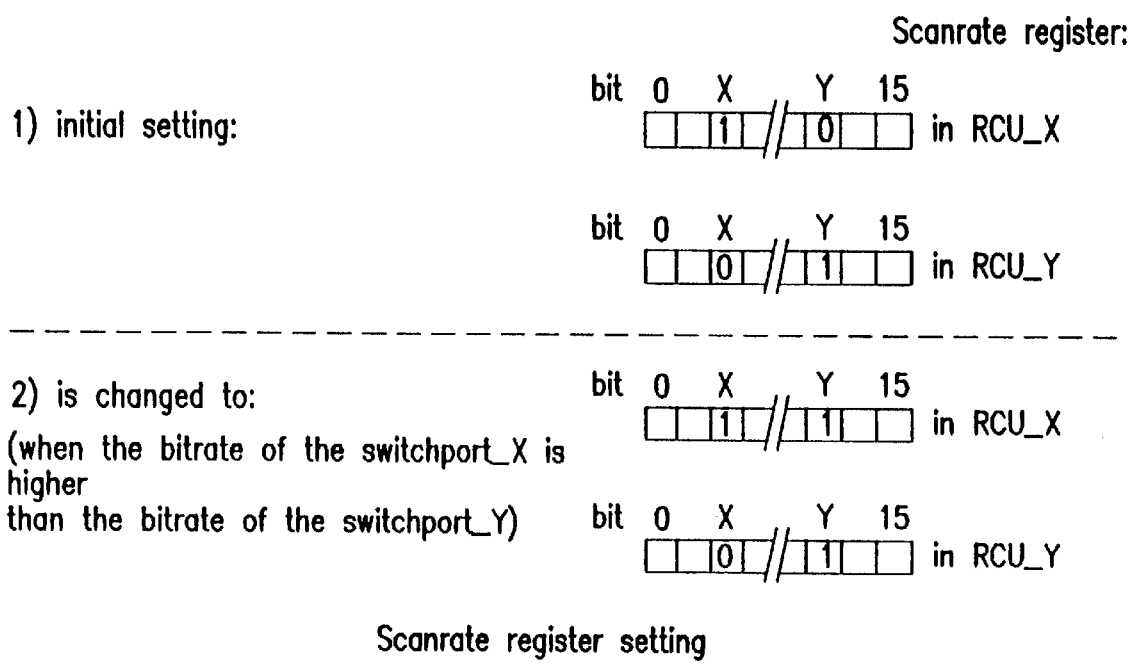
FIG. 14

ASYNCHRONOUS TRANSFER MODE SWITCH

This application claims the benefit and priority of U.S. Provisional Patent Application No. 60/071,010 Dec. 19, 1997 and U.S. Provisional Patent Application No. 60/086,619 filed May 22, 1998, both of which are incorporated herein by reference.

BACKGROUND

1. Field of the Invention

This invention pertains to switches, such as telecommunications switches, through which ATM cells are routed.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and traditionally have a fixed size. A traditional ATM cell comprises 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual is a principal path defined between two switching nodes of the network; the virtual channel is one specific connection on the respective principal path.

At its termination points, an ATM network is connected to terminal equipment, e.g., ATM network users. Typically between ATM network termination points there are plural switching nodes, the switching nodes having ports which are connected together by physical transmission paths or links. Thus, in traveling from an originating terminal equipment to a destination terminal equipment, ATM cells forming a message may travel through several switching nodes.

A switching node has a plurality of ports, each of which can be connected by via a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for plural connections, a connection being e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from an ingress side of the switch to an egress side of the switch, and ultimately from the originating terminal equipment to the destination terminal equipment.

U.S. Pat. No. 5,467,347 to Petersen discloses an ATM switch in which various types of ATM cells, all of essentially uniform length, are transmitted between a switch core and ports of the switch. The types of cells include traffic cells, operation and maintenance cells, and idle cells. Although all types of cells have essentially the same length, not all cells are necessarily full, thus causing some loss in transmission efficiency. The traffic cells are fed from originating switch ports to buffers at cross points of the switch matrix, and then are unloaded from the buffers to destination or target switch ports. The traffic cells sent from the originating switch ports to the switch have a relay address field in which each bit corresponds to a target switch port. Traffic cells unloaded from the switch core and sent to the target switch ports each have a relay poll field which indicate which target switch ports are occupied and which are free. Thus, each traffic cell is encumbered with information reflecting status of switch ports.

What is needed, therefore, and an object of the present invention, is an efficient ATM switching system which judiciously formats and utilizes ATM cells of differing types.

SUMMARY

An asynchronous transfer mode (ATM) switch has plural switch ports connected by respective bidirectional links to a switch core. The switch core includes a memory array unit which comprises two buffer matrices of cross point units. Connected to each switch port is a corresponding row column unit, each row column unit managing the writing of service cells to one row of cross point units and the reading of service cells from one column of cross point units.

The bidirectional links between each switch port and its corresponding row column unit of the switch core carry both service cells and control cells. The service cells, also known as traffic cells or information cells, obtained at an incoming or originating switch port, are routed through the switch core to an outgoing or destination switch port. The control cells do not contain switched information, but instead are dedicated for carrying information used for management and operation of the switching system.

The ATM switching system of the present invention allows cells of differing sizes to be carried on the bidirectional links between its switch core and its switch ports. For example, the service cells have a differing cell size than the control cells, and the cell size of the service cells need not necessarily be uniform.

Service cells can be of differing cell size such that two successive service cells need not have the same length or same size of payload. The service cells transmitted on the bidirectional length include a cell size field, the cell size field indicating the cell size of the each service cell in which it is included. In an example embodiment, service cells can be of any of the following cell sizes (in bytes): 8, 16, 24, 32, 40, 48, and 56.

By contrast, control cells utilized in the exemplary embodiment each are four bytes in length. Differing types of control cells (e.g., LCC-cells and LSC-cells) are provided, with each control cell type having a differing format. The LCC control cells are known as link connection control cells; the LSC control cells are known as link synchronization control cells.

Both the switch port and its corresponding row column unit in the switch core have synchronization state machines which exchange LSC control cells. The LSC control cells include information for synchronizing operation of the two state machines. In particular, the LSC control cells have a format which includes a field indicative of one of a plurality of synchronization states of the machine which generated the LSC control cell. By employing short, synchronization-dedicated LSC control cells in a pre-established protocol, synchronization of switch port and switch core are economically and quickly achieved and maintained.

Each row column unit includes a set of control registers as part of its cross point status unit. The set of control registers is distinct from the buffers of the cross point unit through which service cells are switched. Each switch port can control, at least in part, its associated row column unit of the switch core by writing and reading non-service information, e.g., control information, to and from the set of control registers.

Some of the control registers are known as "bitmapped" registers since each bit of such control register is associated to one of the plural switch ports connected to the switch core. Among the bitmapped control registers are the pollstate_status registers and the pollstate_release registers. A given row column unit has the bits of its pollstate_status register set to indicate whether cross point buffers in its same row of the core matrix are "occupied" or "free". The pollstate_release register of the row column unit has bits set to indicate whether the buffers in the row managed thereby have transitioned from "occupied" to "free" or whether the buffers have not transitioned.

Various ones of the control registers are employed, e.g., to establish various operating parameters of the switching system. Such parameters can include, for example, certain sequences of operation (e.g., poll enable, scan enable), certain timing information (e.g., pollrate, scanrate), and certain override information (e.g., scanblock).

The link connection control cells (LCC) include cells of two formats—a bitmapped format (for the bitmapped registers) and a "coded" format (used for input/output operations for some bitmapped as well as non-bitmapped registers). "Coded" LCC cells include both an address of the particular control register to which/from which data is to be written, as well as the non-service data that is to be stored/obtained from that particular control register.

Although of differing cell sizes, the service cells and the control cells have a commonly formatted field, known as the physical route identifier (PRI). A cell is recognized as being a service cell when any of a first set of pre-established values are stored in the PRI field. In the example embodiment, a cell is recognized as being a service cell when the value of the PRI field corresponds to a value indicative of one of the plural switch ports. At least some of the control cells are recognizable, on the other hand, because the value in its PRI field corresponds to an identity or numbering of the control register which is affected by the control cell (e.g., the control register which is written to or read from using the control cell).

Each switch port of the switch must be apprised at various junctures of the status of the various cross point units of the switch core, i.e., whether those various cross point units are "occupied" or "free". Particularly the cross point units involved for each switch port are those to which it sends service cells (e.g., those in a same row as the port) and the cross point units from which it retrieves cells (e.g., those in a column managed by the port). To this end, bitmapped pollstate registers which are utilized for preparing corresponding pollstate control cells are employed. The pollstate_status register has its bitmap updated to reflect occupied/free transitions of cross point units to which service cells are sent by the switch port. When a first row column unit sends a cell to a particular cross point unit (XPU), the row column unit not only sets an appropriate bit in its pollstate_status register, but also causes a bit to be set in a scanstate register of another row column unit which handles readout of cells from that particular cross point unit (XPU). As soon as the row column unit which handles readout detects is permitted to readout the cell, it resets its scanstate register as well as the pollstate_status register of the first row column unit. The resetting of the pollstate_status register of the first row column unit causes the setting of a bit of a pollstate_release register of the first row column unit to indicate a transition from an "occupied" to a "free" status. The change in status in the pollstate_release register of the first row column unit causes issuance of a pollstate_release cell from the first row column unit toward the switch port.

Whereas, in the prior art, pollstate information is sent regularly to the switch port or is automatically included in service cells, the present invention employs a particular scenario for generation of pollstate cells essentially dedicated to transmission of the pollstate information. Specifically, in the present invention, the pollstate information is transmitted in pollstate control cells, the pollstate control cells being generated and transmitted either (1) in response to a particular control cell evocative of the pollstate information, or (2) upon a change of absence/presence (e.g., free/occupied status) of a cross point unit.

For example, when an originating switch port desires to know the status of the cross point units to which it can send cells into the switch core, the originating switch port transmits a pollstate status retrieve control cell to the switch core. In response to the pollstate status retrieve control cell, at an appropriate juncture the switch core prepares and sends the pollstate status control cell to the requesting (originating) switch port. When a service cell is unloaded from a cross point unit, a pollstate release control cell is prepared and transmitted to the switchport, advising of vacancy of the unloaded cross point unit. Using the pollstate information supplied by both the pollstate status control cells and the pollstate release control cells, a switch port can determine which cross point units in the switch core are available for receiving further service cells.

Others of the control cells are employed in order to establish various operating parameters of the switch. These operating parameters are established with respect to each switch port as the switch port transmits the control cells to the associated row column unit. Such control cells typically have contained therein a parameter or data which is stored in the corresponding control register and consulted by the switch core in connection with sequencing or other operation of the switch core. For example, a poll enable control cell (LCC) is employed for storing in a poll enable register a value indicative of which of a plurality of selectable polling modes the associated row column unit is to operate. Various of these polling modes require a predetermined minimum frequency of transmission of service cells relative to the number of pollstate cells transmitted on a link.

Thus, the ATM switch of the present invention implements an interactive exchange of control cells in order to sequence operation of the switch core. The operations particularly dependent upon control cell generation include transmission of service cells from the switch core; transmission of pollstate cells from the switch core; retrieval of contents of certain control registers maintained by the switch core; and synchronization procedures.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4B(1) is a diagrammatic view illustrating the format of a bitmapped-formatted link connection control (LCC) cell.

FIG. 4B(2) is a diagrammatic view illustrating the format of a coded link connection control (LCC) cell.

FIG. 4B(3) is a diagrammatic view illustrating the format of a Link State Control (LSC) cell.

FIG. 5C is a schematic view of a cell analyzer unit (CAU) included in the ATM switching system of FIG. 1.

FIG. 5D is a schematic view of a cell write unit (CWU) included in the ATM switching system of FIG. 1.

FIG. 5E is a schematic view of a operation & maintenance unit (OMU) included in the ATM switching system of FIG. 1.

FIG. 5F is a schematic view of a cell read unit (CRU) included in the ATM switching system of FIG. 1.

FIG. 5G is a schematic view of a cell generator unit (CGU) included in the ATM switching system of FIG. 1.

FIG. 5H(1) and FIG. 5H(2) are schematic views of differing implementations a cross point status unit of the ATM switching system of FIG. 1.

FIG. 5I is a schematic view of a system clock unit (SCU) included in the ATM switching system of FIG. 1.

FIG. 11 is a diagrammatic view showing an association between bits in a pollrate register and cross point units.

FIG. 12 is a diagrammatic view showing a scenario of pollrate register setting.

FIG. 13 is a diagrammatic view showing an association between bits in a scanrate register and cross point units.

FIG. 14 is a diagrammatic view showing a scenario of scanrate register setting.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

1.0 Overview

Figure 1:
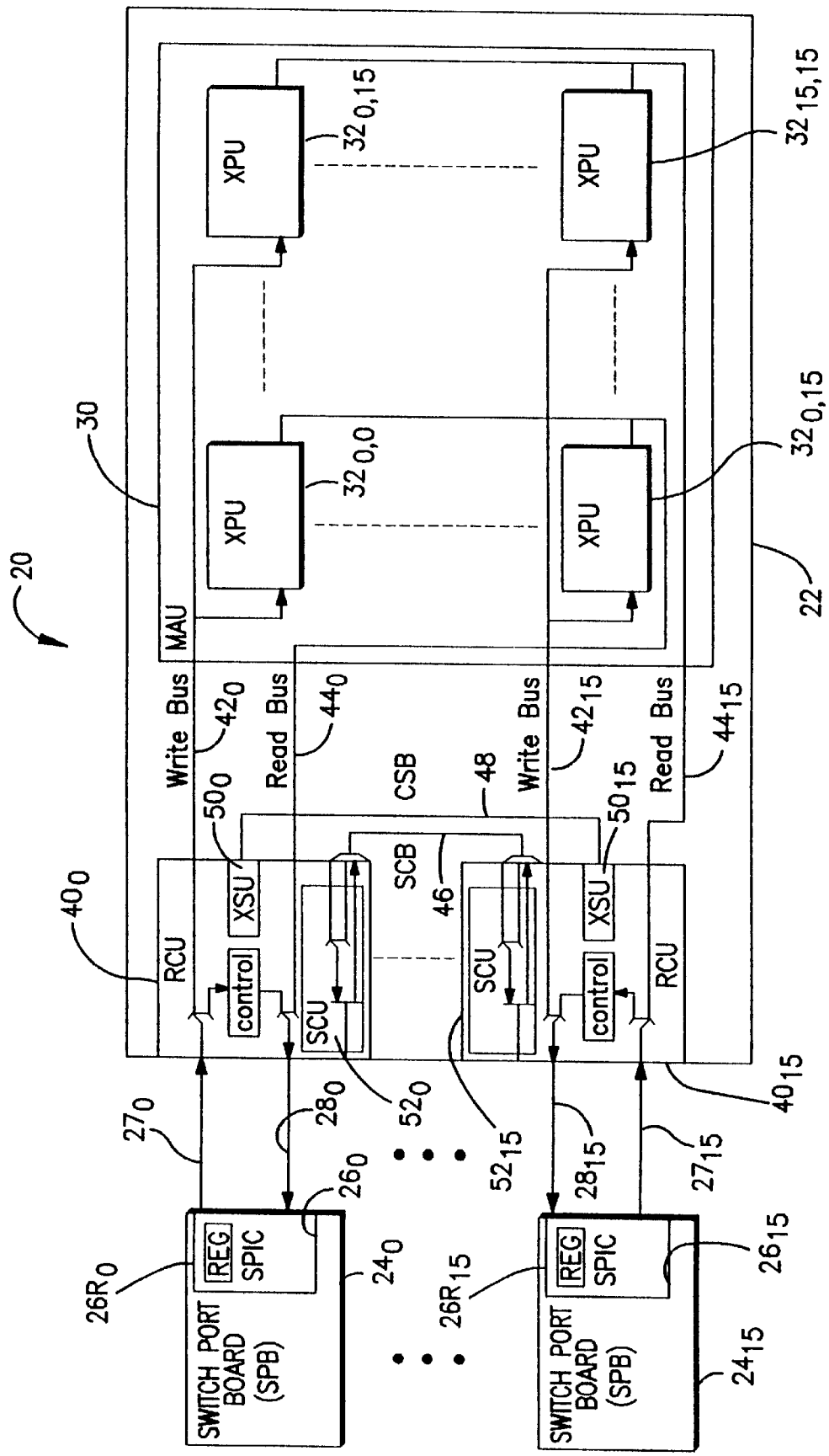
FIG. 1 is a schematic view of an ATM switching system according to an embodiment of the invention.

FIG. 1 shows an ATM switching system 20 which includes switch core or fabric 22, as well as elements residing on a plurality of switch port boards (SPBs) 24. In the example of the illustrated embodiment, sixteen switch port boards (SPBs) $24_0$–$24_{15}$ are connectable to switch core 22. Elements on each switch port board 24 which comprise switching system 20 are, in the illustrated embodiment, known as the "switchport" and are implemented in a switch port integrated circuit (SPIC) 26, SPICs $26_0$–$26_{15}$ being shown in FIG. 1.

As explained hereinafter, switch port boards (SPBs) 24 can each have a plurality of devices other than a SPIC mounted thereon, for which reason switch port boards (SPBs) 24 are also referred to as "device boards". One or more of these devices may be connected to telecommunications transmission lines for the receiving of one or more types of communications signals such as telephony, data, video, etc. Alternatively, devices on a switch port board (SPB) may generate control signals or the like which are useful for configuring or controlling other devices, e.g., other devices on another switch port board (SPB).

One purpose of switching system 20 is to route ATM cells, containing such communication signals or control signals, through switch core 22. In this regard, if not already in ATM cells, the incoming signals received at or the signals generated by the device(s) situated on one of the switch port boards (SPBs) 24 are mapped into ATM cells. The cells are applied to switch core 22, and are routed through switch core 22 so that the cells emerge from switch core 22 for application to another switch port board (SPB) 24. For example, voice signals from a calling party in a telephone conversation to a called party may be received at switch port board (SPB) 24(which, for sake of the example, is ultimately connected to the calling party), routed through switch core 22, and applied to switch port board (SPB) $24_{15}$ for transmission to the called party (who, in the present example, is connected ultimately to switch port board (SPB) $24_{15}$).

Thus, ATM cells are transported between each switch port board (SPB) 24 and switch core 22. In the example of FIG. 1, cell transfer occurs over two links connecting each switch port board (SPB) 24 and switch core 22. Cells sent from a switch port board (SPB) 24 toward switch core 22 are transmitted on a port-to-core link 27, while cells emanating from core 22 toward a switch port board (SPB) 24 are applied on a core-to-port link 28. The sixteen port-to-core link 27 and sixteen core-to-port link 28 are subscripted in accordance with the particular switch port board served thereby. A port-to-core link 27 and its corresponding core-to-port link 28 collectively constitute a "bidirectional link".

Switch core or fabric 22 includes a memory array unit (MAU) 30 and a plurality of row column units (RCUs) 40. Memory array unit (MAU) 30 comprises cross point units (XPUs) 32 conceptualized as arranged in an array of rows and columns. Each of the plurality of cross point units (XPUs) 32 is designated with a subscript indicative of location/addressing, with XPU $32_{0,0}$ being in row 0, column 0; XPU $32_{0,1}$ being in row 0 column 1; XPU $32_{0,1}$ being in row 0 column 1; and so forth up to XPU $32_{15,15}$ which is in row 15, column 15.

A row column unit (RCU) 40 is provided in correspondence for each switch port board (SPB) 24, i.e. for each row of memory array unit (MAU) 30. Since sixteen such switch port boards are illustrated in the example of FIG. 1, sixteen row column units (RCUs) $40_0$–$40_{15}$ are also shown. Each row column unit (RCU) 40 is connected by a write bus to input terminals of all cross point units (XPUs) 32 in the same row, and by a read bus 44 to output terminals of all cross point units (XPUs) 32 in a given column. For example, RCU $40_0$ is connected by write bus $42_0$ to input terminals of cross point units (XPUs) $32_{0,0}$ through $32_{0,15}$ and by read bus $44_0$ to output terminals of cross point units (XPUs) $32_{0,0}$ through $32_{15,0}$. Similarly, RCU $40_{15}$ is connected by write bus $42_0$ to input terminals of cross point units (XPUs) $32_{15,0}$ through $32_{15,15}$, and by read bus $44_{15}$ to output terminals of cross point units (XPUs) $32_{0,15}$ through $32_{15,15}$. In addition to write buses 42 and read buses 44, row column units (RCUs) 40 are also connected by a system clock bus (SCB) 46 and a cross point status bus (CSB) 48.

Figure 2:
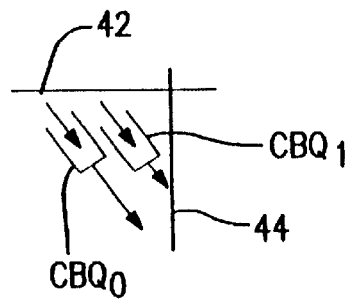
FIG. 2 is a diagrammatic view of portions of a cross point unit (XPU) included in a switch core of the ATM switching system of FIG. 1.

As shown in FIG. 2, each cross point unit (XPU) 32 actually comprises two buffers at a cross point. One of these buffers is referenced as buffer_0 or buffer $CBQ_0$; the other of these buffers is known as buffer_1 or buffer $CBQ_1$. Each of these two buffers at each cross point unit (XPU) 32 is fifty six bytes long. At each cross point unit (XPU) 32 the buffers $CBQ_0$ and $CBQ_1$ are connected in parallel with one another.

Each buffer $CBQ_0$ and $CBQ_1$ has an input gate employed for admission of a cell received on the corresponding write bus 42 and an output gate employed for discharging a cell onto a corresponding read bus 44. At some junctures herein, the buffers $CBQ_0$ of all cross point units (XPUs) 32 in memory array unit (MAU) 30 are collectively referred to as "matrix 0", while the buffers $CBQ_1$ of all cross point units (XPUs) 32 in memory array unit (MAU) 30 are collectively referred to as "matrix 1".

1.1 Control Registers

Each row column unit (RCU) 40 has a cross point status unit (XSU) 50. Cross point status unit (XSU) 50 comprises a plurality of control registers, including three particular registers which contain status information and core operation information. These control registers are distinct from buffers of switch core 22, e.g., buffers $CBQ_0$ and $CBQ_1$, through which user data is switched in payloads of service cells (as hereinafter described). The three control registers involved in loading and unloading of the switch core 22 include both pollstate registers and scanstate registers. The pollstate registers include both pollstate_status registers and pollstate_release registers. The pollstate_status registers are updated to have stored therein indications of whether buffers in the cross point units (XPUs) 32 on the row managed by the row column unit (RCU) 40 are "free" or "occupied". The pollstate_release registers are updated to indicate whether the buffers in the cross point units (XPUs) 32 on the column managed by the row column unit (RCU) 40 and read by read bus 44 have transitioned from "occupied" to "free" or remain unchanged. Thus, the pollstate_status registers and pollstate_release registers are collectively referred to as "pollstate registers". Pollstate registers are updated using cross point status bus (CSB) 48 in the manner hereinafter described.

Figure 6:
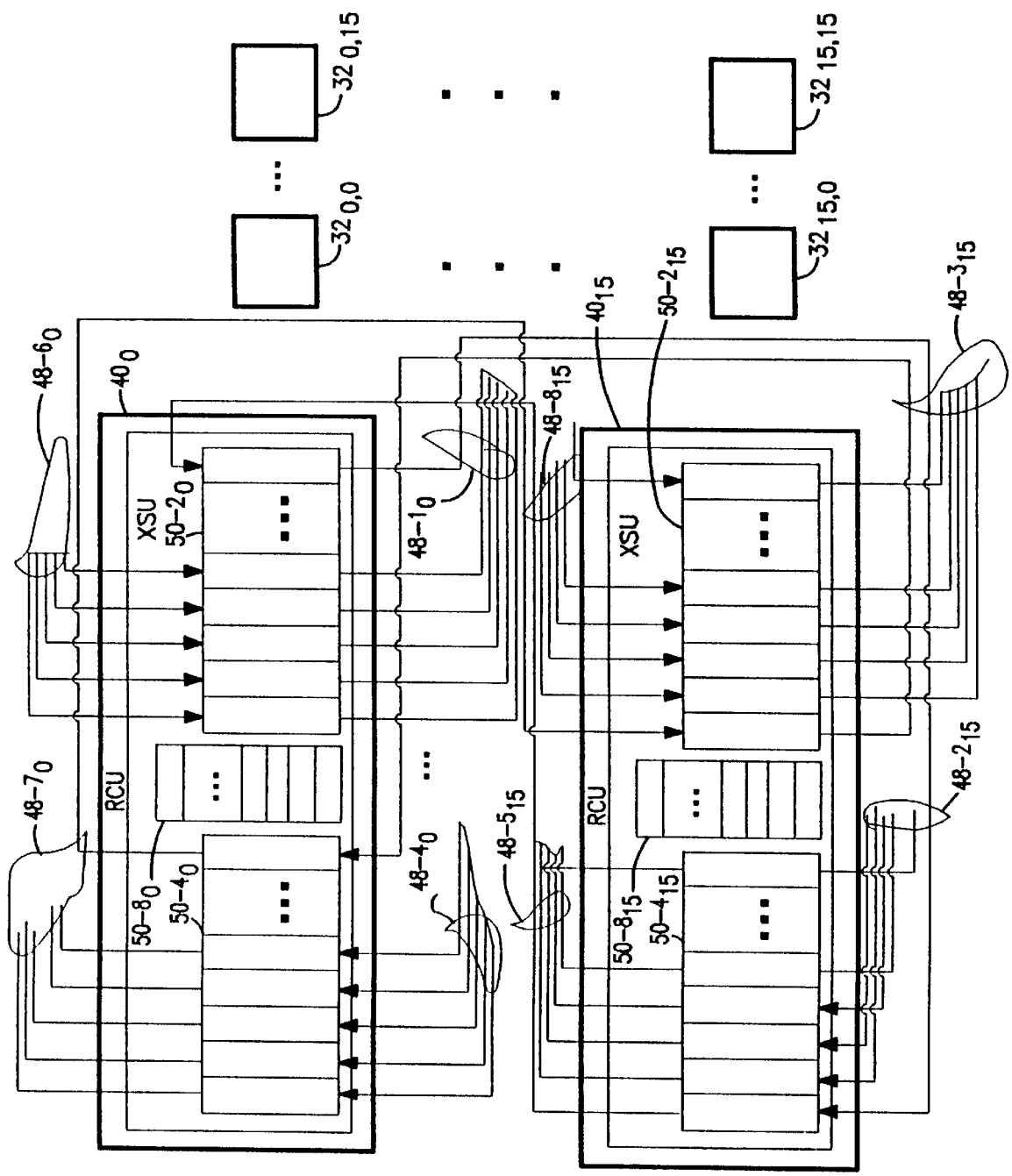
FIG. 6 is a schematic view showing connection of portions of a CSB bus to elements of row column units (RCUs) of FIG. 1.

FIG. 6 shows portions of cross point status bus (CSB) 48 and some of the connections thereof to two representative row column units (RCUs) 40, particularly to RCU $40_0$ and RCU $40_{15}$. Although a more detailed discussion of the row column units (RCUs) 40 is below provided in section 3.0, FIG. 6 shows the cross point status unit (XSU) 50 of each row column unit (RCU) 40 as comprising the three control registers here of interest. The three such control registers include the pollstate_status registers 50-2; the scanstate register 50-4; and the pollstate_release register 50-8. As shown in FIG. 6, each of these control registers has sixteen bits corresponding to the sixteen cross point unit (XPU) 32 controlled by the row column unit (RCU) 40 in which these control registers reside, i.e., the sixteen cross point unit (XPU) 32 aligned in a row with the row column unit (RCU) 40.

1.2 The CSB Bus

With respect to each row column unit (RCU) 40, cross point status bus (CSB) 48 has leads for outputting the status of the bits of the pollstate_status register 50-2. For example, in FIG. 6 reference numeral 48-10 depicts leads of cross point status bus (CSB) 48 which output the status of bits of pollstate_status register 50-20. For example, the status of the last bit in pollstate_status register 50-20 is communicated to the first bit of scanstate register 50-4$_{15}$, since row column unit (RCU) $40_{15}$ controls readout of the cross point unit (XPU) 32 in the last column of memory array unit (MAU) 30. In this respect, reference numeral 48-2$_{15}$ shows leads in cross point status bus (CSB) 48 from the pollstate_status register 50-2 of the differing sixteen row column units (RCUs) 40 for setting the respective sixteen bits of scanstate register 50-4$_{15}$. Similarly, the leads indicated by reference numeral 48-3$_{15}$ are employed to communicate the setting of bits in pollstate_status register 50-2$_{15}$ to the various other scanstate register 50-4. The leads indicated by reference numeral 48-4$_0$ are used to communicate setting of corresponding bits in the pollstate_status register 50-2 of other row column units (RCUs) 40 to the scanstate register 50-4$_0$ of row column unit (RCU) 40$_0$.

The cross point status bus (CSB) 48 also has leads for resetting bits in the pollstate_status register 50-2 when cells are read out of cross point unit (XPU) 32. For example, when a cell is read out of cross point unit (XPU) 32$_{0,15}$, one of the leads in the group indicated by reference numeral 48-5$_{15}$ connects to the first bit of scanstate register 50-4$_{15}$ to carry a reset signal to the last bit of pollstate_status register 50-2$_0$.

Reset signals incoming to pollstate_status register $50\text{-}2_0$ are carried on the leads depicted by reference numeral $48\text{-}6_0$. Similarly, reading out of cells from the cross point units (XPUs) 32 of the first row cause reset signals to be sent from scanstate register $50\text{-}4_0$ on the leads depicted by reference numeral $48\text{-}7_0$. Reference numeral $48\text{-}8_{15}$ shows leads for resetting the bits in pollstate_status register $50\text{-}2_{15}$ of row column unit (RCU) $40_{15}$.

It will subsequently be appreciated that two sets of control registers (e.g., pollstate_status register 50-2; scanstate register 50-4; and pollstate_release register 50-8) are provided for each row column unit (RCU) 40. One set of the control registers is for the buffers $CBQ_0$ in matrix 0; the other set of the control registers is for the buffers $CBQ_1$ in matrix 1. In order to specify for which set of control registers a bit setting or bit resetting signal is being sent on cross point status bus (CSB) 48, the cross point status bus (CSB) 48 also includes a matrix indication lead for each row column unit (RCU) 40. Therefore, cross point status bus (CSB) 48 includes sixteen matrix indication leads as well as the bit setting and bit resetting leads illustrated in FIG. 6 and discussed above.

2.0 Cell Types

Figure 3:
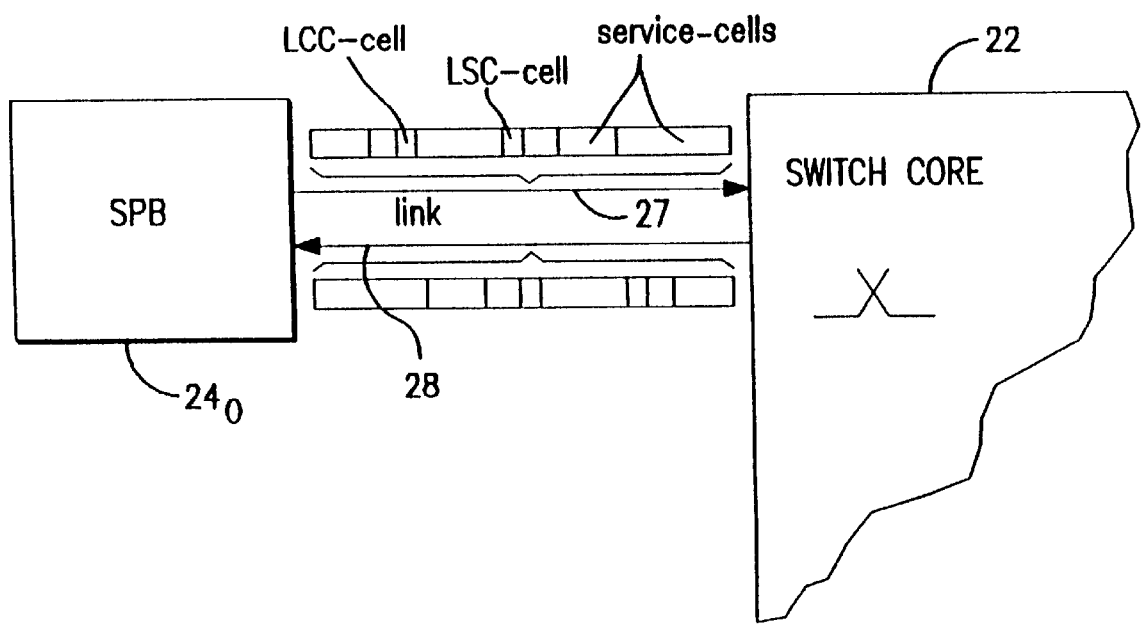
FIG. 3 is a diagrammatic view illustrating cell flow between a switch core and a switch port board (SPB) of the ATM switching system of FIG. 1.

As mentioned above, ATM cells are transmitted between the various switch port boards (SPBs) 24 and switch core 22. ATM switching system 20 of the present invention utilizes differing length cells. FIG. 3 shows cell transfer between a representative one of the switch port boards and switch core 22, particularly switch port board (SPB) $24_0$ connected by port-to-core link $27_0$ and core-to-port link $28_0$ to switch core 22.

Each of port-to-core link $27_0$ and core-to-port link $28_0$ carries a plurality of cells types, including service cells and control cells. Service cells, also known as traffic cells or user information, contain or include (in a payload portion thereof) user data such as the telephony, data, video, etc., which is to be routed through switch core 22 for application to another switch port board (SPB) 24. The control cells, depicted in FIG. 3 as LCC-cell and LSC-cell, are utilized for control and management of ATM switching system 20.

As explained hereinafter with reference to FIG. 4A, service cells can be of differing length such that two successive service cells need not have the same length or size of payload. Moreover, the control cells have differing size from the service cells. Further, the present invention provides differing types of control cells (e.g., LCC-cells and LSC-cells), with each control cell type having a differing format. Although FIG. 3 shows connection of only one switch port board (SPB) $24_0$ to switch core 22, it should be understood that links between switch core 22 and other switch port boards (SPBs) 24 likewise carry both service cells and control cells.

2.1 Service Cell

The service cells carries user data for the units connected to switch core 22. All service cells are routed through switch core 22 from one switch port board (SPB) 24 to one or more other switch port boards (SPBs) 24. The size of the service cells can vary. In the illustrated embodiment, example valid sizes are 8, 16, 24, 32, 40, 48 and 56 bytes including a two byte header (the first two bytes of the cell). In the illustrated embodiment, the maximum cell size is fifty six bytes.

Figure 4A:
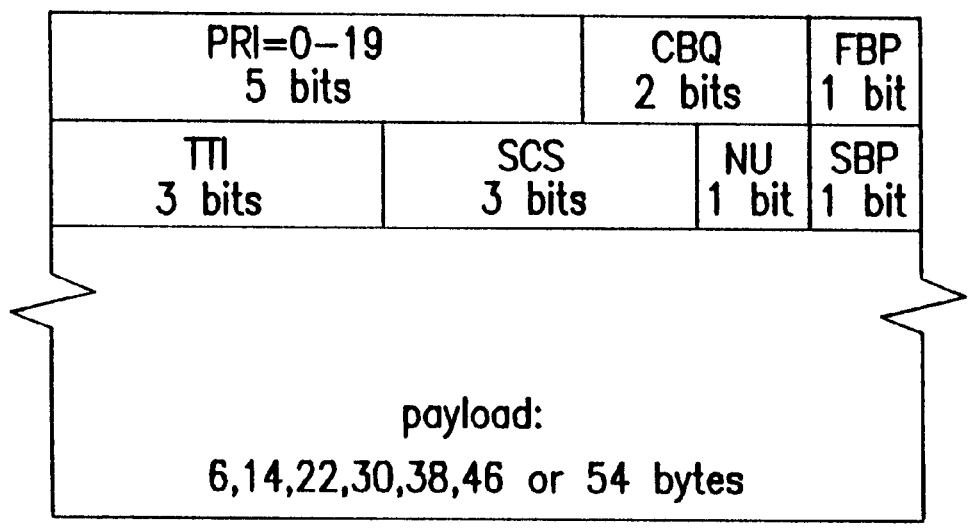
FIG. 4A is a diagrammatic view illustrating a format for a service cell utilized in the ATM switching system of FIG. 1.

As shown in FIG. 4A, the service cell has a two byte header (first two bytes of the service cell) and a payload. The two byte header is used by switch core 22 to route user data to a desired or proper destination (switch port board), and the rest of the cell (i.e., the payload) is user data that is transparent through and to switch core 22. Certain fields of the service cell are discussed below.

2.1.1 PRI, Cell Type and Physical Route Identifier

In a cell received on a port-to-core link 27 from a switch port board (SPB) 24, the PRI field of a received service cell contains a value indicative of the particular buffer or cross point unit (XPU) where the cell data should be stored (on the same row as the receiving cross point unit (XPU) 32). For example, if a cell received from switch port board (SPB) $24_0$ has a value of "5" in its PRI field, then the cell is to be stored in $XPU_{0,5}$.

In the illustrated embodiment, a PRI value in the range of from 0–19 indicates a service cell. However, since only sixteen XPU 32 are provided per row of the memory array unit 30 (see FIG. 1), only PRI values of 0–15 are valid. Service cells with PRI values outside of this range are discarded. However, the size of unsupported service cells (PRI=16–19) are checked in order to find cell boundaries. As explained subsequently, PRI values of greater than 20 are utilized for different purposes in control cells.

As explained hereinafter, just before a cell is transmitted from a switch port board (SPB) 24 into switch core 22, the PRI field value is replaced with a value corresponding to the switch port board at which the cell originated. For example, if a cell were to be transmitted from switch port board (SPB) $24_0$ through switch core 22 to switch port board (SPB) $24_{15}$, before leaving switch port board (SPB) $24_0$ en route to switch core 22 the cell would have its PRI value changed from "15" to "0".

2.1.2 CBQ Crosspoint Buffer Queue Code

As shown in FIG. 2, each cross point unit (XPU) 32 has two queues or buffers: $CBQ_0$ and $CBQ_1$. The purpose of the CBQ field is to direct the service cell into one of these two queues or buffers at a particular crosspoint. The CBQ field indicates in which of these buffers the cell should be stored. A CBQ value of zero indicates that the cell should be put in buffer $CBQ_0$; a CBQ value of one indicates that the cell should be loaded into buffer $CBQ_1$. CBQ values of two and three are not valid and cells having such invalid values are discarded.

2.1.3 FBP and SBP Parity Bits

The FBP is a first byte parity bit which covers the first byte of the header of the service cell. The SBP is a second byte parity bit which covers the second byte of the header of the service cell. For both the first byte and the second byte of the service cell header the parity is odd including the parity bit.

2.1.4 TTI Field

The TTI (Traffic Type Indication code) field is 3 bits. For received service cells these three bits specify the traffic type for the service cell and if the cell is concatenated. Traffic type, or "cast" type, indicates whether the cell is a "unicast" (one destination), "multicast" (several destinations) or "broadcast" addressed cell (a broadcast cell is sent to all 16 ports). A "concatentated" cell indicates that current cell is followed by a new cell directed to the same switch port board (e.g., the same terminating entity). Table 1 shows the significance of potential values zero through seven for the TTI field.

The TTI bits are translated in switch core 22. Such translation is dependent on received TTI value and buffer status in switch core 22 (for associated CBQ and row). Table 2 shows received TTI values and translated/transmitted TTI values.

Thus, the TTI field in the transmitted cell contains an indication whether all the buffers on this row and actual CBQ-value of the associated receiving side are free. The buffers are not free if at least one buffer is occupied.

2.1.5 SCS Field

The SCS (Service Cell Size code) field has 3 bits. These 3 bits specify the size of the service cell. Potential sizes for service cells in the illustrated embodiment are shown in Table 3. Potential service cell sequence 8, 16, 24, 32, 40, 48, and 56 bytes (inclusive of header).

2.1.6 NU Field

The field NU (Not Used) is not used and is transparent through switch core 22.

2.1.7 Cell Payload

The payload is the "user data" that is transferred transparently through switch core 22. As evident from the SCS field (see FIG. 4A) and Table 3, the size of the payload can vary from six to fifty four bytes.

2.2 Control Cells

Figure 4B:
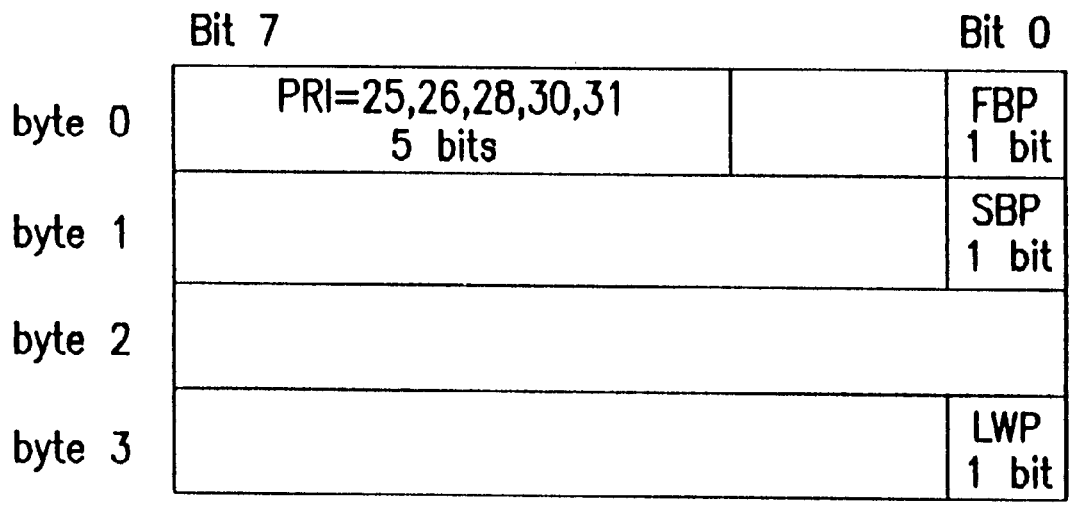
FIG. 4B is a diagrammatic view illustrating a general format for a control cell utilized in the ATM switching system of FIG. 1.

Control cells are terminated and originated in the row column units (RCUs) 40. All control cells are four (4) bytes long. As shown in FIG. 4B, all control cells have the PRI (Physical Route Identifier) field, the FBP (first byte parity), and the SBP (second bit parity) fields discussed above for service cells. In addition, control cells have a one bit LWP field, which is a last word parity field. The LWP covers the last word (third and fourth byte). The parity for the last word is odd, including the parity bit.

Possible PRI values for control cells are in the range from twenty to thirty one. In the illustrated embodiment, a valid control cell has one of the following as the value of its PRI field: 25, 26, 28, 30, and 31. As described further herein, these PRI values are indicative of cell format and, in some instances, of an "address" of a particular control register in the cross point unit (XPU) 32 involved in a register read or write operation.

Control cells are used for remote control and supervision of the row column units (RCUs) 40 and for synchronization of connection with switch port boards (SPBs) 24. There are two types of control cells: Link Connection Control (LCC) cells and Link State Control (LSC) cells.

2.2.1 Link Connection Control (LCC) Cells

LCC-cells are employed primarily to control and operate switch core 22 remotely from the switch port boards (SPBs) 24. In this regard, LCC-cells are used for reading of and writing to control registers inside the row column units (RCUs) 40. LCC-cells also carry, from switch core 22 to the affected switch port board (SPB) 24, information concerning the release of buffer(s) in the cross point units (XPUs) 32, i.e., when a buffer transitions from occupied to free. There are two formats of the LCC cell: the bitmapped format and the coded format. The particular format of a LCC cell is indicated by its PRI value. PRI values of 25, 26, 28 and 30 indicate a bitmapped-formatted LCC cell; a PRI value of 31 indicates a coded format LCC cell (or, alternatively, a LSC-cell).

2.2.1.1 Bitmapped Format LCC Cell

FIG. 4B(1) shows the format of a bitmapped-formatted link connection control (LCC) cell. The bitmapped format conveys operation data in a fast manner between the connected switch port board (SPB) 24 and the control/status registers inside the row column units (RCU) 40 of switch core 22. Up to sixteen bits can be loaded or unloaded in one cell transfer.

2.2.1.1.1 BCD Field

The sixteen bits that can be loaded or unloaded in one cell transfer are stored in the BCD (Buffer Control Data) field. Each of the sixteen bits in the BCD field holds data that is to be written to or read from the "addressed" control register, i.e., the control register having the value specified by the PRI field. When the BCD field is used as a bitmap, BCD-N holds the value related to buffer of the specified row or column.

2.2.1.1.2 CBQ, Crosspoint Buffer Queue

The CBQ field serves the same purpose as for the service cell, e.g., points to one of the queues $CBQ_0$ or $CBQ_1$ in the cross point unit (XPU) 32. Valid values are zero and one; cells with other values are discarded.

2.2.1.1.3 RE Field and NU Field

Bits marked RE in FIG. 4B(1) are reserved; bits marked NU in FIG. 4B(1) are not used. Both RE and NU bits are thus transparent to switch core 22.

2.2.1.2 Coded Format LCC Cell

The coded format of the LCC cell allows the switch port board (SPB) 24 to address all control registers inside the corresponding (same subscripted) row column unit (RCU) unit 40. One byte at a time can be loaded/unloaded with a LCC cell having a coded format. The format of the coded LCC-cell is shown in FIG. 4B(2).

A value of thirty one (31) in the PRI identifies a cell to be either an LSC-cell or LCC-cell. An additional bit in the cell, the LSI bit, distinguishes between LSC-cells and LCC-cells. In particular, an LSI value of zero (0) indicates a LCC cell in the coded format, whereas a LSI value of one (1) indicates a LSC cell.

The remaining bits in the coded LCC-cell are interpreted according to Table 4. In Table 4, it is to be noted that all combinations of write and read towards switch core 22 is possible. Moreover, a cell with write/read equals to 1/1 will give a write-then-read.

2.2.2 Link State Control (LSC) Cells

The Link State Control (LSC) cells are used to synchronize the connection between row column units (RCUs) 40 of switch core 22 and the corresponding (i.e., similarly subscripted) connected switch port board (SPB) 24. The LSC-cell format promotes a fast and reliable synchronization of the cell flow, i.e. finds the start of the cell and maintains the cell flow in each direction and supports cell rate decoupling in the direction towards switch core 22.

The use of the LSC-cell is a cooperation between the switch port board (SPB) 24 and the switch core 22. The LSC cell involves both directions of transmission (e.g., switch-to-core link 27 and core-to-switch link 28). The use and actions of the LSC-cell are hereinafter described in more detailed with reference to FIG. 8 and FIG. 9 and corresponding sync state machines at both sides of the links 27 and 28. The format of the Link State Control (LSC) cells is shown in FIG. 4B(3).

2.2.2.1 Synctag Field

The Synctag field is a pattern of 4 bytes used to identify the LSC cells. The Synctag field can have one of two valid values (in hexadecimal, starting with byte 0). The first valid Synctag field value is FE, 1 F, 00, 7F, which means that the LSC cell indicates a PRESYNC state (SSC=11). The first valid Synctag field value is FE,1C, 00, 7F, which means that the LSC cell indicates a SYNC state (SSC=00). The start of a cell is on the positive edge of the bitclock. Parity bits (FBP, SBP and LWP), state code, and PRI are included in these 4 Synctag field bytes.

2.2.2.2 SSC Field

The SSC (Sync State Code) field comprises two bits which define the state of the appropriate sync state machine. When the LSC cell is emanating from the switch port board (SPB) 24, the SSC field defines the state of the sync state machine in the switch port board (SPB) 24. When the LSC cell is emanating from switch core 22, the SSC field defines the state of the sync state machine in switch core 22.

The SSC field can have the following valid values: 0 (which indicates that the side sending the LSC-cell is out of the PRESYNC-state); and 3 (which indicates that the side sending the LSC-cell is in PRESYNC-state).

Figure 8:
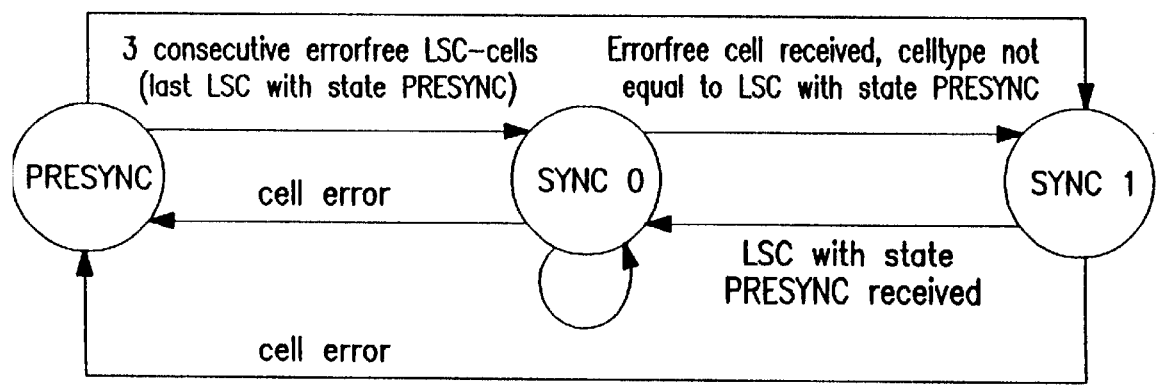
FIG. 8 is a diagrammatic view of a state machine included in a cell synchronizer unit (CSU) for the ATM switching system of FIG. 1.
Figure 9:
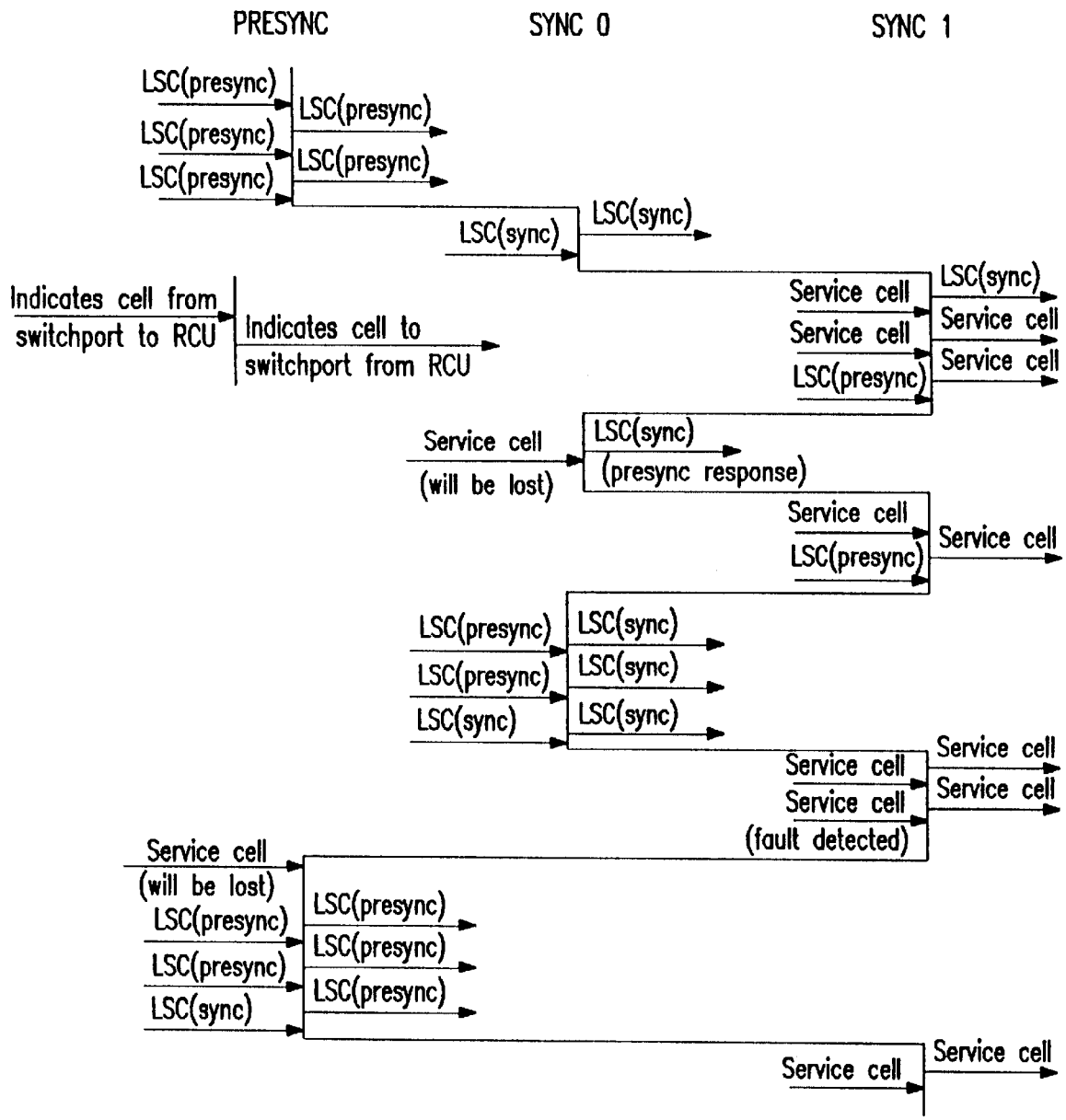
FIG. 9 is a timing diagram depicting operation of the state machine of FIG. 8.

The process for sending LSC-cells with appropriate states is described in section 6.0 and illustrated in FIG. 8 and FIG. 9.

3.0 Switch Port Board (SPB)

The switch port integrated circuit (SPIC) 26 of each switch port board (SPB) 24 has a crosspoint status register 26R for each matrix of the switch. In crosspoint status register 26R for a particular switch port integrated circuit (SPIC) 26, there is a bit position corresponding to each cross point unit (XPU) 32 in row alignment with the switch port board (SPB) 24 for the switch port integrated circuit (SPIC) 26. For example, for crosspoint status register $26R_0$ there is a bit position for each of XPUs $32_{0,0}$ through $32_{0,15}$; for crosspoint status register $26R_{15}$ there is a bit position for each of XPU $32_{15,0}$ through $32_{15,15}$. As explained hereinafter, whenever a switch port board (SPB) 24 writes a cell to an XPU 32, the switch port integrated circuit (SPIC) 26 sets the bit in crosspoint status register 26R corresponding to the particular XPU 32 to which the cell was written. The switch port board (SPB) 24 thereafter cannot send another cell to that particular XPU 32 until that XPU's bit is reset in crosspoint status register 26R. As also explained hereinafter, a bit in crosspoint status register 26R is reset when the switch port integrated circuit (SPIC) 26 receives a pollstate_release cell with the corresponding bit having a one value. Thus, the crosspoint status register 26R faciliates a handshaking between the switch port board (SPB) 24 and switch core 22.

It should be understood from the foregoing discussion of matrices, e.g., matrix 0 and matrix 1, that a crosspoint status register 26R is provided at each switch port integrated circuit (SPIC) 26 for each matrix.

4.0 Row Column Unit (RCU)

All cells incoming to switch core 22 from a switch port board (SPB) 24 on one of the link 27 are directed to a corresponding row column unit (RCU) 40 (see FIG. 1). An overview of the handling of service cells by the switch core 22, and particularly with reference to the control registers of row column units (RCUs) 40, is illustrated by the sequential frames depicted in FIG. 6A–FIG. 6E. Further details of various aspects of the handling of service cells is provided e.g., in section 4.6.1.3 hereof.

Figure 6A:
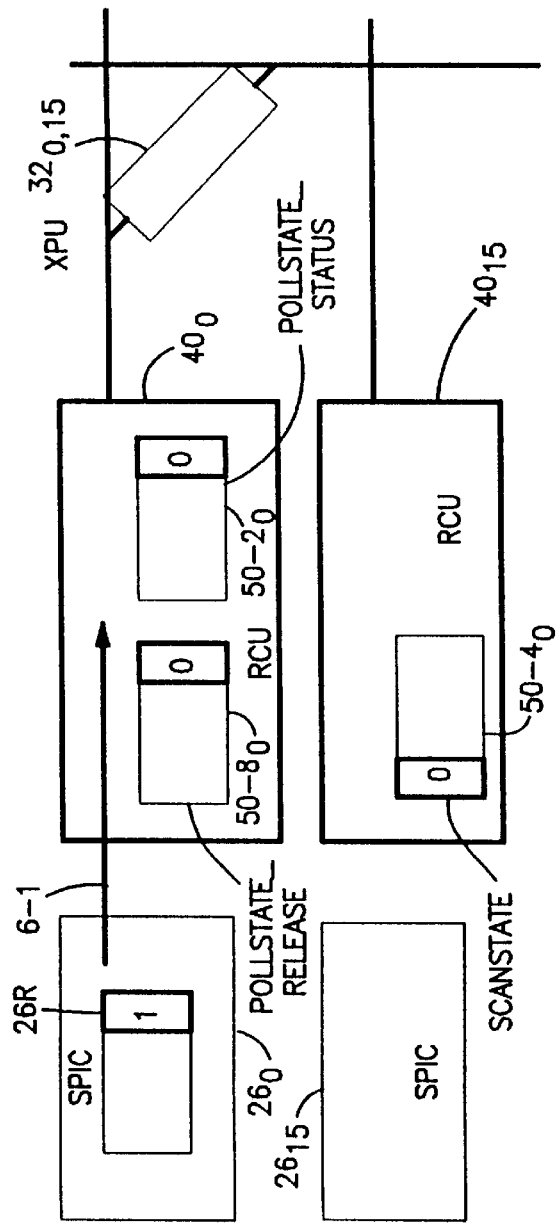
FIG. 6A–FIG. 6E are schematic views showing a sequence of events in routing of a service cell through a core of the ATM switching system of FIG. 1.

As above described, when switch port integrated circuit (SPIC) 26 sends a cell to its corresponding row column unit (RCU) 40, the switch port integrated circuit (SPIC) 26 sets a bit in its crosspoint status register 26R. The bit set corresponds to the column position of the particular cross point unit (XPU) 32 to which the cell is destined. In the frames depicted in FIG. 6A–FIG. 6E, switch port integrated circuit (SPIC) $26_0$ desires to send a service cell to switch port integrated circuit (SPIC) $26_{15}$. Therefore, the service cell sent from switch port integrated circuit (SPIC) $26_0$ to switch core 22 is routed by row column unit (RCU) $40_0$ to cross point unit (XPU) $32_{0,15}$. Accordingly, the arrow labeled 6-1 in FIG. 6A represents switch port integrated circuit (SPIC) $26_0$ sending a service cell (destined for switch port integrated circuit (SPIC) $26_{15}$) to row column unit (RCU) $40_0$. Upon sending such service cell to row column unit (RCU) $40_p$, as shown in FIG. 6A the switch port integrated circuit (SPIC) 26 sets the last bit of its crosspoint status register 26R (since the service cell is destined to the last XPU in the row, i.e., cross point unit (XPU) $32_{0,15}$).

Service cells are analyzed by row column unit (RCU) 40, and then pass on through row column unit (RCU) 40 to the addressed one of the cross point units (XPUs) 32 in the same row of memory array unit (MAU) 30. The service cell is temporarily stored in an appropriate addressed one of the buffers $CBQ_1$ or $CBQ_2$ of the XPU 32. As the cell is stored in a cross point unit (XPU) 32, the row column unit (RCU) 40 updates its cross point status unit (XSU) 50, particularly its appropriate pollstate_status register, to indicate that the particular buffer in which the cell was stored is "occupied". In this regard, the "occupied" state means that there is a cell to unload; the "free" state indicates that the buffer can be loaded.

Figure 6B:
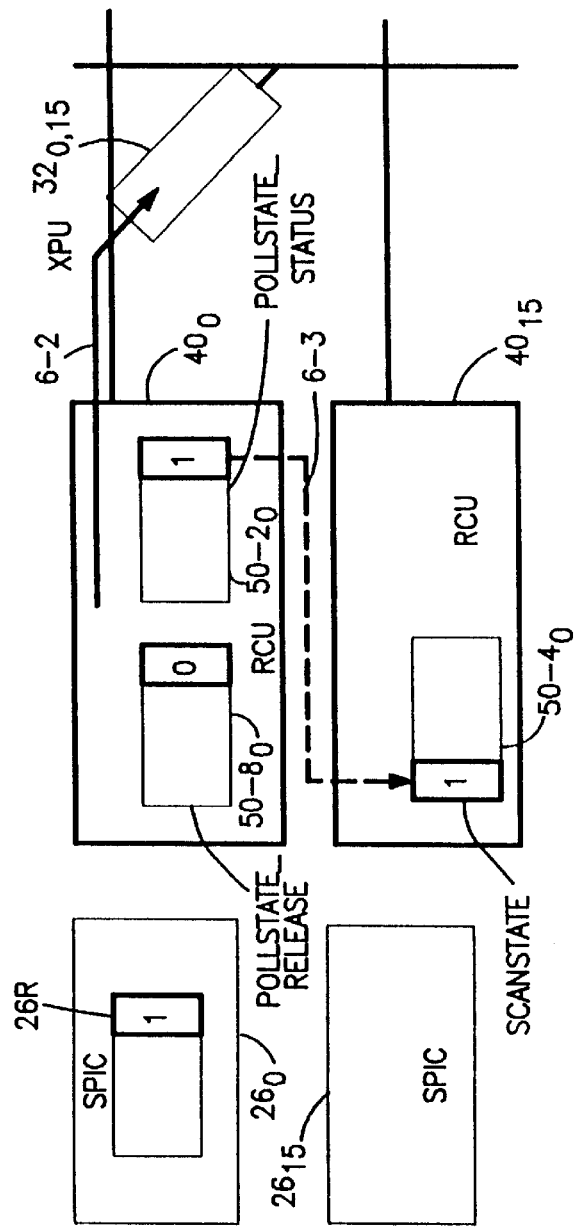
Figure 6C:
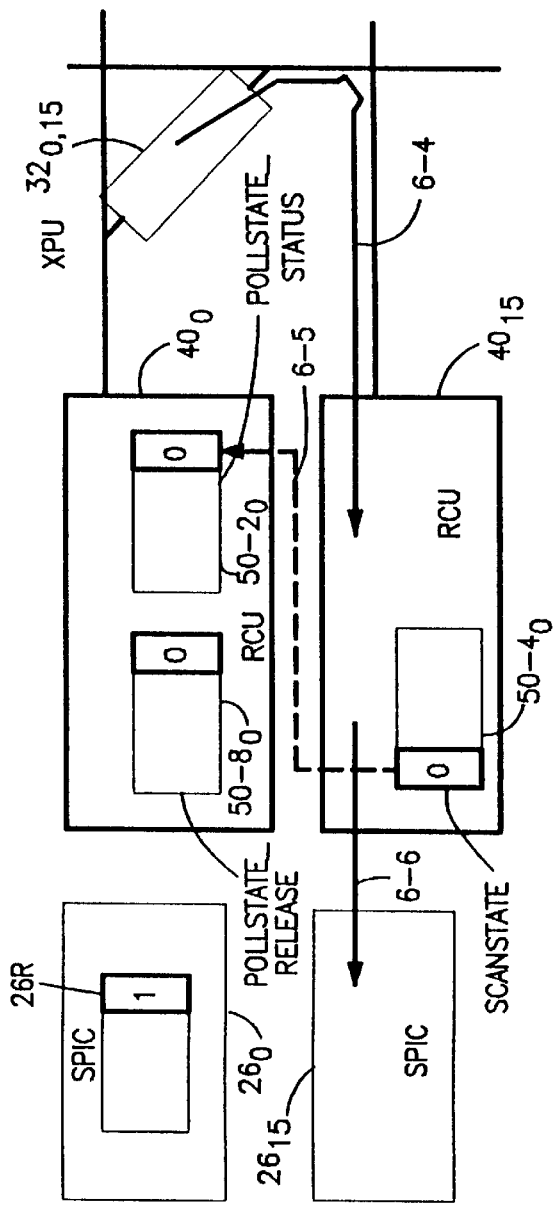

In the example shown in FIG. 6B, in coordination with the writing of the service cell into cross point unit (XPU) $32_{0,15}$ (as indicated by the arrow labeled 6-2), bit 15 of pollstate_status register $50-2_0$ is set. The setting of bit 15 in pollstate_status register $50-2_0$ indicates that cross point unit (XPU) $32_{0,15}$ is occupied. In addition, the cross point status unit (XSU) 50 of row column unit (RCU) $40_0$ sends a set signal to bit 0 in scanstate register $50-4_{15}$ over cross point status bus (CSB) 48 [see FIG. 6] as indicated by the broken line bearing reference numeral 6-3 in FIG. 6B. As explained hereinafter, the pending on the rate between the two switch port integrated circuits (SPICs) $26_0$ and $26_{15}$, the scanstate register bit will either be set when the first word is written into the XPU or the last word (as predefined by the setting of bit 0 in a scanrate register hereinafter described).

Each row column unit (RCU) 40 scans its own scanstate register 50-4 located in its cross point status unit (XSU) 50. When a position in the scanstate register 50-4 is set, the row column unit (RCU) 40 knows that it can read a cell from the corresponding cross point unit (XPU) 32. When the row column unit (RCU) 40 starts to read a cell from such cross point unit (XPU) 32, the corresponding bit in the scanstate register 50-4 is reset. Also, the corresponding pollstate_status register 50-2 located in the row column unit (RCU) 40 that wrote the cell to the cross point unit (XPU) 32 is reset. In the scenario depicted in FIG. 6C, therefore, line 6-4 depicts the reading of the service cell from cross point unit (XPU) $32_{0,15}$ into row column unit (RCU) $40_{15}$, which causes the resetting of the $1^{st}$ bit in scanstate register $50-4_{15}$. Cross point status unit (XSU) $50_{15}$ of row column unit (RCU) $40_{15}$ sends a reset signal on cross point status bus (CSB) 48 [see FIG. 6] as indicated by line 6-5. A signal issued from $50-4_{15}$ causes row column unit (RCU) $40_{15}$ to apply the service cell obtained from cross point unit (XPU) $32_{0,15}$ to switch port integrated circuit (SPIC) $26_{15}$, as indicated by the line labeled with reference numeral 6-6 in FIG. 6C. The reading of a cell from cross point unit (XPU) 32 and application thereof to a switch port integrated circuit (SPIC) 26 is described in more detail in section 4.7 hereof.

Figure 6D:
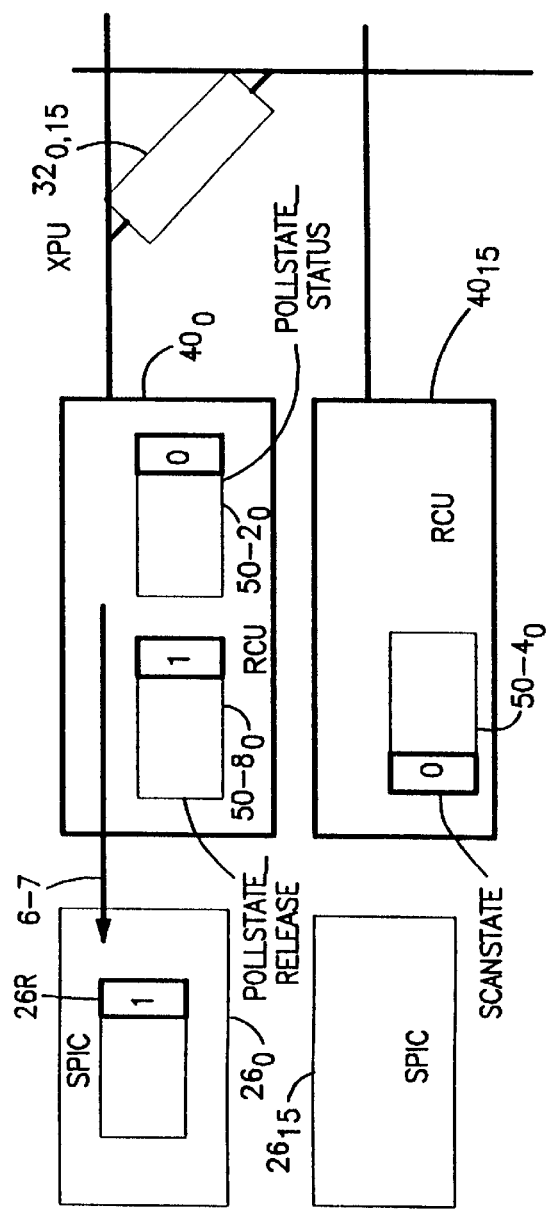
Figure 6E:
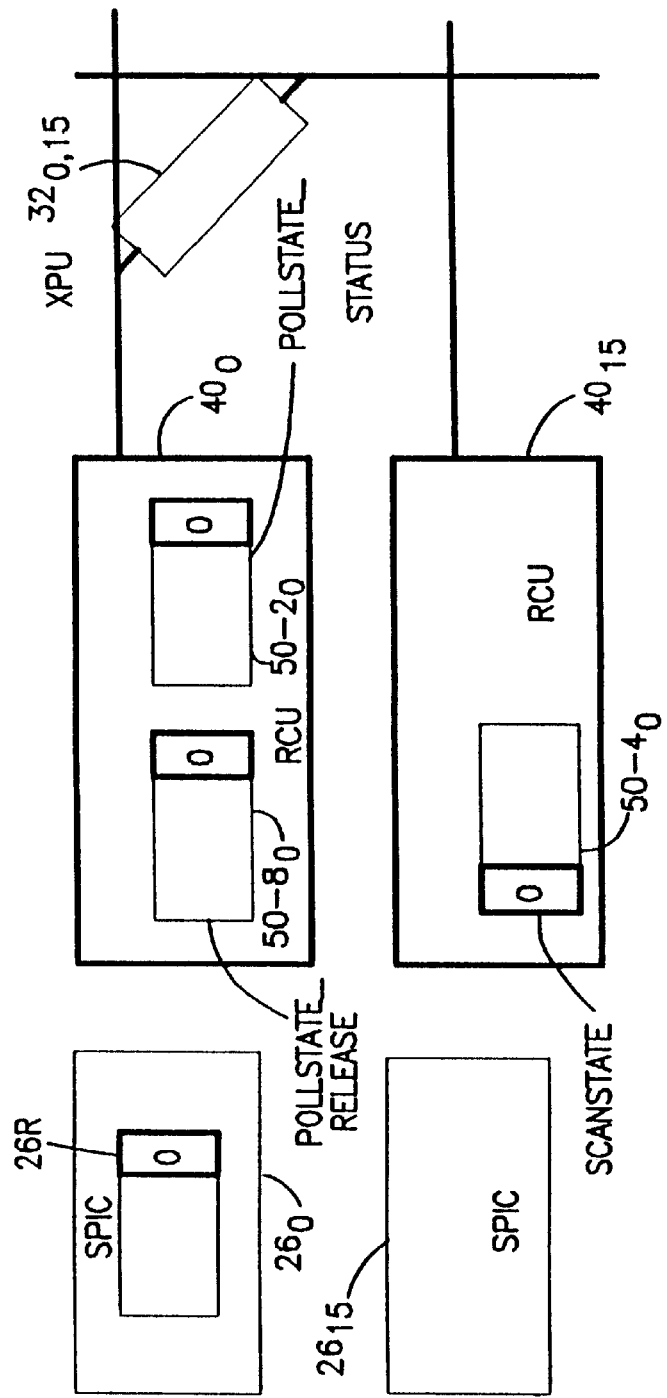

When an cross point status unit (XSU) 50 of a row column unit (RCU) 40 detects the change in a bit of its pollstate_status register 50-2 from an occupied to free status (e.g., from 1 to 0), the cross point status unit (XSU) 50 issues a pollstate release LCC cell (see section 2.2.1) at a first possible point in time. In this regard, the row column unit (RCU) 40 has an internal pollstate_release register 50-8 that captures the state transition in the corresponding pollstate_status register 50-2. Basically, when the reset signal for the bit in question appears on the cross point status bus (CSB) 48, the pollstate_release register 50-8 corresponding bit position is set. In the situation shown in FIG. 6D, after the reset signal indicated by line 6-5 of FIG. 6C resets the last bit of pollstate_status register $50\text{-}2_0$, cross point status unit (XSU) 500 sets the last bit of $50\text{-}8_0$. Cross point status unit (XSU) 50 checks whether any bit position in pollstate_release register $50\text{-}8_0$ is set. If any bit is set (such as the last bit as indicated in FIG. 6D), a request toissue a pollstate release LCC cell is made. When the pollstate release LCC cell is issued to switch port integrated circuit (SPIC) $26_0$ (as indicated by line 6-6 in FIG. 6D), the pollstate_release register $50\text{-}8_0$ is read and cleared. FIG. 6E shows clearance of pollstate_release register $50\text{-}8_0$, as well as clearing of the last bit in crosspoint status register $26R_0$ upon receipt of the pollstate release LCC cell (received at switch port integrated circuit (SPIC) $26_0$ as indicated by line 6-6 in FIG. 6D). At this juncture, a new cell can be written by switch port integrated circuit (SPIC) $26_0$ into the same cross point unit (XPU) 32, i.e., cross point unit (XPU) $32_{0,15}$.

Thus, in the scanning process, each row column unit (RCU) 40 checks the states of the cross point units (XPUs) 32 connected to the column of MAU 30 (e.g., to a read bus 44) for which it is responsible, and updates the appropriate pollstate_release registers included in the cross point unit (XPU) 32. A cross point unit (XPU) 32 containing a cell is unloaded through the buffer output gate to the column bus (e.g., read bus 44) as an outgoing cell. When a gate of a cross point unit (XPU) 32 is opened, only one cell is discharged. The cross point status unit (XSU) 50 is updated to indicate that the buffer in the cross point unit (XPU) 32 from which the cell was unloaded is now "free". The unloaded cell is transferred through the receiving row column unit (RCU) 40 to a receiving switch port board (SPB) 24. In this manner, all cross point units (XPUs) 32 containing a cell are unloaded one by one.

If it turns out that reading of a cell from switch core 22 in the manner aforedescribed occurs at rate which is slower than required by the receiving switch port board (SPB) 24, the receiving row column unit (RCU) 40 generates a control cell in lieu of an expected service cell. If the switch switch port board (SPB) 24 tries to send a cell to cross point unit (XPU) 32 for which the corresponding bit in the crosspoint status register 26R is set, the cell will be discarded in the row column unit (RCU) 40 before it enters the write bus.

Each row column unit (RCU) 40 also contains a system clock unit (SCU) 52. System clock unit (SCU) 52 contains logic for the system clock distribution and is connected to system clock bus (SCB) 46.

Row column unit (RCU) 40 passes a system clock to a gate in the cross point units (XPUs) 32. The gate state of each cross point unit (XPU) 32, whether open or closed, is set in a semi-permanent condition. The gate state is set from the column, thus avoiding contention.

The write buses 42 and read buses 44 provide logical interconnection between the cross point units (XPUs) 32 and the corresponding row column units (RCUs) 40. Busses 42 and 44 provide information such as buffer fill states, read and write buffer control and data.

Thus, basic functions of row column unit (RCU) 40 include loading and unloading of service cells from cross point units (XPUs) 32, aligning and synchronizing cell flow between switch core 22 and the corresponding switch port board (SPB) 24 (including cell rate decoupling), and providing switch port board (SPB) 24 with status information regarding the cross point units (XPUs) 32 so that a cross point unit (XPU) 32 will not be written over. In addition, there are also a number of maintenance functions performed by row column unit (RCU) 40 which are controlled from switch port board (SPB) 24.

Figure 5:
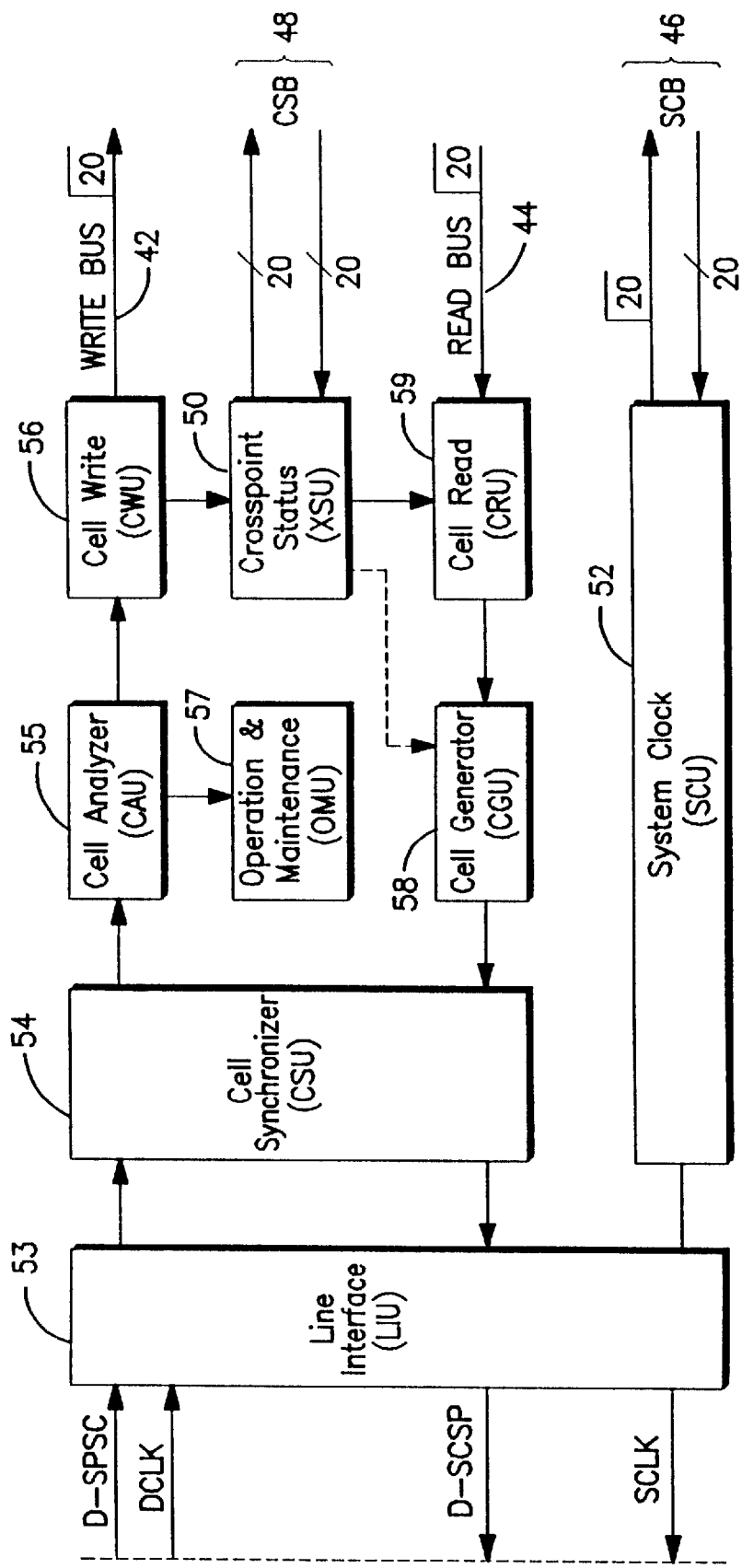
FIG. 5 is a schematic view of a row column unit (RCU) included in the ATM switching system of FIG. 1.

FIG. 5 shows basic components included in each row column unit (RCU) 40. In addition to the cross point status unit (XSU) 50 and system clock unit (SCU) 52 already mentioned, each row column unit (RCU) 40 includes a line interface unit (LIU) 53; a cell synchronizer unit (CSU) 54; a cell analyzer unit (CAU) 55; a cell write unit (CWU) 56; an operation & maintenance unit (OMU) 57; a cell generator unit (CGU) 58; and, a cell read unit (CRU) 59.

4.1 Line Interface Unit (LIU)

Figure 5A:
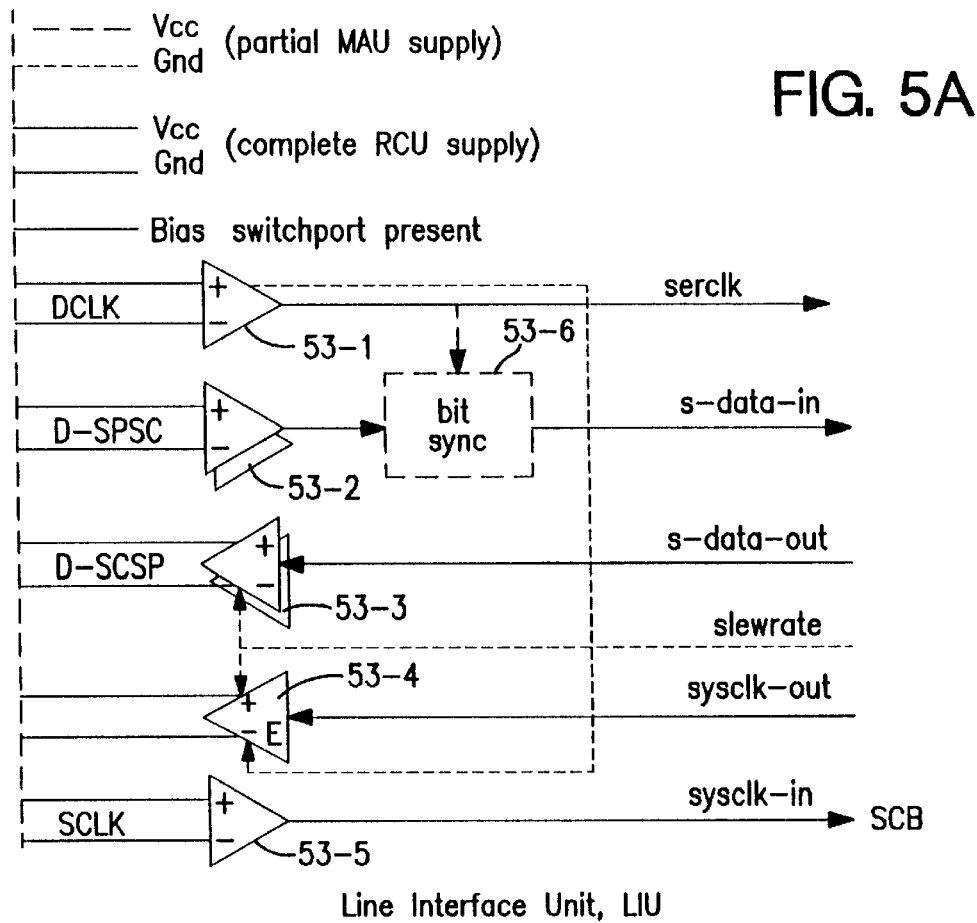
FIG. 5A is a schematic view of a line interface unit (LIU) included in the ATM switching system of FIG. 1.

Line interface unit (LIU) 53 includes a LVDS/GLVDS interface that converts differential signals to digital levels. As shown in FIG. 5A, each row column unit (RCU) 40 has a set of power connections comprising the Vcc and ground, and in addition a bias voltage for the GLVDS. As also shown in FIG. 5A, line interface unit (LIU) 53 of row column unit (RCU) 40 has five differential amplifier pair 53-1 through 53-5, as well as three power pins for the Vcc, ground, and bias, and an additional two pins for providing Vcc and ground to memory array unit (MAU) 30.

Figure 5B:
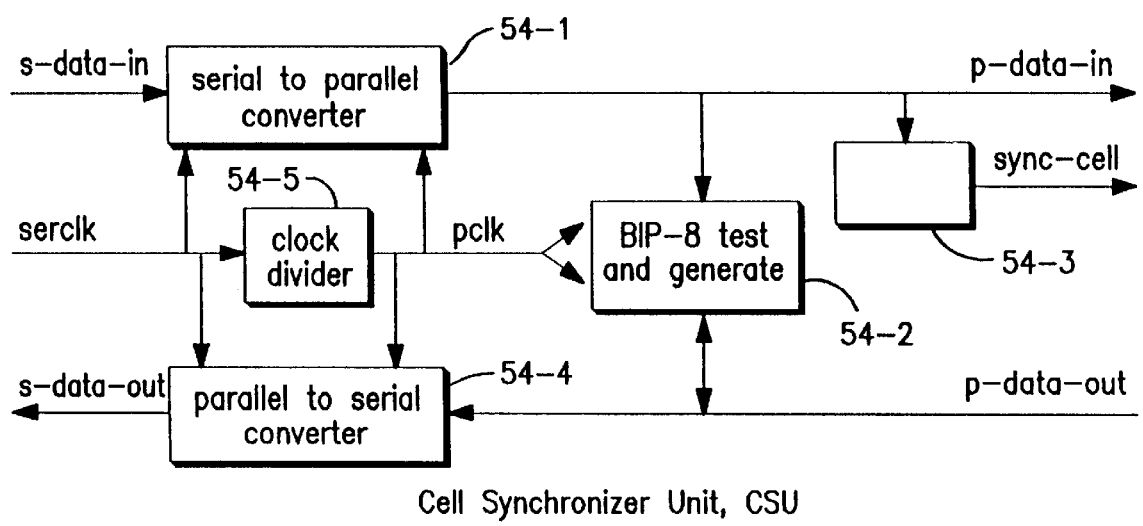
FIG. 5B is a schematic view of a cell synchronizer unit (CSU) included in the ATM switching system of FIG. 1.

Differential pair 53-1 and 53-2 are utilized to handle signals DCLK and D-SPSC, respectively, included in port-to-core link 27. Differential pair 53-1, which receives DCLK, outputs a serial clock signal serclk. The output of differential pair 53-2 is coupled to a bit synchronization function 53-6, which produces a serial data input signal on line s-data-in. The serial clock signal serclk and the serial data input signal on line s-data-in are applied to cell synchronizer unit (CSU) 54 as hereinafter shown in FIG. 5B.

Differential pair 53-3 is utilized to output signal D-SCSP included in core-to-port link 28. Differential pair 53-3 outputs the signal D-SCSP using a serial output data signals received on line s-data-out. As seen hereinafter with respect to FIG. 5B, the serial output data signal on line s-data-out emanates from cell synchronizer unit (CSU) 54.

System clock bus (SCB) 46 includes, for each row column unit (RCU) 40, lines for clocking signals on lines sysclk-in and sysclk-out. As described hereinafter with reference to system clock unit (SCU) 52 and FIG. 5I, the clocking signal on line sysclk-in is utilized to generate the clocking signal on line sysclk-out. A signal SCLK is used to generate signal sysclk-in. The signal SCLK comes from the system clock generated and distributed through the SPIC (on one of the switch port boards). The system clock is typically derived from an external link in the network (e.g., a T1 link). The rate of the system clock is, in most cases, a multiple of 8 KHz.

4.2 Cell Synchronizer Unit (CSU)

Cell synchronizer unit (CSU) 54 makes serial to parallel conversion, as well as halfword and cell alignment. Such conversion is accomplished using a specific cell sync pattern in the incoming direction. In the outgoing direction, parallel to serial conversion is made into a bit stream.

Cell synchronizer unit (CSU) 54 comprises a serial to parallel converter 54-1 which receives the serial bit stream on line s-data-in from line interface unit (LIU) 53 and produces a 16 bit parallel signal on bus p-data-in. The 16 bit parallel signal generated by serial to parallel converter 54-1 is also applied to a BIP-8 tester and generator 54-2 and to a sync tag detector or cell aligner 54-3.

Cell synchronizer unit (CSU) 54 also comprises a parallel to serial converter 54-4 which receives a 16 bit parallel signal on bus p-data-out and makes a conversion to a serial bit stream applied to line s-data-out (connected to line interface unit (LIU) 53). The 16 bit parallel signal on bus p-data-out is also applied to BIP-8 tester and generator 54-2. As described hereinafter with reference to FIG. 5G, the 16 bit parallel signal on bus p-data-out is obtained from cell generator unit (CGU) 58.

In addition, cell synchronizer unit (CSU) 54 includes a clock divider 54-5 which receives the serial clock signal on line serclk outputted from differential pair 53-1 of line interface unit (LIU) 53 (see FIG. 5A) and divides the incoming serial clock signal serclk by a factor of sixteen to produce a parallel clock signal pclk. Parallel clock signal pclk is applied to many elements of row column unit (RCU) 40. Clock divider 54-5 and serial to parallel converter 54-1 work with both edges of the serial clock signal on line serclk.

Sync tag detector 54-3 includes a state machine and a comparator that searches for a sync cell (LSC cell). As discussed in more detail hereinafter in conjunction with FIG. 8 and FIG. 9, the state machine of sync tag detector 54-3 has three states: PRESYNC, SYNC0, and SYNC1. Upon detection of an LSC cell, sync tag detector 54-3 outputs a signal on line "sync-cell" for application to cell generator unit (CGU) 58 as hereinafter described with respect to FIG. 5G.

BIP-8 tester and generator 54-2 checks the link between switch port board (SPB) 24 and switch core 22 on a long term basis in order to determine line quality. Each bit in the byte is exclusively or compared (XOR) to a preserved parity of corresponding bits in earlier bytes. The result is checked against a control cell which contains an expected result. An opposite function applies in the p-data-out direction.

4.3 Cell Analyser Unit (CAU)

As shown in FIG. 5C, cell analyzer unit (CAU) 55 receives the 16 bit signal on bus p-data-in from cell synchronizer unit (CSU) 54. When a cell in the incoming cell stream on bus p-data-in is received at cell analyzer unit (CAU) 55, the cell is either (1) a service cell that is transported to cell write unit (CWU) 56, or (2) a control cell that is handed over to operation & maintenance unit (OMU) 57 [see FIG. 5].

Cell analyzer unit (CAU) 55 includes a PRI-decode unit 55-1 which checks cell type by examining the PRI field of the cell (see, e.g., FIG. 4A and FIG. 4B). As indicated previously, service cells have valid PRI values of 1–19, while control cells have PRI values of 20–31. Once determined, the cell type is stored in cell type register 55-2 during the duration of processing of the cell, and is applied to other units of row column unit (RCU) 40 on line "cell type". Although not expressly shown as such in the drawings, the signal on line "cell type" indicates to cell write unit (CWU) 56 and to operation & maintenance unit (OMU) 57 the type of the cell, so that these units do not have to repeat the cell type analysis. The cell type signal as generated by cell analyzer unit (CAU) 55 indicates to cell write unit (CWU) 56 and operation & maintenance unit (OMU) 57 whether those units should be engaged. Cell write unit (CWU) 56 is engaged if the cell is a service cell; operation & maintenance unit (OMU) 57 is engaged if the cell is an LCC cell. If the cell is an LSC cell, either cell write unit (CWU) 56 or operation & maintenance unit (OMU) 57 is engaged.

Cell analyzer unit (CAU) 55 also includes an integrity checker 55-3. Integrity checker 55-3 checks for parity errors in control cells in the first byte, second byte, and last sixteen bits (see fields FBP, SBP, and LWP in FIG. 4B). All service cells are checked for parity errors in the first byte, and also in the second byte if the cell is of variable cell format. If an error is detected in any type of cell, a fault signal is generated. Such parity error leads to immediate resynchronization, and the cause of such parity error is stored. A cell with a parity fault in the first or second byte is inhibited and not transported to cell write unit (CWU) 56. Moreover, the registers in cross point status unit (XSU) 50 may have been corrupted, and are updated from switch port board (SPB) 24 after resynchronization. Various cell integrity check operations are descrived in section 11.0.

Cell analyzer unit (CAU) 55 further includes PRI-swap unit 55-4. For a service cell, the PRI-swap unit 55-4 changes the destination value in the PRI field to the source value, as previously described. The destination value of the PRI field is saved for use by cell write unit (CWU) 56, and applied thereto on line dest-PRI. The service cell itself is transmitted on sixteen bit bus "write data" to cell write unit (CWU) 56.

4.4 Cell Write Unit (CWU)

Cell write unit (CWU) 56 stores the service cell in an addressed one of the cross point units (XPUs) 32. Cell write unit (CWU) 56, shown in FIG. 5D, includes cell size logic unit 56-1; write address counter 56-2; crosspoint select unit 56-3; and buffer select unit 56-4. The service cell is received on the sixteen bit bus "write data" from cell analyzer unit (CAU) 55 and applied to all units of cell write unit (CWU) 56. The destination PRI value, obtained on line dest-PRI from cell analyzer unit (CAU) 55, which essentially indicates to which switch port board (SPB) 24 the cell was transmitted, is applied to crosspoint select unit 56-3.

As described below, crosspoint select unit 56-3 both selects and enables, for the duration of handling of the service cell, the particular cross point unit(s) (XPU) 32 to which the service cell is to be written. Based on the value in field CBQ of the service cell, buffer select unit 56-4 selects one of the buffers $CBQ_0$ or $CBQ_1$ [see FIG. 2] of the particular cross point unit(s) (XPU) 32 to which the service cell is to be written, and applies a buffer enable signal to the selected buffer and generates a priority signal. In accordance with the particular cross point unit (XPU) 32 and buffer thereof, write address counter 56-2 generates a write address for the first sixteen bit word of an incoming service cell, and applies the same on a bus "write address". For each subsequent 16 bit word of the service cell, write address counter 56-2 generates a further address until all words of the cell have been written to the addressed cross point unit (XPU) 32. Write address counter 56-2 generates the further addresses for each word of the service cell in accordance with the cell size as determined by cell size logic 56-1. Cell size logic 56-1 knows the size of the service cell based on the field SCS [see FIG. 4A]. Write address counter 56-2 starts at zero and counts to the cell size.

Write address counter 56-2 also sends out start_write and end_write signals that are utilized by cross point status unit (XSU) 50 to set the "occupied" state of the cross point units (XPUs) 32 [see FIG. 5H(1) and FIG. 5H(2)]. Such signal is also applied via cross point status bus (CSB) 48 to the scanstate register 50-4 of the other row column unit (RCU) 40 which manages the affected cross point unit (XPU) 32 for unloading purposes [see FIG. 6].

Crosspoint select unit 56-3 includes both an enable register and a multicast register. The enable register is loaded at the start of the cell either from the decoded PRI-value or from the multicast register. The multicast register must be pre-loaded with addresses to the target cross point units (XPUs) 32 by means of a control cell prior to receipt of the affected service cell. The multicast register is needed only if switch core 22 supports point-to-multipoint connections.

4.5 Operation & Maintenance Unit (OMU)

Operation & maintenance unit (OMU) 57 basically serves to terminate control cells and to select a target one of the registers in cross point status unit (XSU) 50. As shown in FIG. 5E, operation & maintenance unit (OMU) 57 comprises bitmap target code register 57-1; target code register 57-2; traffic mode register 57-3; article number PRI-code unit 57-4; zero fill bank unit 57-5; bitmap decode unit 57-6; and target decode unit 56-7. The sixteen bit bus p-data-in is applied from cell synchronizer unit (CSU) 54 to bitmap target code register 57-1; target code register 57-2; and traffic mode register 57-3.

One of three potential actions is taken with respect to a cell transmitted to operation & maintenance unit (OMU) 57. As a first action, idle cells are thrown away.

As a second action, sync cells (e.g., LSC cells) are thrown away (however, if the "cell sync status" bit in the LSC cell is set, the LSC cell must be stored and a returning LSC cell sent). As a third action, a LCC control cell is processed (whether of bitmap format or coded format).

In the above. regard, control cells are forwarded in parallel to bitmap target code register 57-1 and target code register 57-2. If the control cell is a bitmap formatted cell [see FIG. 4B(1)], bitmap target code register 57-1 determines such and forwards the cell to bitmap decode unit 57-6 where the cell is decoded. The selected content of the cell is then loaded (on line "bitmap load") into a target one of the bitmapped control registers [see Table 5 and Section 4.6.1]. Target code register 57-2 serves the function of enabling target decode unit 57-7 to determine to which target control register the bitmap formatted cell should be directed. In accordance with this determination, target decode unit 57-7 outputs a signal on line "register select". The target one of the registers is ascertained from the value in the PRI field of the bitmapped LCC control cell.

A LCC control cell that is of the coded format can contain the address to a target control register and data to be stored in or retrieved from the target control register [see Table 6]. Such registers are generally described, e.g. in Section 4.6.2. The code in the target register field can also hold a direct command, which in this context refers, e.g., to the clear commands of Table 6. A direct command is a command which is carried out immediately and not stored in any register. Examples of direct commands are clear commands and retrieve_pollstate commands. The clear commands essentially clear the pollstate_status register 50-2 and the scanstate register 50-in the XSU [see FIG. 5H(2)]. The retrieve_pollstate commands force the switch port to issue a pollstate_status LCC in return.

The target register field with the load and unload markers are stored in the target register until the target register is written over. The load and unload markers are dynamic and cleared once they are executed. The unload marker, indicating retrieval of data from a target register, is executed first when a control cell can be sent towards the switch port board (SPB) 24.

Zero fill bank unit 57-5 is utilized to provide a zero fill for retrieve operations involving target registers in cross point status unit (XSU) 50. In an alternate embodiment involving more gates, the zero fill is conducted at the target register itself

4.6 Cross Point Status Unit (XSU)

Cross point status unit (XSU) 50 includes numerous control registers, including registers which use bitmapped link connection control (LCC) cells [see Table 5] and registers which use coded link connection control (LCC) cells [see Table 6]. In addition, cross point status unit (XSU) 50 has registers which hold information about the current fill status for each cross point unit (XPU) 32 connected to the row column unit (RCU) 40 and the write bus 42 to which the RCU is connected.

4.6.1 Registers Using Bitmapped LCC Cells

As shown in Table 5, there are three types of registers which are updated by sending bitmapped LCC cells to switch core 22. These three types of registers are the multicast register, the scanblock registers, and the pollstate registers.

The registers shown in Table 5 as using bitmapped LCC cells are 16 bits wide (since a bitmapped LCC cells carrie 16 bits [see FIG. 4B(1)]. The entire register can be updated by sending one bitmapped LCC cell to cross point status unit (XSU) 50. Unload of the registers of Table 5 can be done by coded LCC cell, as described in section 4.6.2. In Table 5, a value of "X" indicates a do not care value. Cells are discarded if they have an incorrect CBQ value.

4.6.1.1 Multicast Registers

The 16 bit multicast register of a row column unit (RCU) 40 holds the bitmap that is used when the service cell has the indication "multicast". Each bit in the bitmap corresponds to a port of switch core 22, i.e., to one of the switch port boards (SPBs) 24. For example, bit zero (0) corresponds to port 0 (switch port board (SPB) $24_0$ ) and so on up to bit 15 that corresponds to port 15 (switch port board (SPB) $24_{15}$). In the bitmap of the multicast register, a bit set to one ("1") implies that the cell is to be loaded into the correspondent buffer, if free, as part of the multicast. A bit in the multicast register set to zero ("0") indicates that the corresponding buffer is not to be included in a multicast. One register position is used for the two queues $CBQ_0$ and $CBQ_1$, so that the value of CBQ for this register has no significance.

4.6.1.2 Scanblock Registers

For the cross point status unit (XSU) 50 of each row column unit (RCU) 40 there are two 16 bit scanblock register 59-6 (see FIG. 5F) which are used to mask out buffers from the scanning process. One of the scanblock register 59-6 serves as a bitmap for the $CBQ_0$ buffers managed by a row column unit (RCU) 40; the other of the scanblock registers serves as a bitmap for the $CBQ_1$ buffers for the $CBQ_0$ buffers managed by a row column unit (RCU) 40.

Although a scanblock register 59-6 may be set to preclude the scan of a certain $CBQ_0/CBQ_1$ buffer, the load of that buffer is still active, i.e., a cell can be loaded into a buffer with the scanblock bit set. The cell remains in the buffer until the bit is cleared. When the bit is reset the buffer is linked into the scanning process again and the cell is transmitted out from the switch port at the proper time instant.

As with the bitmapping of the multicast register, the scanblock register bit zero (0) corresponds to port 0 (switch port board (SPB) $24_0$ ) and so on up to bit 15 that corresponds to port 15 (switch port board (SPB) $24_{15}$). Setting a bit to one in the bitmap of the scanblock register indicates that the buffer is blocked.

4.6.1.3 Pollstate Registers

The pollstate_status registers and pollstate_release registers of Table 5 are collectively referred to as the "pollstate registers". For each row column unit (RCU) 40 there is a pollstate_status register 50-2 and a pollstate_release register for each matrix in switch core 22 (see also FIG. 6). For a given row column unit (RCU) 40, therefore, there are two pollstate_status registers and two pollstate_release registers. A first pollstate_status register includes a bitmapped indication of "occupied" or "free" for each buffer $CBQ_0$ (in core matrix 0) in cross point units (XPUs) 32 which are connected to the RCU by a write line 42, and a second pollstate_status register includes a bitmapped indication of "occupied" or "free" for each buffer $CBQ_1$ (in core matrix 0) in cross point units (XPUs) 32 which are connected to the RCU by the write line 42. A first pollstate_release register includes a bitmapped indication of whether a transition from "occupied" to "free" has occurred in a buffer $CBQ_0$ (in core matrix 0) in cross point units (XPUs) 32 which are connected to the RCU by a read line 44, and a second pollstate_release register includes a similar bitmapped indication with respect to each buffer $CBQ_1$(in core matrix 0) in cross point units (XPUs) 32 which are connected to the RCU by the read line 44. Cells affecting the pollstate registers are transmitted as described hereinafter in section 9.0.

Thus, for each row column unit (RCU) 40 there are two 16 bit pollstate_status registers which hold an indication of whether 16 buffers on the same row are free or occupied. Each row column unit (RCU) 40 has a pollstate_status register for the 16 $CBQ_0$ buffers it manages and a separate pollstate_status register for the 16 $CBQ_1$ buffers it manages. Pollstate_status register bit zero (0) corresponds to the first cross point unit (XPU) 32 managed by the row column unit (RCU) 40 and so on up to bit 15 that corresponds to the last cross point unit (XPU) 32 managed by the row column unit (RCU) 40. In each pollstate_status register, a bit set to zero indicates that the queue (one of $CBQ_0$ or $CBQ_1$, as specified) of the corresponding cross point unit (XPU) 32 is free, while a bit set to one ("1") indicates that the buffer is occupied. As explained in more detail hereinafter in connection with section 9.0, the contents of the bitmapped pollstate_status register is sent as a response to a "retrieve pollstate command" issued from switch port board (SPB) 24. The "retrieve pollstate command" is sent to switch core 22 with a coded LCC cell having an ADR field value of 25. Bits not used in the bitmapped LCC for the pollstate_status register are set equal to 0 and REserved bits are equal to 1.

A pollstate_release LCC cell is typically sent out from row column unit (RCU) 40, and particularly from cell generator unit (CGU) 58, whenever one of the buffers in the column managed by the row column unit (RCU) 40 undergoes a change from "occupied" to "free", as indicated by a corresponding transition in the pollstate_release register 50-8. If both registers ($CBQ_0$ and $CBQ_1$) for a cross point unit (XPU) 32 have been changed, a cell showing content of the pollstate_status register corresponding to $CBQ_0$ is sent out first since it has higher priority. All changes during the ongoing "pollstate_release" cell are captured and result in another "pollstate_release" cell. In each pollstate_release register, a bit set to one indicates that the status of the pollstate_release register has changed from occupied to free while a bit set to zero indicates that the current status remains (which could be either occupied or free). Bits not used in the bitmapped LCC for the pollstate_release register are set equal to 0 and REserved bits are equal to 1.

As previously explained with reference to FIGS. 6A–6E, each SPIC 26 has a register 26R (see FIG. 1 and FIG. 6) which has one bit position for each cross point unit XPU 32 it controls. Whenever a SPIC 26 writes a cell to a cross point unit XPU 32, SPIC 26 sets a corresponding bit in register 26R. The position of the thusly written bit in register 26R corresponds to the bit positions given in the bit mapped LCC cell (see Table 5 and FIG. 4B-1). As long as a bit is set for a XPU 32 in register 26R, SPIC 26 cannot send a new cell to that XPU 32. Only after the bit for the corresponding XPU 32 is reset in register 26R can another cell be sent to XPU 32. The bit in register 26R is reset when SPIC 26 receives a cell showing that, in the pollstate_release register, the bit for the XPU 32 in question has been set to one (e.g., indicating a transition from an occupied to a free state). Thus, a handshaking occurs between the SPIC 26 and switch core 22. This handshaking ensures that the XPU 32 is not untimely overwritten. To make certain that there is no mismatch between its register 26R and switch core 22, the SPIC 26 can prompt for current crosspoint status. This prompting for current crosspoint status should be done if, e.g., the SPIC 26 detects by a time-out that a position in its register 26R never gets reset. The SPIC 26 can then (or at regular intervals) issue a retrieve pollstate_command. Switch core 22 replies by sending a pollstate_status LCC cell (see Table 5) to SPIC 26.

The registers included in cross point status unit (XSU) 50 which hold information about the current fill status for each of the buffers of each cross point unit (XPU) 32, e.g., the pollstate_status registers and the pollstate_release registers, are updated through cross point status bus (CSB) 48 [see FIG. 6]. The information in the registers of cross point unit (XPU) 32 essentially serves two purposes. The first purpose is to identify (using the pollstate_status registers) the cross point units (XPUs) 32 that are occupied and therefore can be unloaded. The second purpose is to identify (using the pollstate_release registers) the cross point units (XPUs) 32 that have transitioned from an "occupied" to "free" status so that new cells can be sent thereto.

Each row column unit (RCU) 40 performs a scanning process for its associated column, as described in section 10.0 hereof. SPIC 26 can control the duration of the scan process in its associated RCU 40 by setting the scan enable counter (see section 4.6.2.4). The scanning process is described in FIG. 18, and is part of the overall flow of operations shown in FIG. 10.

FIG. 5H(2) shows an implementation comprising pollstate register 50-2; pollrate register 50-3; scanstate register 50-4; and scanrate register 50-5. The portion of FIG. 5H(2) depicted above line DH-L is provided for each buffer $CBQ_0$ and $CBQ_1$ in each cross point unit (XPU) 32 attached to the write bus 42 which is connected to the particular cross point status unit (XSU) 50. The portion of FIG. 5H(2) depicted below above line DH-L is provided for each buffer $CBQ_0$ and $CBQ_1$ in each cross point unit (XPU) 32 attached to the read bus 44 which is connected to the particular cross point status unit (XSU) 50.

In FIG. 5H(2), the parallel input data on line p-data-in obtained from cell synchronizer unit (CSU) 54 is applied to the input terminals of both pollrate register 50-3 and scanrate register 50-5. As described hereinafter with reference to section 4.6.2.8 and section 10.0, the parallel input data on line p-data-in is applied to pollrate register 50-3 to indicate which of two polling options is to be implemented. Similarly, as described hereinafter with reference to section 4.6.2.9 and section 10.0, the parallel input data on line p-data-in is applied to scanrate register 50-5 to indicate which of two scan options is to be implemented. A signal at terminal Q of pollrate register 50-3 is applied as an output select signal to switch 50-6 in accordance with which of two polling options is selected. A signal at terminal Q of scanrate register 50-5 is applied as an output select signal to switch 50-7 in accordance with which of two scan options is selected.

Pollstate register 50-2 has a set terminal S, a reset terminal R, and an output terminal Q. Set terminal S of pollstate register 50-2 receives a signal on line "start-write" from cell write unit (CWU) 56 [see FIG. 5D]. In accordance with the content of pollrate register 50-3, switch 50-6 applies either one of the signals on lines "start-read" and "end-read" to reset terminal R of pollstate register 50-2. The signals on lines "start-read" and "end-read" are obtained from cell read unit (CRU) 59, as hereinafter described with reference to FIG. 5F. In accordance with the timing dependent upon which of the lines "start-read" and "end-read" is selected, the Q terminal of pollstate register 50-2 applies a signal on line "poll data".

The state of pollstate register 50-2 of FIG. 5H(2) is applied by the signal "poll data" to the appropriate bit of the pollstate_status register 50-2. For example, if the structure shown above line DH-L in FIG. 5H(2) is included in cross point status unit (XSU) $50_0$ of row column unit (RCU) $40_0$ and pertains particularly to cross point unit (XPU) $32_{0,1}$, when cross point unit (XPU) $32_{0,1}$ is loaded with a service cell as indicated by the setting of pollstate register 50-2 the signal on line poll data sets bit BCD 1 (byte 6, bit 2) of the bitmapped pollstate_status register [see FIG. 4B(1) and Table 5].

The scanstate register 50-4 likewise has a set terminal S, a reset terminal R, and an output terminal Q. Reset terminal R of scanstate register receives a signal on line "start-read" from cell read unit (CRU) 59 [see FIG. 5F]. In accordance with the content of scanrate register 50-5, switch 50-7 applies either one of the signals on lines "start-write" and "end-write" to set terminal S of scanstate register 50-4. The signals on lines "start-write" and "end-write" are obtained from cell write unit (CWU) 56, as described with reference to FIG. 5D. In accordance with the timing dependent upon which of the lines "start-write" and "end-write" is selected, the Q terminal of scanstate register 50-4 applies a signal on line "scan data" which is applied to cell read unit (CRU) 59 as hereinafter described with reference to FIG. 5F.

The state of scanstate register 50-4 of FIG. 5H(2) is applied by the signal "scan data" to the appropriate bit of the pollstate_release register (see FIG. 6). For example, if the structure shown below line DH-L in FIG. 5H(2) is included in cross point status unit (XSU) 50, of row column unit (RCU) $40_0$ and pertains particularly to cross point unit (XPU) $32_{0,1}$, when a service cell is unloaded from cross point unit (XPU) $32_{0,1}$ (as indicated by the setting of scanstate register 50-4) the signal on line scan data sets bit BCD 1 (byte 6, bit 2) of the bitmapped pollstate_release register [see FIG. 4B(1) and Table 5].

FIG. 5H(1) shows another and more simplified implementation wherein the pollstate and scanstate registers functions are essentially both performed by a crosspoint status function register 50-1 included in cross point status unit (XSU) 50. It should be understood that two such register 50-1 exist for each cross point unit (XPU) 32 attached to read bus 44, since there are two buffers (buffers $CBQ_0$ and $CBQ_1$ for each such XPU). A set terminal of register 50-1 is connected to line "start-write" to which a signal is applied from write address counter 56-2 of cell write unit (CWU) 56 [see FIG. 5D]. A reset terminal of register 50-1 is connected to line "end-read" to which a signal is applied from read address counter 59-1 of cell read unit (CRU) 59. The Q terminal of register 50-1 is connected to lines "poll-data" and "scan-data", the second of which is included in cross point status bus (CSB) 48. The line "scan-data" is applied to cell read unit (CRU) 59, as hereinafter described with respect to FIG. 5F.

4.6.2 Registers Using Coded LCC Cells

The command registers included in cross point status unit (XSU) 50 which use coded LCC cells are shown in Table 6. In Table 6, the subcolumns CBQ, ADR, and 4.6.2 under the "Address" column refer to the values in similarly named fields of the coded LCC cell [see FIG. 4B(2)] necessary for addressing the particular registers shown. The column marked "Write" and "Read" indicate registers that can be loaded and/or unloaded by coded LCC cell. A value of "X" in any column indicates a "do not care" condition (e.g., any value is acceptable).

4.6.2.1 Poll Enable Register

The poll enable register contains the mode code used by row column unit (RCU) 40 for a cell sending process. The mode code is further explained with reference to cell transmission [see section 9.0 and FIG. 10]. Only the two least significant bits of the poll enable register are used. The value of the two least significant bits of the poll enable register corresponds to the mode (e.g., either mode 0, 1, 2, or 3). For example, a value of 0 in the poll enable register refers to mode 0 (e.g., send only LSC cells). No internal register can be read in mode 0. An attempt to read a register will be pending and executed as soon as the poll enable is changed to mode 1, 2 or 3. An attempt to write to a register is possible when the value stored in the poll enable register is zero.

4.6.2.2 LCC Parity Mode Register

The least significant bit of the LCC parity mode register is used to control the parity mode. The following codes apply: "0" means that normal parity is generated; "1" means that inverted parity FBP, SBP and LWP are generated in the transmitted LCC-cells.

4.6.2.3 Cell Integrity Register

The cell integrity register holds an error indication caused by various detected faults in switch core 22. The integrity check operation is described, e.g. in Section X0. A detected fault sets the corresponding bit of the register. The bits are cleared at unload of the register. Bit 0, when set, indicates a FBP, SBP, or LWP error detected at the receiving side of switch core 22. Bit 1, when set, indicates an unsupported PRI value in a received cell or changed CBQ value in a concatenated stream or exceeded crosspoint buffer size or write over attempt in crosspoint buffer (unicast and multicast, not broadcast). Bit 2 is not used. When set, bit 3 indicates an FBP or SBP error at unload of service cells from the buffer. Bit 4–7 are not used.

4.6.2.4 Scan Enable Register

The scan enable register, which forms part of call size logic 59-2 (see FIG. 5F), controls the start and stop of the scan process. The scan enable register is an eight bit counter that can be preset to any value from 0 to 255. The counter decrements by one for every eight (8th) byte of service cell that is transmitted out to the corresponding port. When the counter reaches zero, the scan process stops. If the counter is preset to 255, the count down is disabled and the scan process is enabled all the time until a new value (less than 255 and greater than 0) is loaded into the register.

4.6.2.5 System Clock Register

The system clock register 52-2 (see FIG. 5I) controls the multiplexer for the system clock output of each port. Values 0–15 set the port number of the system clock source. In the system clock register, bit 0–3 contain the port number of the clock source; bit 4–7 are not used. The system clock register is set equal to zero at "read" from switch core 22.

4.6.2.6 Own PRI Register

The own PRI register is a read-only register of 4 bits. The value at read is equal to actual port number. In the own PRI register, bit 0–3 contains the own port number; bits 4–7 are set equal to zero.

4.6.2.7 Revision Number Register

The revision number register is an eight bit read-only register which holds information concerning a revision number of switch core 22. The first revision of switch core 22 is one (1). In the revision number register, bits 0–7 contain the revision number starting with one.

4.6.2.8 Pollrate Register

The switch port boards (SPBs) 24 ("switchports") that are sending service cells to each other, via switch core 22, can have different speeds. To achieve maximum throughput of service cells through switch core 22, it is necessary that the "free" indication of a buffer of a cross point unit (XPU) 32 be made at the start or at the end of the unload of a service cell. The selection is made dependent on the speed difference between the switch port boards (SPBs) 24.

In each row column unit (RCU) 40 in switch core 22 there are two 16 bit registers (one per CBQ, i.e., one for buffer $CBQ_0$ and one for buffer $CBQ_1$) previously described as the pollstate_status register 50-2. A pollrate register 50-3 is shown in FIG. 5H(2). The buffers, on one row, are indicated as "free" or "occupied" in their corresponding pollstate_status register 50-2. The contents of the pollstate_status register 50-2 are transmitted by the bitmap LCC cells sent from row column unit (RCU) 40 to switch port board (SPB) 24 in response to a retrieve pollstate command.

The pollrate register defines when the associated buffer shall be indicated as "free". For each row column unit (RCU) 40, there is one register bit, in the pollrate register, for each cross point unit (XPU) 32 in the column connected to the row column unit (RCU) 40. This register bit is the same for the two CBQ buffers at a cross point unit (XPU) 32. The lower eight bits are positioned at RPC=0 and the most significant byte at RPC=1—Both at addres 14.

The occupied/free indication in the pollstate_status register 50-2 for the buffer is always set to "occupied" when the first byte of the cell enters the buffer. The indication is set to "free" either at the beginning or end of the unload of the cell. Whether the indication is set to free at the beginning or end of the unload of the cell is determined by the setting of the corresponding bit in the pollrate register. A setting of "zero" ("0") causes the "free" indication to be provided at unload of the last word from the buffer, while a setting of the corresponding bit in the pollrate register to "1" causes a "free" indication to be provided at unload of the first word from the buffer.

FIG. 11 shows, for a particular row column unit (RCU) 40$_x$, an association of bits in the pollrate register and the cross point units (XPUs) 32 managed by that row column unit (RCU) 40. The particular row column unit (RCU) 40$_x$ shown in FIG. 11 manages column x of memory array unit (MAU) 30.

The following scenario, together with FIG. 12, describes how the pollrate register should be set when two switch port boards (SPBs) 24, referenced as switchports X and Y, are to be set up to send service cells to each other. Initially, the bitrate of the opposite switchport is unknown. Therefore the "free" indication is made at unload of the last word from the buffer. The "free" indication, when a switchport is sending service cells to itself, should be made at unload of the first byte from the buffer, as the bitrate in this case always is the same. The pollrate registers are initiated, via LCC cells, for this situation.

As shown in the state below the broken horizontal line of FIG. 12, the two switchports X and Y can now send service cells to each other. In the illustration, the speed of switchport X is assumed to be much higher than the speed of switchport Y, and the correspondent bits of the pollrate register are set accordingly.

A "free" indication of the buffer that holds service cells from X to Y is set at unload of th last word from the buffer. The "free" indication of the buffer that holds service cells from Y to is set at unload of the first word from the buffer.

4.6.2.9 Scanrate Register

To achieve maximum throughput of service cells through switch core 22, it is also necessary that the indication of cell_available can be made at the start or at the end of the load of a service cell. The selection is made dependent on the speed difference between the switch port boards (SPBs) 24.

The scanrate register defines when a cell, in the associated buffer, is indicated as "available". The indication is loaded into the internal snapshot register, that is used by the scan process.

FIG. 13 shows an association between scanrate register bits and cross point units (XPUs) 32. There is one register bit, in the scanrate register, for each cross point unit (XPU) 32 in the row connected to this row column unit (RCU) 40. This register bit is common for the two CBQ values (totally 16 bits). The lower eight bits are positioned at RPC=0 and the most significant byte at RPC=1. Both at addres 15.

The indication of "cell_available" for the buffer can be made at the beginning or end of the load of the cell. Whether the indication of "cell_available" for the buffer can be made at the beginning or end of the load of the cell depends on the setting of the bit in the scanrate register which corresponds to the buffer. In this regard, a scanrate bit setting of zero ("0") indicates that the "cell_available" indication is to be provided at load of the last word into the buffer, while a scanrate bit setting of one ("1") indicates that the "cell_available" indication is to be provided at load of the first word into the buffer. Reset of the indication is always done at the unload of the first byte of the cell.

The following scenario, together with FIG. 14, describes how the scanrate register should be set when two switchports, X and Y, are to be set up to send service cells to each other. Initially, the bitrate of opposite switchport is unknown. Therefore the "cell_available" indication is set at load of the last word into the buffer. The "cell_available" indication when a switchport sends service cells to itself is made at load of the first byte into the buffer, as the bitrate in this case always is the same. The scanrate register is initiated, via LCC cells.

In the second state of FIG. 14, the two switchports can now send service cells to each other. The speed of switchport X is assumed to be much higher than the speed of switchport Y and the correspondent bits of the scanrate register are set accordingly. The "cell_available" indication of the service cells from X to Y are made at load of the first word into the buffer. The "free" indication of the service cells from Y to X are made at load of the last word into the buffer.

4.6.2.10 Clear Command

When the clear command is sent to switch core 22, a corresponding internal register of this port is cleared immediately. Different databits of the datafield in the LCC cell clears different registers in switch core 22.

The following mapping applies to the clear command:

A clear command having databit(0) set to "1" clears the pollstate register of the correspondent CBQ value, and thus serves as a CLEAR_pollstate command.

A clear command having databit(1) set to "1" clears the pollstate_release (scanstate) register of the correspondent CBQ value, and thus serves as a CLEAR_scanstate command. If there is no port connected to a row, and the pollstate bit of the crosspoint on this row is set, the pollstate bit will remain high and a clear scanstate will generate a cell from this crosspoint. The pollstate bit remains high as there is no clock to this port and a cell will be generated for every new "clear scanstate".

A clear command having databit(2) set to "1" clears the snapshot register of the correspondent CBQ value, and thus serves as a CLEAR_snapshot command.

A clear command having databit(3) set to "1"clears the scanblock register of the correspondent CBQ value, and thus serves as a CLEAR_scanblock command.

A clear command having databit(4) set to "1"clears the multicast register of the correspondent CBQ value, and thus serves as a CLEAR_multicast command.Recommendation:

4.6.2.11 Retrieve_pollstate Command

When the retrieve-pollstate command is sent to switch core 22, the internal pollstate status is retrieved. There is one command for the $CBQ_0$ buffers in matrix 0 and another command for the $CBQ_1$ buffers in matrix 1.

4.6.2.12 Scanblock Register

A read of the scanblock register is made by sending a coded LCC cell with an ADR field value of 28 to switch core 22. The RPC-field and the CBQ field values of the LCC cell give correspondent data of scanblock register.

4.6.2.13 Multicast Register

A read of the multicast register is made by sending a coded LCC cell with an ADR field value of 30 to switch core 22. The RPC-field values of the LCC cell give correspondent data of multicast register.

4.7 Cell Read Unit (CRU)

Service cells are supplied to SPIC 26 from switch core 22 in accordance with the scanstate process. Therefore, SPIC 26 can only stop service cells from arriving either by blocking all affected crosspoints (XPUs) on its column or by setting the scan enable counter to zero. Thus, the scanstate process (see FIG. 18) searches the XPU 32 (particularly the scanstate register 50-4, see FIG. 5H(2)) and unloads any service cells that it detects from the corresponding XPU. Cell read unit (CRU) 59 obtains the outgoing cell from the appropriate one of the cross point units (XPUs) 32 attached to read bus 44, after which after which cell generator unit (CGU) 58 begins the process of applying the outgoing service cell to the outgoing cell stream on link 28.

After a cross point unit (XPU) 32 is found to have its corresponding scanstate register 50-4 with an "occupied" state, the buffer of the occupied cross point unit (XPU) 32 is unloaded. Then the state of the buffer for the unloaded cross point unit (XPU) 32 is changed in the pollstate_release register 50-8 to "free". Further, the status of the pollstate_status register 50-2 is also changed to a "free" status. The foregoing operation is conducted with respect to all cross point units (XPUs) 32 connected to the read bus 44 to which the row column unit (RCU) 40 is also connected.

As shown in FIG. 5F, cell read unit (CRU) 59 comprises read address counter 59-1; cell size logic unit 59-2; a select unit 59-3; a set of snapshot register 59-4; a set of scan data gate 59-5; and, a set of scanblock register 59-6.

When a cross point unit (XPU) 32 is to be unloaded, the cross point status unit (XSU) 50 applies a signal on line "scan data" to gate 59-5 of cell read unit (CRU) 59. It should be recalled that the arrangement of FIG. 5H(2) is replicated for each cross point unit (XPU) 32 managed by cross point status unit (XSU) 50, and accordingly that there is a separate line "scan data" for each such cross point unit (XPU) 32. The scan signal on line "scan data" is passed through gate 59-5 if so allowed by a corresponding register in the set of scanblock register 59-6. The gated scan signal is then applied in parallel to a corresponding one of the snapshot register 59-4 and to select unit 59-3.

Select unit 59-3, noting the particular cross point unit (XPU) 32 to which the gated scan signal pertains, sends appropriate signals so that the service cell can be fetched from that cross point unit (XPU) 32. In particular, select unit 59-3 applies a signal on line "buffer enable" of read bus 44; sends a signal on line "read control" so that read address counter 59-1 can determine which particular cross point unit (XPU) 32 should be addressed in view of the particular scan data line utilized; and sends a buffer select signal on a line "priority" of read bus 44 so that a selected one of the buffers $CBQ_0$ and $CBQ_1$ at the addressed cross point unit (XPU) 32 is properly designated. Furthermore, select unit 59-3 sends a signal on line "service cell" to cell generator unit (CGU) 58 [see FIG. 5G] to indicate that a service cell is becoming available.

Read address counter 59-1 uses the signal on line "read control" to determine an address of the cross point unit (XPU) 32 corresponding to the gated scan signal received at select unit 59-3. The address is applied on line "read address" of read bus 44. At the beginning of the reading, read address counter 59-1 sets a signal on line "start-read" for application to cross point status unit (XSU) 50 [see FIG. 5H(2)].

Bytes of the service cell are acquired by cell read unit (CRU) 59 on line "read data" of read bus 44. As the header of each cell is received and applied to cell size logic unit 59-2, cell size logic unit 59-2 determines the length of the cell (i.e., from field SCS [see FIG. 4A]). Cell size logic unit 59-2 allows read address counter 59-1 to repetitively increment the address applied on line "read address" until all bytes of the cell, as determined by cell size logic unit 59-2, are obtained. Then, cell size logic unit 59-2 causes read address counter 59-1 to issue a signal on line "end-read" for application to cross point status unit (XSU) 50 [see FIG. 5H(2)].

Cell read unit (CRU) 59, upon unload of a cell from a buffer of a cross point unit (XPU) 32, causes the pollstate_status register 50-2 for the unloaded buffer to be reset to a "free" condition. In this regard, one or the other of the signals on line "end-read" or line "start-read", in dependence upon the value of the pollrate register, is utilized to reset the pollstate_status register 50-2 [see FIG. 5H(2)].

Upon addressing by select unit 59-3 in the manner described above, the cell of the selected buffer in the addressed cross point unit (XPU) 32 is transmitted on the "read data" lines of read bus 44 both to cell read unit (CRU) 59 and to cell generator unit (CGU) 58 [see FIG. 5G].

4.8 Cell Generator Unit (CGU)

Cell generator unit (CGU) 58 determines which cell to send to switch port board (SPB) 24 at a next cell interval. The cell sent out by cell generator unit (CGU) 58 is applied via bus p-data-out to system clock unit (SCU) 52 (see FIG. 5B).

As shown in FIG. 5G, cell generator unit (CGU) 58 includes a next cell control unit 58-1, the poll enable register (shown as register 58-2P), the scan enable register (shown as register 58-2S); parity generator 58-3; control cell fill bank 58-4; and PRI-integrity check unit 58-5. Next cell control unit 58-1 determines which type of cell next to send to switch port board (SPB) 24 at a next cell interval, and in order to make the decision receives the signals on the lines sync-cell, service-cell, and OAM cell as well as signals indicative of the content of the poll enable register 58-2P and scan enable register 58-2S. A signal on line sync-cell, output from cell synchronizer unit (CSU) 54 [see FIG. 5B], indicates that a synchronization cell (LSC cell) has been received from switch port board (SPB) 24. A signal on line OAM, received from operation & maintenance unit (OMU) 57 [see FIG. 5E], indicates that a non-synchronization control cell has been received from switch port board (SPB) 24. A signal on line service-cell, received from cell read unit (CRU) 59 [see FIG. 5F], indicates that a service cell has just been fetched and is available on line "read-data" at PRI-integrity check unit 58-5. Cell generator unit (CGU) 58 uses the signals input thereto in order to control a cell transmission procedure described e.g., in section 9.0 and FIG. 10.

In accordance with its cell transmission procedure, next cell control unit 58-1 outputs a signal on line "control-cell-unload" to control cell fill bank 58-4, and on line "read-control" to parity generator 58-3. Control cell fill bank receives a signal on line "OAM-cell data" from target code register 57-2 (see FIG. 5E). PRI-integrity check unit 58-5 receives a service cell from cell read unit (CRU) 59 on line "read-data", performs an integrity check, and passes the service cell to parity and parity generator 58-3 prior to transmittal to cell synchronizer unit (CSU) 54, line interface unit (LIU) 53, and switch port board (SPB) 24.

Basically, cells are sent out from cell generator unit (CGU) 58 in accordance with the following priority rules (in descending priority order):

1. A link state control (LSC) cell if a hunt state appears or a LSC cell prompt occurs. LSC cells are utilized to maintain alignment on the link between SPIC 26 and the corresponding RCU 40, i.e., to discern cell borders. During the hunt state the RCU 40 is unable to find cell structures, and instead sends LSC cells with a code indicating that the RCU 40 is out of synchronization and needs to receive LSC cells until RCU 40 stops sending LSC cells. Alternatively, the SPIC 26 may be out of synchronization and sends a corresponding request to RCU 40, so that RCU 40 issues continuous LSC cells (although not with a code indicating that RCU 40 is out of synchronization).
2. An OAM-cell according to an earlier request or prompted polling schedules, also known as a pending LCC cell prompted by SPIC 26.
3. A service cell/control cell depending on current scan mode schedules
4. An idle cell or OAM cell with unprompted CBR (constant bit rate) poll data.

Cell generator unit (CGU) 58 must be able to put the release of a requested OAM-cell on hold if LSC cell prompt occurs The LSC cell and idle cell are generated in control cell fill bank 58-4 as well as the common part of the OAM-cells.

PRI-integrity check unit 58-5 tests whether the value in the PRI field of the cell matches its own PRI using the Own PRI register as shown in Table 6. Optionally, PRI-integrity check unit 58-5 can also make a parity check. Parity generator 58-3 adds or alters the required parity for all cell types.

4.9 System Clock Unit

The system clock unit (SCU) 52, generally shown in FIG. 5 as comprising row column unit (RCU) 40,is shown in more detail in FIG. 5I. A signal sysclk-in, derived from SCLK (see FIG. 5), exists for each row column unit (RCU) 40 and is applied to system clock unit (SCU) 52. A mux 52-1 selects one of the signals sysclk-in, i.e., from the appropriate row column unit (RCU) 40, to be applied as signal sysclk-out to line interface unit 53 (see FIG. 5A). The selection by mux 52-1 is controlled by system clock register 52-2. System clock register 52-2 can be set by a LCC cell of coded format. If desired, a slew rate register 52-3 can be provided and set so that the transition speed (volts/nano-seconds) from low to high can be controlled on the SCLK-OUT and D-SCSP signals (see FIG. 5A), with four rates being settable.

5.0 Initialization

Figure 7:
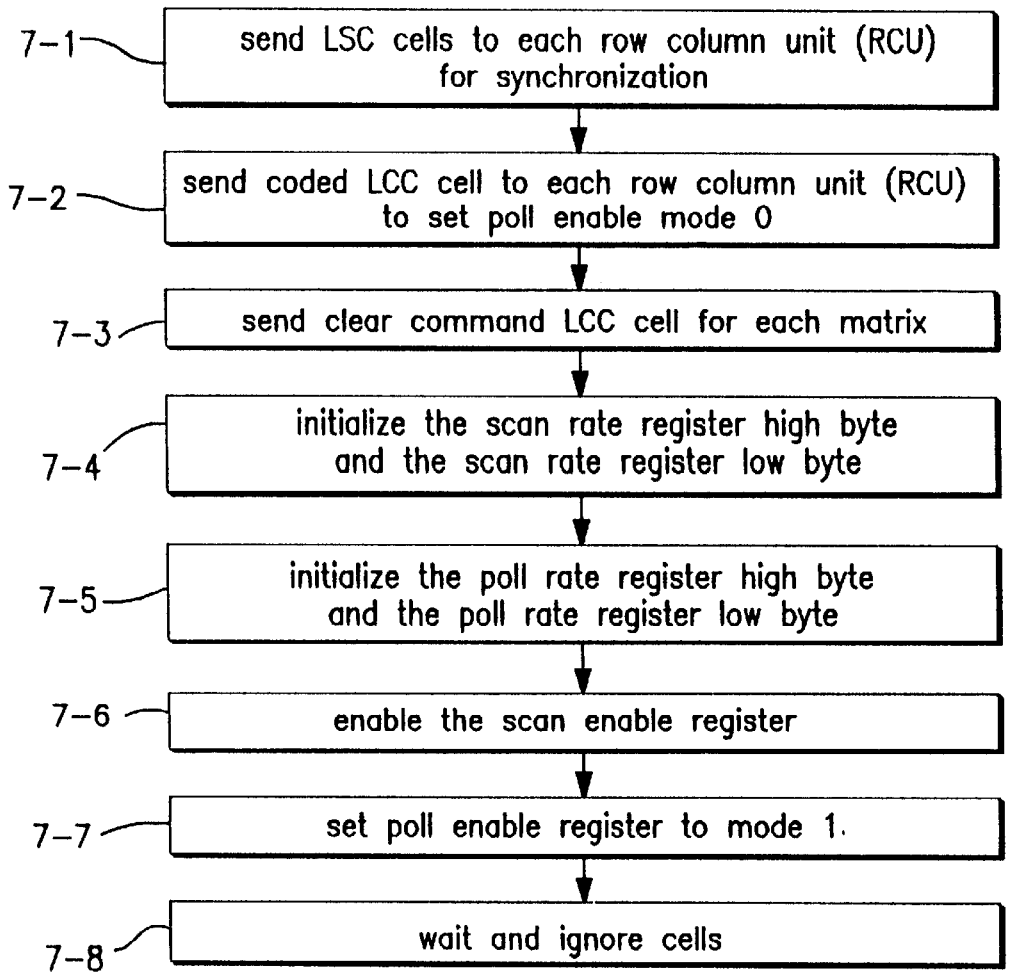
FIG. 7 is a flowchart showing basic steps involved in an initialization procedure for the ATM switching system of FIG. 1.

FIG. 7 is a flowchart showing basic steps involved in an initialization procedure for the ATM switching system of FIG. 1. Upon power up of switching system 20, for synchronization purposes and as depicted by step 7-1 of FIG. 7, it is preferred that each switch port board (SPB) 24 send at least five link state control cells (LSC cells) with coded format to its corresponding row column unit (RCU) 40 [see FIG. 5]. In some instances, such as when switching system 20 is running and loses synchronization for some reason, fewer LSC cells (e.g., three LSC cells) are necessary for resynchronization of switching system 20. The last of the LSC cells transmitted in conjunction with initialization or resynchronization should have a SSC field value of "SYNC" [see FIG. 4B(3)]. Synchronization is discussed in more detail in section 6.0 below.

After synchronization is established, a series of LCC cells of coded format are sent to each row column unit (RCU) 40 from its respective switch port board (SPB) 24. Issuance of each of the coded LCC cells in the series is reflected by steps 7-2 through 7-9 of FIG. 7.

The coded LCC cell issued at step 7-2 is used to set the poll enable register [see Table 6] at zero. The poll enable register is discussed e.g., in section 4.6.2.1. To accomplished initialization of the poll enable register, the fields of the coded LCC cell for step 7-2 are set to the following values [see FIG. 4B(2)]: PRI field=31; ADR field=4; RPC field=0; field CBQ=X; the data field is set to 0 (hexadecimal); the write bit is set to "1" and the read bit is set to "0".

Steps 7-3 through 7-7 are executed with respect to each cross point unit (XPU) 32 for each each row column unit (RCU) 40 in switching system 20. At step 7-3 a clear command LCC cell is sent to each of matrix 0 and matrix 1. This clear command LCC cell resets positions in pollstate register 50-2 and scanstate register 50-4 (see FIG. 5H(2)) which are associated with the XPUs that the RCU 40 owns.

At step 7-4 two coded LCC cells are sent to initialize the scanrate register high byte and the scan rate register low byte [see Table 6]. The scanrate register is discussed e.g., in section 4.6.2.9. The first LCC cell of step 7-4 initializes the scan rate register low byte; the second LCC cell of step 7-4 initializes the scan rate register high byte The scanrate high byte is utilized for the $CBQ_0$ buffer of a cross point unit (XPU) 32 (in matrix 0 of memory array unit (MAU) 30); the scanrate low byte is utilized for the $CBQ_1$ buffer of a cross point unit (XPU) 32 (in matrix 1 of memory array unit (MAU) 30). The bytes are set to indicate an unknown rate (unless the rates are, in fact, known). The fields of the coded LCC cell for the first cell of step 7-4 are set to the following values [see FIG. 4B(2)]: PRI field=31; ADR field=15; RPC field=0; field CBQ=X; the data field is set to 00 (hexadecimal); the write bit is set to "1" and the read bit is set to "0". The fields of the coded LCC cell for the second cell of step 7-6 are set similarly, except that the RPC field=1.

At step 7-5 two coded LCC cells are sent to initialize the poll rate register high byte and the poll rate register low byte

[see Table 6]. The pollrate register is described e.g., in section 4.6.2.8. In similar manner with the scan rate registers, the bytes are set to indicate an unknown rate (unless the rates are, in fact, known). The fields of the coded LCC cell for the first cell of step 7-5 are set to the following values [see FIG. 4B(2)]: PRI field=31; ADR field=14; RPC field=0; field CBQ=X; the data field is set to 00 (hexadecimal); the write bit is set to "1" and the read bit is set to "0". The fields of the coded LCC cell for the second cell of step 7-5 are set similarly, except that the RPC field=1.

At step 7-6 a coded LCC cell is sent to enable the scan enable register [see Table 6]. The scan enable register is described e.g., in section 4.6.2.4. The fields of the coded LCC cell of step 7-6 are set to the following values [see FIG. 4B(2)]: PRI field=31; ADR field=7; RPC field=0; field CBQ=X; the data field is set to FF (hexadecimal); the write bit is set to "1" and the read bit is set to "0".

At step 7-7 a coded LCC cell is sent to set the poll enable register [see Table 6] mode to mode 1. The significance of mode 1 is explained in connection with FIG. 10. The fields of the coded LCC cell of step 7-7 are set to the following values [see FIG. 4B(2)]: PRI field=31; ADR field=4; RPC field=0; field CBQ=X; the data field is set to 01(hexadecimal); the write bit is set to "1" and the read bit is set to "0".

Step 7-8 requires waiting for a time period comparable to the duration of thirty-two maximum length (e.g., 56 byte) service cells. During this wait period, any cells generated are ignored. The wait period of step 7-8 allows any sporadic service cells or control cells to be flushed out of switching system 20. Sporadic service cells may occur if the pollstate registers of other row column units (RCUs) 40 indicate that there is a cell available for reading, which may happen at power up or if other row column units (RCUs) 40 do not have a switch port board (SPB) 24 connected. Such sporadic service cells can be flushed out after the link is synchronized and the poll enable mode is set to mode 1, 2, or 3.

6.0 Synchronization

As shown in FIG. 1, each switch port board (SPB) 24 is connected to switch core 22 a bidirectional link, particularly links 27 and 28. On each side of the link there is a sync-tag detector or cell aligner. For example, in row column unit (RCU) 40 a sync-tag detector 54-3 is provided in cell synchronizer unit (CSU) 54 [see FIG. 5B]. The task of the sync-tag detector is to detect LSC-cells. As shown in FIG. 3, cells of various sizes are transferred between switch port board (SPB) 24 and switch core 22 as a bit stream in each direction. Other than its internal content, no explicit information about the cell start is on links 27, 28. Both sides—switch core 22 and switch port board (SPB) 24—are therefore required to make cell alignment in order to synchronize links 27 and 28. Synchronization is achieved by the insertion of LSC-cells [see FIG. 4B(3)] as required. The LSC-cells transmitted from switch port board (SPB) 24 to switch core 22 are analyzed at sync-tag detector 54-3; LSC cells transmitted from switch core 22 to switch port board (SPB) 24 are analyzed at a corresponding and analogously operated sync tag detector in switch port board (SPB) 24. The sync tag detector does not affect non-LSC cells.

The sync tag detector in switch port board (SPB) 24 and the sync tag detector 54-3 both comprise a state machine which operates in accordance with the state diagram shown in FIG. 8. In order to have rapid fast synchronization and maintain operational status of the links 27, 28, each side of the link—switch core 22 and switch port board (SPB) 24—must be able to advise of its state by using LSC cells. The operation of sync tag detector is hereinafter discussed generically, it being understood that such operation can describe both sync tag detector 54-3 and the sync tag detector in switch port board (SPB) 24.

The incoming LSC-cells, from the opposite side of the link, are compared by the sync tag detector to the predefined pattern for LSC-cells (see FIG. 4B(2) and section 2.2.2.1]. The SSC field indicates whether the sync tag detector which generated the LSC cell is in its PRESYNC state (as indicated by an SSC value of 11) or is in one of its synchronization states, e.g., SYNC0 or SYNC1 (as indicated by an SSC value of "SYNC", i.e., 00). As shown in FIG. 8, sync tag detector stays in a PRESYNC state until three consecutive error-free LSC-cells are received, and then enters one of its two SYNC states (SYNC0 or SYNC1). When both sides of the link—switch port board (SPB) 24 and switch core 22—have reached SYNC1 state, service cells and LCC cells can start to flow between switch port board (SPB) 24 and switch core 22.

Each service cell contains information about its size, particularly in field SCS [see FIG. 4A]. The size information is used to maintain the cell synchronization. Certain cell faults, such as those detected by integrity check unit 55-3 [see FIG. 5C], put the sync tag detector into the PRESYNC state. If an LSC-cell with a PRESYNC value in its SSC field is received during SYNC1 state, the state machine enters state SYNC0. In state SYNC0, LSC-cells with SYNC values in field SSC are sent all the time until any cell (except a LSC cell with a PRESYNC value in field SSC) is received.

The following LSC-cell transitions rules explain operation of the sync state machine of FIG. 8:

TRANSITION RULE 1: In the PRESYNC state, the following actions are taken:
(1) Send LSC-cells with SSC values of PRESYNC, and discard any non-LSC cells which are received.
(2) Go to state SYNC0 state when three consecutive error free LSC cells have been received and the third such LSC cell has a SSC value of PRESYNC.
(3) Go to state SYNC1 state when three consecutive error free LSC cells have been received and he third LSC cell has the state SYNC.

TRANSITION RULE 2: In the SYNC0 state, the following actions are taken:
(1) Allow only LSC-cells with SSC value of SYNC to be sent and discard all non-LSC-cells.
(2) Go to SYNC1 state when an error free cell, except an LSC cell with SSC value of PRESYNC, is received.
(3) Go to PRESYNC state when an error exists in a received cell.

TRANSITION RULE 3: In SYNC1 state, the following actions are taken:
(1) Allow service- and control-cells to be sent.
(2) When leaving the SYNC1 state, switch core 22 completes an ongoing cell transfer;
(3) Go to SYNC0 state when an error-free LSC cell with SSC value of PRESYNC is received;
(4) Go to PRESYNC state when error exists in a received cell.

FIG. 9 shows possible state transitions in sync tag detector 54-3 for an example synchronization and resynchronization scenario. In FIG. 9, the SSC value of an LSC, e.g., the state of the sync tag detector which issued the LSC cell, is indicated in parenthesis. A parenthetical indication of "SYNC" generically refers to synchronization, e.g., either SYNC0 or SYNC1.

If it is assumed first in FIG. 9 that switch core 22 is in PRESYNC state, then switch core 22 receives LSC cells with SSC values of PRESYNC, and LSC cells SSC value PRESYNC are also sent out from switch core 22 to switch port board (SPB) 24. After three consecutive received LSC cells, sync tag detector 54-3 goes into SYNC0 state and sends out an LSC value with an SSC value of SYNC. The switch port board (SPB) 24 goes to SYNC1 state after reception of three LSC cells (see e.g., Transition Rule 1, Action 3). Then, after receipt of an LSC cell with SSC value of SYNC, state SYNC1 is entered and a further LSC cell with SSC value of SYNC is sent out. Now both switch core 22 and switch port board (SPB) 24 are in the SYNC1 state, with the result that service cells can be interchanged over the links 27, 28.

After synchronization is established, should sync tag detector 54-3 in switch core 22 receive a LSC cell with SSC value of PRESYNC, sync tag detector 54-3 reverts to state SYNC0 and replies with a LSC cell having SSC value of SYNC. If consecutive LSC cells with PRESYNC are received at sync tag detector 54-3, sync tag detector 54-3 reverts to state SYNC0 and replies with a consecutive stream of LSC cells.

If a fault is detected in received service cells, switch core 22 goes into PRESYNC state and starts to send LSC cells with SSC values of PRESYNC to switch port board (SPB) 24. These LSC cells will cause switch port board (SPB) 24 to send LSC cells with SSC values of PRESYNC. After three consecutive such LSC cells, sync tag detector 54-3 again goes into state SYNC1 and the service cells can start to flow.

The cell stream shown in FIG. 3 is constantly maintained between the switch port board (SPB) 24 and switch core 22. Continuity is achieved by cell rate decoupling. In the direction from switch core 22 to switch port board (SPB) 24, i.e., on core-to-port link 28, switch core 22 (specifically cell generator unit (CGU) 58 [see FIG. 5G] sends LSC cells (with the SSC field set to the current synchronization state of switch port board (SPB) 24 and switch core 22) when there are no service cells or LCC cells to send on link 28. In the direction from switch port board (SPB) 24 to switch core 22, i.e., on port-to-core link 27, switch port board (SPB) 24 sends LSC cells with the SSC field set to current synchronization state when there are no service cells or LCC cells to send on link 27.

7.0 Cell Reception

After synchronization of the cell stream, service cells and control cells are handled differently, as described below.

7.1 Control Cell Reception

Control cells, both LSC cells and LCC cells, unlike service cells, are terminated in row column unit (RCU) 40. Received LSC cells, used primarily for synchronization purposes in the manner described e.g., in section 6.0, affect row column unit (RCU) 40, and particularly the state machine of sync tag detector 54-3, in the manner described above [see, e.g., FIG. 8 and FIG. 9]. LCC cells, whether coded [see FIG. 4B(1)] or bitmapped [see FIG. 4B(2)], are used to control and operate one row column unit (RCU) 40 in switch core 22 from the switch port board (SPB) 24 connected thereto. In this regard, each switch port board (SPB) 24 controls its own row column unit (RCU) 40.

In controlling the row column unit (RCU) 40, some LCC cells are employed to update control registers inside row column unit (RCU) 40, particularly registers in cross point status unit (XSU) 50 as shown in Table 6. The received LCC cell contains data for this purpose. Up to 16 bits data in a register can be updated by one bitmapped LCC cell [see section 2.2.1.1]. In a coded LCC cell, 8 bits are written to or read from a register in row column unit (RCU) 40. Other LCC cells contain commands to be carried out by row column unit (RCU) 40.

Table 7 shows various fields (PRI, ADR, Write, Read) of a LCC cell received at a row column unit (RCU) 40 and actions taken with respect thereto, including actions taken by row column unit (RCU) 40 including issuance of any responsive LCC cell. As shown in Table 7, in general a LCC cell received at row column unit (RCU) 40 serves the following purposes:

(1) To update registers (see Table 6) inside row column unit (RCU) 40. The received LCC cell includes data and address for the register.

(2) To initiate a read of registers inside row column unit (RCU) 40. The received LCC cell includes register address, and the RCU will respond with a LCC cell which contains the actual data stored in the addressed register.

(3) To update a register inside a row column unit (RCU) 40 and initiate a read of the same register. The received LCC cell includes the address for the register to be updated, as well as the updating data which is to be stored in the addressed register. Upon being updated, the RCU responds with a LCC cell which confirms that the data that has been written into the register.

(4) To load commands into a row column unit (RCU) 40 from the connected switch port board (SPB) 24. The received LCC cell includes the command code.

Successive coded LCC cells for writing into a register of a row column unit (RCU) 40 are allowed. However, only one pending coded LCC cell for reading a register of a row column unit (RCU) 40 is allowed. A write into a register of a row column unit (RCU) 40 using a coded LCC cell is not allowed during a pending read except for a "retrieve_pollstate_command" (see Table 6). The retrieve_pollstate_command can be sent from the switch port board (SPB) 24 at any time and the row column unit (RCU) 40 responds with the pollstate-status (assuming that the RCU is in sync). The provisions of this paragraph apply only for coded LCC cells, not for bitmapped LCC cells. Bitmapped LCC cells do not interfere with coded LCC cells.

As indicated above, Table 7 shows possible LCC cell flows, i.e., a reception of an LCC cell at an row column unit (RCU) 40 and the responded LCC cell issued by the RCU to switch port board (SPB) 24. In Table 7, all cell flows are initiated by the switch port board (SPB) 24 connected to its associated row column unit (RCU) 40, except for the last LCC cell (pollstate) that is initiated by the internal logic in switch core 22 and which occurs when one of the buffers is freed by unload of a cell.

7.2 Service Cells

Service cells are routed through switch core 22 from one port to another port, i.e., from one of the switch port boards (SPB) 24 to another switch port board (SPB) 24. Also copying of the service cell to several or all other ports is possible. Copying of a service cell to several ports is known as "multicast" copying of a service cell to all ports is known as "broadcast". "Multicast" and "broadcast" are discussed elsewhere herein, e.g., in section 8.0 below.

8.0 Cell Buffering

The header of a service cell contains, in the PRI field [see FIG. 4A] the number of the destination port for the cell. For example, if switch port board (SPB) $24_{15}$ is the destination port, then the PRI field of the cell as received at row column unit (RCU) 40 will be "15". However, before the cell is stored in the appropriate one of the cross point units (XPUs) 32 (e.g., cross point unit (XPU) $32_{15}$ in the example just postulated), the PRI value originally stored in the cell as received by row column unit (RCU) 40 is replaced by a value corresponding to the port number of the switch port board (SPB) 24 which issued the service cell. Thus, in the example of a service cell issued from SPB $24_0$ having a PRI value of "15" for directing toward SPB $24_{15}$, the PRI value of the service cell is changed to "0" by row column unit (RCU) 40 prior to transmission to XPU $32_{0,15}$. The PRI changing is accomplished by PRI-swap unit 55-4 of cell analyzer unit (CAU) 55 [see FIG. 5C]. As the PRI value (e.g., port number) replacement occurs in a byte of the service cell which is covered by a parity bit, also a new parity bit FBP has to be determined and substituted into the service cell [see FIG. 4A].

The header of the service cell also contains the two bits CBQ which pinpoint into which one of the two buffers $CBQ_0$ and $CBQ_1$ of the PRI-addressed cross point unit (XPU) 32 the service cell shall be loaded. In addition, the second byte in the header of the service cell contains a traffic type indicator (TTI) [see FIG. 4A].

When the traffic type indicator (TTI) indicates multicast, the cell is copied into several cross point units (XPUs) 32. In particular, the cross point units (XPUs) 32 which are to receive the multicast service cell are defined by a 16 bit register inside row column unit (RCU) 40, particularly the multicast register shown in Table 6 [see section 4.6.2.13]. There is only one multicast register inside each row column unit (RCU) 40. Each bit in the multicast register corresponds to one of the cross point units (XPUs) $32_0$ through $32_{15}$ on the row served by the cell-receiving row column unit (RCU) 40. An active bit in the multicast register indicates that the corresponding XPU 32 of the row is to be loaded with the cell. Thus, the multicast register has to be loaded before the service cell arrives.

When the traffic type indicator (TTI) indicates "broadcast", the service cell is to be applied to all switch port boards (SPBs) 24. The multicast register inside row column unit (RCU) 40 is not used for broadcast.

During multicast, the service cell will be copied to the cross point units (XPUs) 32 which have free buffers (either $CBQ_0$ or $CBQ_1$). If the multicast register requires a load for an XPU 32 with an occupied buffer, then an error will be indicated by cell integrity register 55-3 [see FIG. 5C]. Cross point units (XPUs) 32 with free buffers $CBQ_0$ or $CBQ_1$ will still be loaded. Essentially the same procedure is used during broadcast, i.e., free buffers are loaded independently of other buffers. However, no error indication caused by occupied buffers is provided during broadcast.

9.0 Cell Transmission

On the transmit side of row column unit (RCU) 40, cells from different sources are multiplexed together and outputted by cell generator unit (CGU) 58 [see FIG. 5 and FIG. 5G] to form a continuous cell stream out of switch core 22. The speed of transmission of the cells out of row column unit (RCU) 40 is determined by the same clock that is used for receiving cells, e.g., DCLK. DCLK is delivered by the switch port board (SPB) 24 connected to this port. As shown in FIG. 5A, the signal DCLK is ultimately divided (by divider 54-5 [see FIG. 5B]) to yield signal pclk. Each switch port board (SPB) 24 thus provides its own DCLK signal to its associated RCU 40.

Figure 10A:
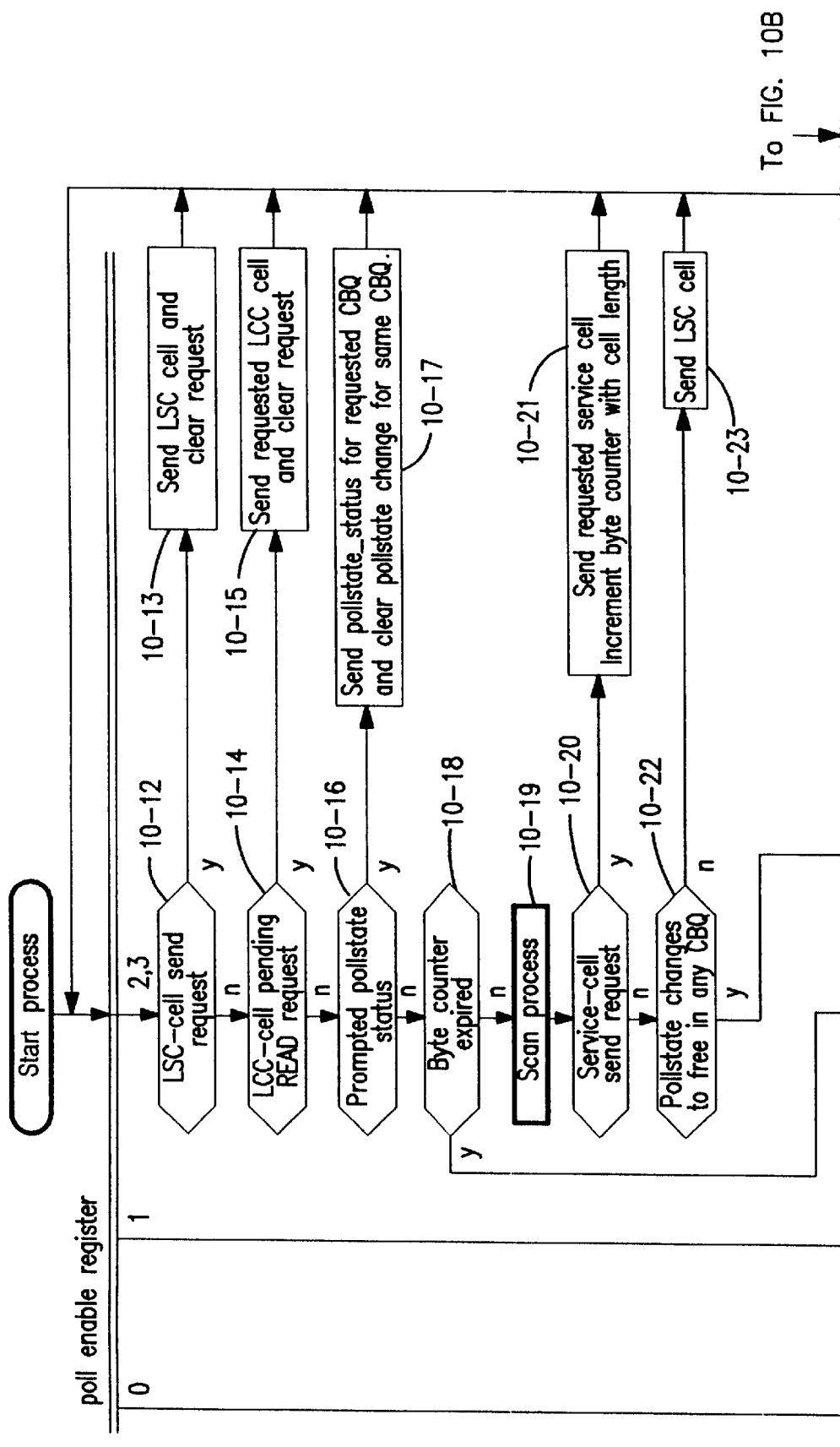
FIG. 10 is a diagrammatic view showing cell transmission in the ATM switching system of FIG. 1.
Figure 10B:
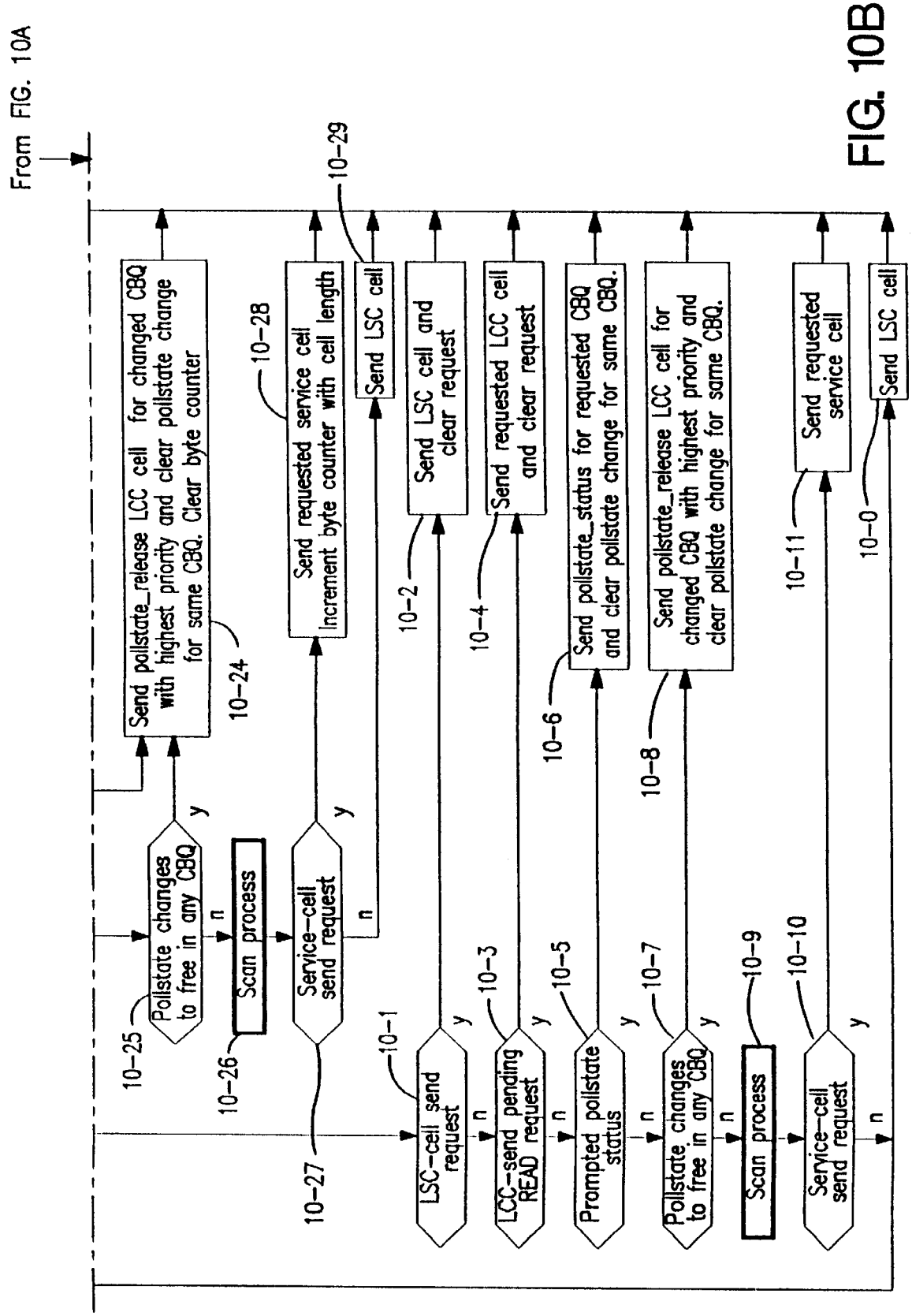

The cells emanating from switch core 22 include both control cells and service cells. Next cell control unit 58-1 [see FIG. 5G] receives requests on lines sync-cell, control-cell, and service-cell when requested to accept the respective cells indicated by the names of the respective lines. Next cell control unit 58-1 sets internal requests for cell output in accordance with the signals recovered on these lines, and processes these requests as indicated in FIG. 10. Once a request for a specified type of cell is satisfied, the request is "cleared".

Before a control cell is sent out from row column unit (RCU) 40 to its associated switch port board (SPB) 24, parity bits are determined and added. The parity bits for a service cell are checked at unload from the cross point unit (XPU) 32 by PRI-integrity check unit 58-5 (see FIG. 5G). Cells with incorrect parity are discarded and an indication is made in the cell integrity register.

The flowchart of FIG. 10 illustrates the cell sending process from switch core 22. Which of the different options or modes (1, 2 and 3) is in effect is determined by the contents of the poll enable register [see Table 6 and section 4.6.2.1].

Modes 2 and 3 of FIG. 10 primarily differ from mode 1 by affording a certain priority to generation of service cells. In particular, modes 2 and 3 employ a particular byte counter employed in (referenced especially at step 10-18) which assures that service cells have priority over pollstate LCC-cells for a certain amount of time. The amount of such "time" can be set to the transmission time of 32 or 64 bytes of service cell in modes 2 and 3, respectively.

FIG. 10 shows each of three modes of cell transmission, including transmission mode 1, transmission mode 2, and transmission mode 3. Transmission mode 0 merely involves sending a LSC cell at step 10-0 for synchronization purposes. Actions performed in the remaining transmission modes are discussed below. While FIG. 10 shows a general scheme of operation, it should be understood that some exceptions are permitted at rare occasion, i.e. power-up, bit error etc.

In connection with FIG. 10, it should be recalled from section 4.6.1.3 that pollstate release LCC-cells indicate cross point units (XPUs) 32 which have released or "free" buffers. Pollstate_release LCC cells are sent whenever there is a change in status of a buffer (either $CBQ_0$ or $CBQ_1$) from occupied to free. If buffers of different priority have changed status, two poll state LCC-cells are sent: the first for queue $CBQ_0$ and the second for queue $CBQ_1$.

In addition, there is an eighth byte service cell counter, i.e., the scan enable register also known as cell size logic 59-2 (see section 4.6.2.4 and FIG. 5F). The signal read data is used to determine cell size and also to control the reading from the crosspoint so that the entire service cell can be read out. In addition, the read data signal is used to decrement the scan enable counter. This scan enable counter is decremented by one as every eighth byte of the service cell is sent. When the value of this eighth byte service cell counter equals zero, the service cell is finished. After that read control inhibits the reading of the next service cell. After the scan enable register has been loaded to a new (non-zero) value, the next service cell in line will be unloaded. In other words, the scan process is started again by writing a value (1–255) to the scan enable register [see Table 6]. When the value of eighth byte service cell counter counter is preset to 255, all decrementation is disabled and the scan process continues all the time.

In FIG. 10, an ongoing cell transmission is always completed before the next cell is sent even if the next cell has a higher priority. Further, only one byte counter is used independent of the CBQ value in the service cell.

9.1 Cell Transmission Mode 1

Cell Transmission Mode 1 follows a priority scheme as to which type of cell is to be transmitted. The cell sending priority, reflected by FIG. 10, is as follows, starting with the highest priority:

(1) If requested to do so upon receipt of a LSC-cell send request on line sync-cell (step 10-1), a LSC cell is sent out according to the link synchronization process (see, e.g., section 6.0), and the LSC-cell send request of next cell control unit 58-1 is cleared (step 10-2).

(2) If requested to do so on line control-cell upon receipt at step 10-3 of a LCC-cell requesting reading from registers (depicted in Table 6) of cross point status unit (XSU) 50, the requested coded LCC cell is sent out and the request is cleared (step 10-4). Step 10-4 is not triggered by pollstate_release LCC cells.

(3) If pollstate status is prompted at step 10-5 by receipt of "retrieve_pollstate_command", at step 10-6 a bit-mapped LCC cell with pollstate status is issued. The contents of the bitmapped LCC-cell are derived from the pollstate_status register [see section 4.6.1.3]. Further, the pollstate change for such buffer is cleared. A pollstate status request for the $CBQ_0$ buffers is given higher priority than a pollstate status request for the $CBQ_1$ buffers.

(4) When it is detected at step 10-7 that there has been a change from "occupied" to "free" in the pollstate register, at step 10-8 a bitmap pollstate_release LCC cell is sent. One pollstate_release register has a bitmap of the buffers in matrix 0 (e.g. the $CBQ_0$ buffers), another pollstate_release register has a bitmap of the buffers in matrix 1 (e.g., the $CBQ_1$ buffers) [see section 4.6.1.3 and Table 5]. At step 10-7, the buffers $CBQ_0$ are given a higher priority than the buffers $CBQ_1$. The bitmap LCC cell released at step 10-7 carries information regarding all buffers of the respective priority ($CBQ_0$ and $CBQ_1$) that have been released since the last "pollstate_release" command.

Step 10-9 of FIG. 10 shows that a scan process or operation is conducted if none of the actions of steps 10-2, 10-4, 10-6, or 10-8 are taken. The scan process is described, e.g., in section 10.0 hereof.

After the scan of step 10-9, a step 10-10 a determination is made whether the four aforementioned priority rules for cell generator unit (CGU) 58 [see section 4.8] require that a service cell be fed from switch core 22. If the determination at step 10-10 is affirmative, at step 10-11 a service cell is sent.

If the determination at step 10-10 is negative, at step 10-0 a LSC cell is sent by cell generator unit (CGU) 58. In other words, if there are no other types of cells waiting to be sent, then LSC cells are transmitted according to the cell rate decoupling process.

9.2 Cell Transmission Mode 2

Cell transmission Mode 2 limits the number of bitmap LCC cells containing pollstate information that can be sent and allows more service cells to be sent instead. If there are service cells to be sent, then a pollstate information cell is only allowed to be sent if a minimum of 32 bytes of service cells have been transmitted since the previous pollstate information cell was sent.

Steps 10-12 through 10-17 performed for mode 2 transmission are analogous to steps 10-1 through 10-6 performed for mode 1. However, at step 10-18, a check is made whether a poll enable counter has expired. The poll enable counter is in cell size a pollstate_release LCC cell from being issued too often if service cells can be delivered consecutively (i.e., back-to-back). For example, if service cells eight bytes long can be delivered back-to-back from a cross point unit (XPU) 32 on a column, the rate of service cell payout would be slowed if pollstate_release LCC cells were interspersed between such service cells. If a mode 32 were set, the pollstate_release LCC cells could not be issued more frequently than every thirty-two bytes of consecutive service cells. This means that there would be at least four eight byte-long service cells before the pollstate_release LCC cell is issued.

The poll enable counter is decremented for each byte of service cells in accordance with a signal from cell size logic unit 59-2. Once the pollstate_release LCC cell is issued, the poll enable counter is reset. The pollenable counter is internal to row column unit (RCU) 40 and is not controlled by switch port integrated circuit (SPIC) 26. The switch port integrated circuit (SPIC) 26 only dictates in which particular mode the cell generation occurs.

Thus, the poll enable counter is incremented by the value of one for every byte of transmitted service cell. The final value of this counter is either 32 or 64 (dependent on whether the value of the poll enable register is 2 or 3, respectively). Unprompted pollstate LCC cells are only sent when this byte counter reaches its final value or if there are no service cells to be sent.

When the poll enable counter for service cells referenced at step 10-18 has expired, e.g. is greater or equal to 32 for mode 2, then the cell sending priority is the same as for mode 1. In particular, applicable ones of steps 10-24 through 10-29 are potentially invoked as shown in FIG. 10. Step 10-28, in which a service cell is sent, also involves incrementing the poll enable counter (referenced at step 10-18) in accordance with the cell length.

If the poll enable counter for service cells referenced at step 10-18 has not expired, a scan process is conducted (step 10-19). Then, at step 10-20, it is determined whether a service cell has been requested (in like manner with step 10-10). If a service cell has been requested, at step 10-21 a service cell is supplied and the byte counter referenced at step 10-18 is incremented in accordance with the cell length. If a service cell has not been requested, at step 10-22 it is determined whether the pollstate of any buffers has changed to a free state. If the determination is negative, an LSC cell is sent (step 10-23). Otherwise, at step 10-24, a pollstate_release LCC cell is sent in similar manner as step 10-8.

9.2 Cell Transmission Mode 3

This mode is the same as mode 2 except that pollstate information cells can only be sent after a minimum of 64 bytes of service cells have been transmitted since the previous pollstate information cell was sent.

10.0 Scanning

Scanning is a process in which switch core 22 determines when cells can be gated out of buffers $CBQ_0$ and $CBQ_1$ of cross point units (XPUs) 32. As described previously, synchronization (LSC) cells are sent from switch core 22 in accordance with FIG. 9 (see section 6.0). LCC cells, on the other hand, are sent from switch core 22 primarily as a response from a LCC cell issued by switch port board (SPB) 24. The interchange of LCC cells is shown in Table 7 and described in sections 7.0 and 9.0.

Switch core 22 also issues LCC pollstate cells which advise switch port board (SPB) 24 of the availability of service cells from the various cross point units (XPUs) 32. One type of pollstate cell also are known as pollstate_release cells in view of the fact that their content is based on the content of a corresponding pollstate_release register (e.g., see pollstate_release register 50-8 in FIG. 6). Pollstate cells thus provide switch port board (SPB) 24 with an indication of whether the buffers on the same row are in a "free" or "occupied" state.

When a buffer (or buffers), e.g., $CBQ_0$ or $CBQ_1$ of any of the sixteen cross point units (XPUs) 32 on the row monitored by the switch port board (SPB) 24, is released (i.e., changed in state from "occupied" to "free") a pollstate_release LCC cell is sent in accordance with the cell transmission scheme depicted and described above with reference to FIG. 10 and section 9.0. A buffer is "free" as soon as there is a possibility to start the load of a new cell into the buffer. The buffer is marked "occupied" when a cell is loaded into the buffer.

Figure 15:
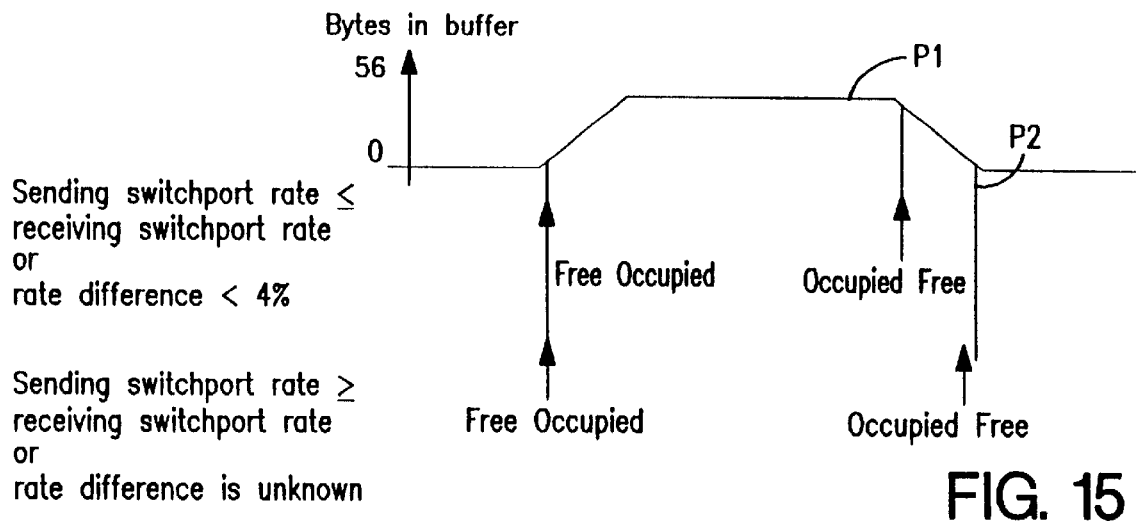
FIG. 15 is a diagrammatic view showing polling options for the timing of sending of an indication of a queue changing from "occupied" to "free" status".

Dependent of the rate difference between the sending and receiving switchport (i.e., switch port boards (SPBs) 24), a "free" indication of the buffer is made in accordance with either of two polling options. These two polling options are illustrated in FIG. 15. The first polling option is that the "free" indication of the buffer be made at the beginning of the unload of the cell from the buffer (see point P1 in FIG. 15). The second polling option is that the "free" indication of the buffer be made at the end of the unload of the cell from the buffer (see point P2 in FIG. 15). Whether the first or second polling option is implemented depends on the value loaded into the pollrate register (see sections 4.6.1.3 and 4.6.2.8). The first polling option is typically implemented when the sending switchport rate is less than or equal to the receiving switchport rate, or the rate difference is less than four percent. The second polling option is typically implemented when the sending switchport rate is greater than or equal to the receiving switchport rate, or the rate difference is unknown.

Each row column unit (RCU) 40 scans the buffers on its assigned column of memory array unit (MAU) 30 (see FIG. 1). Buffers (e.g., $CBQ_0$ and $CBQ_1$ of cross point units (XPUs) 32) with the state "cell_available" are unloaded using service cells that are transmitted out from switch core 22, and the sending buffer is marked "empty".

A "cell_available" is indicated as soon as there is a possibility to start the unload of a cell from the buffer. The buffer is marked empty when the first word of the cell is unloaded from the buffer.

Figure 16:
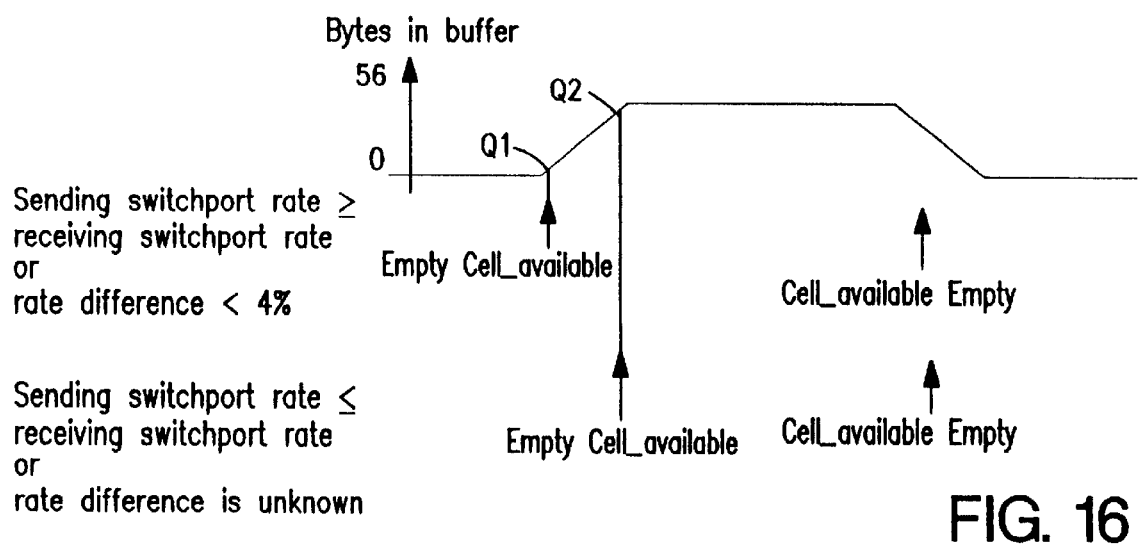
FIG. 16 is a diagrammatic view showing scan options for the timing of sending of an indication of a queue changing from "empty" to "cell_available" status".

Dependent of the rate different between the receiving and sending RCU, "cell-available" indication of the buffer is made in accordance with either of two scan options which are illustrated in FIG. 16. In the first scan option, the "cell-available" indication of the buffer is made at the beginning of the load of the cell as indicated by point Q1 in FIG. 16. In the second scan option, the "cell-available" indication of the buffer is made at the beginning of the load of the cell as indicated by point Q2 in FIG. 16. Whether the first scan option or the second scan option is employed depends on the value loaded into the scanrate register (see sections 4.6.1.3 and 4.6.2.9). As in FIG. 15, the first scan option is typically implemented when the sending switchport rate is less than or equal to the receiving switchport rate, or the rate difference is less than four percent. The second scan option is typically implemented when the sending switchport rate is greater than or equal to the receiving switchport rate, or the rate difference is unknown.

As indicated above (see FIG. 2), there are two matrices of buffer queues (named $CBQ_0$ and $CBQ_1$) on each column in memory array unit (MAU) 30. $CBQ_0$ has higher priority than $CBQ_1$. Together with the buffer queues $CBQ_0$ and $CBQ_1$ there are two snapshot registers, one per queue. The snapshot registers are loaded with actual buffer status. The buffer status is masked by the content of the correspondent scanblock register. The actual bufferstatus is held by the scanstate register (see, e.g., scanstate register 50-4 in FIG. 6). The state "cell_available/empty" for each buffer is copied to the snapshot register. After load of the snapshot register, all bits corresponding to $CBQ_0$ are processed and the bits are cleared at the unload of the buffer. The buffers are processed in sequence, i.e. buffer 0, buffer 1, etc. If all bits corresponding $CBQ_0$ are cleared, the next time the routine is called, a new snapshot of $CBQ_0$ is taken. The same processing as above is done until all bits of this snapshot register are cleared. If all bits of the snapshot register are zero at the new snapshot, $CBQ_1$ is scanned. The scanning of queue $CBQ_1$ follows the same principle.

Figure 17:
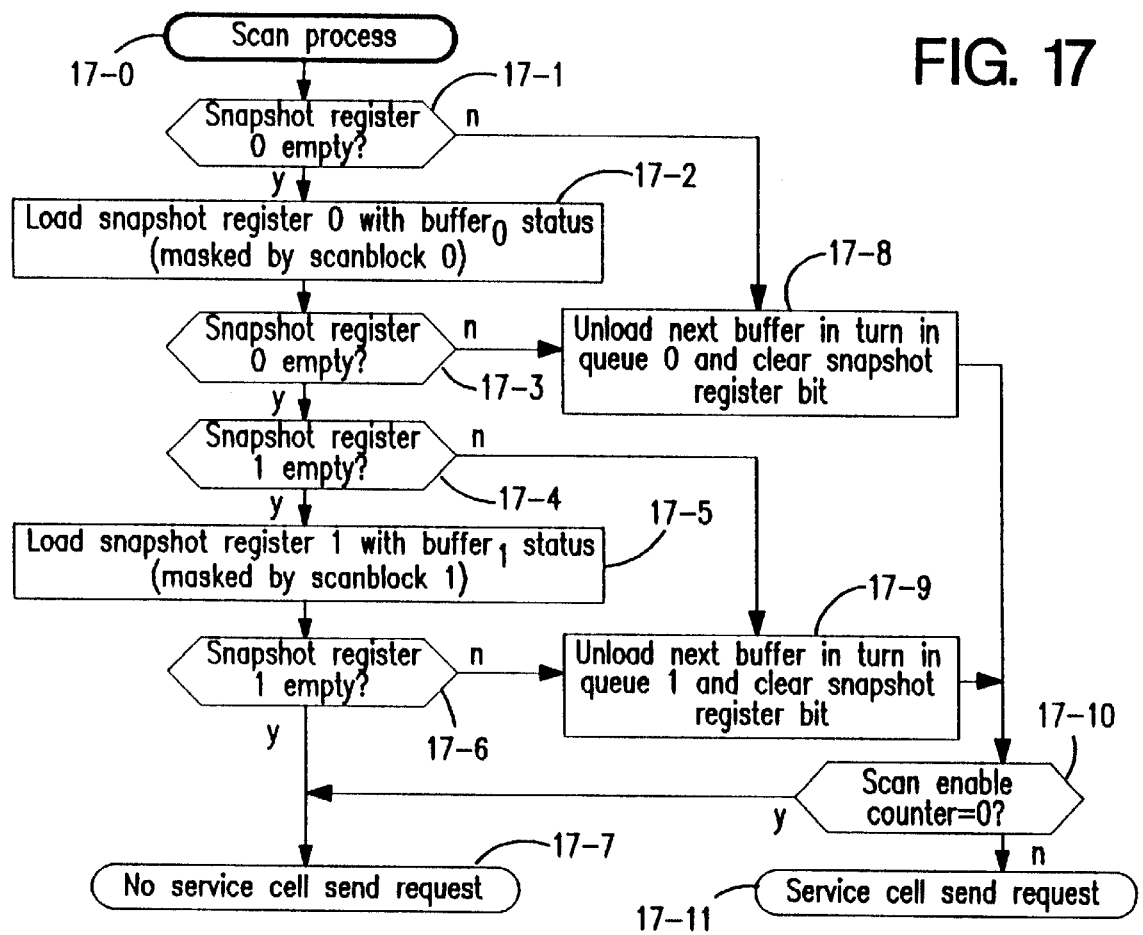
FIG. 17 is a flowchart showing basic steps in a scanning process.

FIG. 17 basically shows the scanning process (indicated by symbol 17-0). At step 17-1, a determination is made whether the snapshot register for queue $CBQ_0$ is empty. If the snapshot register for queue $CBQ_0$ is empty, at step 17-2 the snapshot register for queue $CBQ_0$ is loaded with the status of queue $CBQ_0$ (masked by scanblock 0). Then, at step 17-3, a check is made whether the snapshot register for queue $CBQ_0$ is empty.

If the determination at step 17-3 is affirmative, at step 17-4 a determination is made whether the snapshot register for queue $CBQ_1$ is empty. If the snapshot register for queue $CBQ_1$ is empty, at step 17-5 the snapshot register for queue $CBQ_1$ is loaded with the status of queue $CBQ_1$ (masked by scanblock 1). Then, at step 17-6, a check is made whether the snapshot register for queue $CBQ_1$ is empty. If the snapshot register for queue $CBQ_1$ is empty, a service cell send request is not issued (step 17-7).

If it is determined, at either step 17-1 or step 17-3, that the snapshot register for queue $CBQ_0$ is empty, at step 17-8 the next buffer is unloaded in turn in queue $CBQ_0$ and the snapshot register bit for queue $CBQ_0$ is cleared. Similarly, if it is determined, at either step 17-4 or step 17-6, that the snapshot register for queue $CBQ_1$ is empty, at step 17-9 the next buffer is unloaded in turn in queue $CBQ_1$ and the snapshot register bit for queue $CBQ_1$ is cleared. Then, following either step 17-8 or step 17-9, a check is made at step 17-10 whether the scan enable counter is zero. If the scan enable counter is zero, a service cell send request is not issued (step 17-7). Otherwise, as indicated by step 17-11, a service cell send request is issued.

11. Integrity Check

The integrity checks essentially maintain cell synchronization and preclude corrupted cells from being further processed or forwarded. At the reception of all cells from switch port board (SPB) 24, parity checks are made on the first and second bytes using the FBP and SBP fields [see e.g., Fig. CA and FIG. 4B . Last word parity (LWP) is also checked for the control cells [see FIG. 4B].

For a service cell that is to be buffered in switch core 22, the first byte is manipulated before the cell is stored in the buffer(s) in view of the change in the value of the PRI field that occurs prior to sending the cell to the cross point unit (XPU) 32 [see the discussion of PRI-swap unit 55-4 and FIG. 5C]. As a result of the manipulation, a new FBP is determined and added to the service cell before it is stored in the appropriate one of the cross point units (XPUs) 32. The parities (FBP and SBP) are checked when the cell is unloaded from the buffer of the cross point unit (XPU) 32.

In connection with the transmission of all cells, the parity bit for the second byte (field SBP) is calculated and added, since the second byte is changed by the TTI translation.

Figure 18:
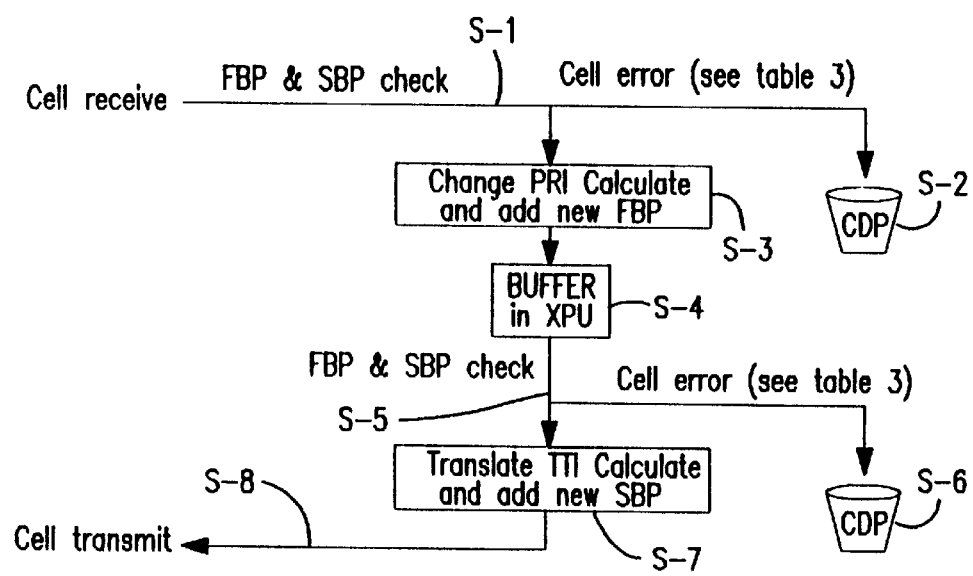
FIG. 18 is a diagrammatic view showing error checking operations for a service cell.

FIG. 18 shows diagrammatically the parity checking on service cells. Upon reception of a service cell from switch port board (SPB) 24, the parity check is performed as indicated at S-1 using the fields FBP and SBP, as described above. If an error is detected in the service cell, a cell discard process (CDP) is invoked (S-2). Step S-3 shows the swap of the PRI performed by cell analyzer unit (CAU) 55 [see FIG. 5C] and the recalculation of a new FBP. Step S-4 reflects storage of the service cell in an appropriate one of the cross point units (XPUs) 32 of memory array unit (MAU) 30. Upon unload of the cell from the cross point unit (XPU) 32, a check is performed using the FBP and SBP bits (as indicated at S-5). If an error is detected, the cell discard process is invoked as shown at S-6. Step S-7 depicts the TTI translation and computation of new SBP, which is followed as indicated at S-8 by transmission of the cell from row column unit (RCU) 40 to the destination switch port board (SPB) 24.

Last word parity (LWP) is also added for the control cells.

Table 8, Table 9, and Table 10 show the possible fault detection checks and actions (CDP Cell Discard Process, AIP=Abort Insert Process and LSP=Link Synchronization Process), that can be made at the receiving and sending sides of switch core 22. In particular, Table 8 shows faults and action for control cells, while Table 9 and Table 10 show faults and actions for service cells. Table 9 is also for the first cell in a concatenated stream, while Table 10 is for the following and last cell in the concatenated stream.

11.1 LSP, Link Synchronization Process

The LSP defines the actions that should be taken when faults indicating loss of cell synchronization occurs. The LSP states following actions: (1) discard ongoing cell from any further processing; (2) force the sync state machine into presync state.

11.2 CDP, Cell Discard Process

The CDP includes handling of both service cells and control cells. At the receiving side the CDP defines that the received cell, service cell or control cell, is discarded from further processing. At the sending side the CDP defines that the service cell unloaded from the crosspoint buffer shall be discarded and an LSC cell are inserted instead. The crosspoint buffer is set to state "free".

For concatenated cells, at the receiving side, when CDP is caused by exceeding buffer size, the whole remaining concatenated cell stream is discarded. If CDP is invoked by other errors, such as changed PRI/TTI/CBQ or non-service cell in the concatenated cell stream, the cell with the error is discarded. Remaining concatenated cells, in the stream, are regarded as a new concatenated cellstream (i.e., this can be loaded into the buffer or discarded dependent on if buffer is available or not).

At the sending side, for concatenated cells CDP defines that the service cell unloaded from the crosspoint buffer shall be discarded and an LSC cell are inserted instead. All following concatenated cells in the buffer are discarded from further processing and the buffer is set to "free" if the load of a "new" cell has not started yet.

11.3 Abort Insert Process

The Abort Insert Process (AIP) defines that an abort signal is inserted in the addressed crosspoint buffer at the defined CBQ instead of the first two bytes of the service cell causing the process to be invoked. The abort signal is 16 bits long and the signal is hex FEIC, starting with the first byte.

11.4 Cell Integrity Register-Indicated Fault

The notation "$CIR_x$" means that the fault is indicated by setting $bit_x$ of Cell Integrity Register. The bit is cleared after a read of the register.

12. Clock Distribution

All ports have two connections for system clock. One input and one output. The source for the output is an input from any other port. Actual source (port number) is programmable and different sources can be set for different ports. The speed of transmission of the cells out of row column unit (RCU) 40 is determined by the same clock that is used for receiving cells. This clock is delivered by the remote unit connected to this port. The incoming system clock on all ports are distributed to all other RCU'S. Inside RCU there is a semi-static switch. The switch is controlled by the system clock register in RCU. The output from the switch is connected to the system clock output of the port.

Figure 19:
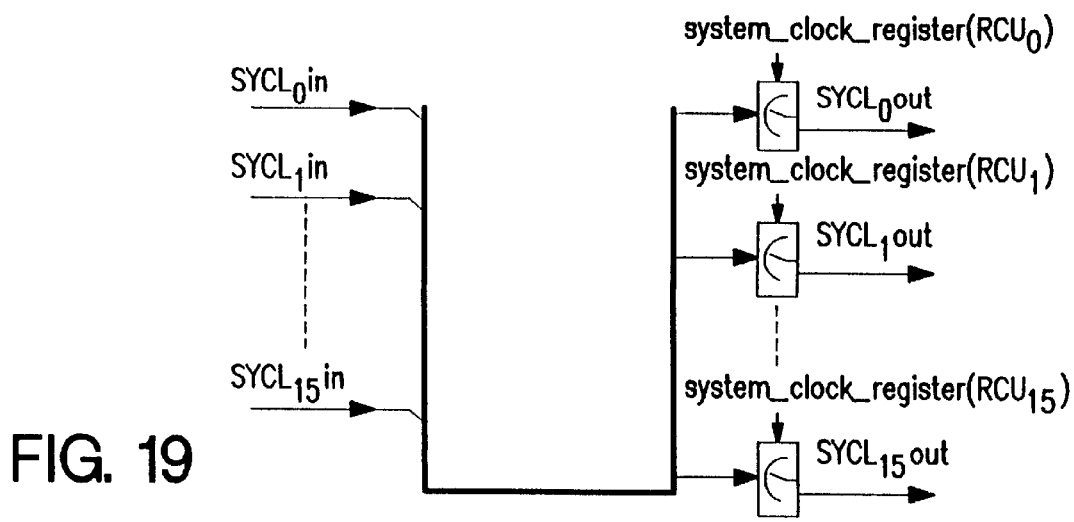
FIG. 19 is a schematic view showing system clock distribution in the ATM switching system of FIG. 1.

See FIG. 19. The system clock output on any port is transparent from the system clock input of any other port.

The present invention can be utilized in conjunction with the ATM systems disclosed in the following simultaneously-filed United States patent applications, all of which are incorporated herein by reference:

U.S. patent application Ser. No. 09/188,102, entitled "ASYNCHRONOUS TRANSFER MODE SYSTEM HANDLING DIFFERING ABA PROTOCOLS".

U.S. patent application Ser. No. 09/188,097, entitled "CENTRALIZED QUEUING FOR ATM NODE".

U.S. patent application Ser. No. 09/188,340, entitled "CELL HANDLING UNIT FOR ATM NODE".

U.S. patent application Ser. No. 09/188,347, entitled "ATM TIME STAMPED QUEUING".

U.S. patent application Ser. No. 09/188,344, entitled "COORDINATED CELL DISCHARGE FROM ATM QUEUE".

U.S. patent application Ser. No. 09/188,096, entitled "COMBINED HEADER PARAMETER TABLE FOR ATM NODE".

U.S. Provisional patent application Ser. No. 09/272,621, entitled "METHOD, ARRANGEMENT, AND APPARATUS FOR TELECOMMUNICATIONS".

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the present invention is not limited by the number of cross point units (XPUs) 32 in switch core 22, or by the number of matrices within switch core 22. Moreover, whereas many aspects of the invention have been illustrated as implemented in hardware components, such aspects can instead be accomplished using software programming techniques.

TABLE 1

Traffic Type Indicator, coding in received service cells

| Received TTI | Cast type | Concatenated |
|---|---|---|
| 0 | Broadcast | NO |
| 1 |  | YES |
| 2 |  | NO |
| 3 | Multicast | YES |
| 4 |  | NO |
| 5 | Unicast | YES |
| 6 |  | NO |
| 7 |  | NO |

TABLE 2

Traffic Type Indicator, coding in transmitted service cells. TTI translation

| Received TTI | All buffers free on this row (for actual CBQ)? | Transmitted TTI |
|---|---|---|
| 0 | NO | 0 |
| 0 | YES | 1 |
| 1 or 2 | Don't care | 2 |
| 3 or 4 | YES | 3 |
| 3 or 4 | NO | 4 |
| 5 or 6 | YES | 5 |

TABLE 2-continued

Traffic Type Indicator, coding in transmitted service cells. TTI translation

| Received TTI | All buffers free on this row (for actual CBQ)? | Transmitted TTI |
|---|---|---|
| 5 or 6 | MP | 6 |
| 7 | Don't care | 7 |

TABLE 3

Cell sizes (total number of bytes)

| SCS | Cell Size |
|---|---|
| 0 | 8 |
| 1 | 16 |
| 2 | 24 |
| 3 | 32 |
| 4 | 40 |
| 5 | 48 |
| 6 | 56 |
| 7 | Reserved |

TABLE 4

Coded LCC cell.

| Name | Usage |
|---|---|
| NU, 1 bit | Not used bits. Equal to zero |
| ADR, 5 bits | The address for the data to be read from and/or written to ASCC. For complete address map, Table 10 |
| Write 1 bit | Towards Core: Set to 1 indicates that the addressed register shall be loaded with data or that the command shall be carried out. From Core: Always set to zero. |
| Read 1 bit | Towards Core: Set to one indicates that the address is valid and a responded LCC-cell with data is required. From Core: Always set to zero |
| Data, 8 bits | The 8 bit data read from Core and/or to be written to Core. |
| Unused, 3 bits | Not used bits. Equal to zero. |
| CBQ, 2 bits cell buffer queue | CBQ indicates to which crosspoint queue data is related to. Valid values are 0 and 1. Cells with other values are discarded. |
| RPC, 2 bits register part code | RPC pinpoints which byte that is targeted. Following codes apply: 0 bit 0–7 (least significant byte) 1 bit 8–15 (most significant byte) 2 not valid value 3 not valid value |

TABLE 5

Registers accessed by bitmap format LCC-cells

| Register | PRI-value | CBQ | Bits Used | Comment |
|---|---|---|---|---|
| Multicast | 30 | X | 16 | Write to by sending bitmap for bitmap format LCC-cell to ASCC. Read back |
| Scanblock | 28 | 0 | 16 | |
| Scanblock | 28 | 1 | 16 | for test purpose by sending coded LCC-cell to ASCC, see |
| Pollstate_status | 25 | 0 | 16 | Pollstate_status LCC cells. |
| Pollstate_status | 25 | 1 | 16 | Bitmap format LCC-cell out from ASCC. Sent, ASCC, as a response on the received "Retrieve pollstate command". |
| Pollstate_release | 26 | 0 | 16 | Pollstate_release LCC cells. Bitmap format LCC-cell out from ASCC. |
| Pollstate_release | 26 | 1 | 16 | Sent a buffer status changes from occupied to free. |

TABLE 6

Registers in RCU

| Register/command | Address CBQ | ADR | RPC | Data bits used | Comment | Write | Read |
|---|---|---|---|---|---|---|---|
| Poll enable | x | 4 | 0 | 2 | Write to and Read from by coded format LCC-cell. | Yes | Yes |
| LCC parity mode | x | 5 | 0 | 1 | Write to and Read from by coded format LCC-cell. | Yes | Yes |
| Cell integrity | x | 6 | 0 | 3 | Read from b coded format LCC-cell. | No | Yes |
| Scan enable | x | 7 | 0 | 8 | Write to by coded format LCC-cell. | Yes | No |
| System clock | x | 10 | 0 | 4 | Write to and Read from by coded format LCC-cell. | Yes | Yes |
| Own PRI | x | 11 | 0 | 4 | Read from by coded format LCC-cell. | No | Yes |
| Article. Nr. & rev. | x | 12 | 0 | 8 | Read from by coded format LCC-cell. | No | Yes |
| Pollrate, low byte | x | 14 | 0 | 8 | Write to and Read from by coded format LCC-cell. | Yes | Yes |
| Pollrate, high byte | x | 14 | 1 | 8 | Write to and Read from by coded format LCC-cell. | Yes | Yes |

TABLE 6-continued

Registers in RCU

| Register/command | CBQ | Address ADR | RPC | Data bits used | Comment | Write | Read |
|---|---|---|---|---|---|---|---|
| Scanrate, low byte | x | 15 | 0 | 8 | Write to and Read from by coded format LCC-cell. | Yes | Yes |
| Scanrate, high byte | x | 15 | 1 | 8 | Write to and Read from by coded format LCC-cell. | Yes | Yes |
| Clear command.Matrix 0 | 0 | 24 | x | 5 | Active command by coded format LCC-cell with write active. | Yes | No |
| Clear comniand.Matrix 1 | 1 | 24 | x | 4 | Active command by coded format LCC-cell with write active. | Yes | No |
| Retrieve_pollstate command.Matrix 0 | 0 | 25 | x | 0 | Active command by coded format LCC-cell with write active. | Yes | No |
| Retrieve_pollstate command.Matrix 1 | 1 | 25 | x | 0 | Active command by coded format LCC-cell with write active. | Yes | No |
| Scanblock, low byte.Matrix 0 | 0 | 28 | 0 | 8 | Read by coded format LCC-cell. Write to by bitmap format LCC-cell. | No | Yes |
| Scanblock, high byte.Matrix 0 | 0 | 28 | 1 | 8 | Read by coded format LCC-cell. Write to by bitmap format LCC-cell. | No | Yes |
| Scanblock, low byte.Matrix 1 | 1 | 28 | 0 | 8 | Read by coded format LCC-cell. Write to by bitmap format LCC-cell. | No | Yes |
| Scanblock, high byte.Matrix 1 | 1 | 28 | 1 | 8 | Read by coded format LCC-cell. Write to by bitmap format LCC-cell. | No | Yes |
| Multicast, low byte | x | 30 | 0 | 8 | Read by coded format LCC-cell. Write to by bitmap format LCC-cell. | No | Yes |
| Multicast, high byte | x | 30 | 1 | 8 | Read by coded format LCC-cell. Write to by bitmap format LCC-cell. | No | Yes |

TABLE 7

Control cell interactions

| Received LCC cell | | | | Responded LCC cell | | | | |
|---|---|---|---|---|---|---|---|---|
| PRI | ADR | Write | Read | PRI | ADR | Write | Read | Comment |
| 28, 30 | na | na | na | No responding cell | | | | Write to a register (multicast and scanblock). Bitmap LCC cell. |
| 31 | 4,5,6,10,14,15,24 | 1 | 0 | No responding cell | | | | Write to a register. Coded LCC cell. |
| 31 | 4,5,6,10,11,12,14,15 | 0 | 1 | 31 | 4,5,6,10,11,12,14,15 | 0 | 0 | Read from a register. Coded LCC cell. Note: ADR in the responded LCC cell is the same as ADR in the received LCC cell. |
| 31 | 4,5,10,14,15 | 1 | 1 | 31 | 4,5,10,14,15 | 0 | 0 | Write and read a register. Coded LCC cell. Note: ADR in the responded LCC cell is the same as ADR in the received LCC cell. |
| 31 | 28,30 | 0 | 1 | 31 | 28,30 | 0 | 0 | Read a register (multicast and scanblock). Coded LCC cell. Note: ADR in the responded LCC cell is the same as ADR in the received LCC cell. |
| 31 | 25 | 1 | 0 | 25 | na | na | na | Write to "retrieve_pollstate_command": a coded LCC cell sent to core will result in a bitmap LCC cell from core. The bitmap LCC cell contains the actual pollstate status. |
| No prompting cell | | | | 26 | na | na | na | Pollstate_Release: a change in state from occupied to free of buffers(s) in core will result in a bitmap LCC cell. The cell carries information on all buffers that are released since last "Pollstate_Release". |

TABLE 8

Checks and actions on control cells

| fault detection check slogan | action receiving entity | action sending entity |
|---|---|---|
| FBP, SBP or LWP fault | LSP, $CIR_0$ | |
| Unsupported PRI (bitmap LCC cells) | CDP, $CIR_1$ | |
| Unsupported CBQ (bitmap and coded LCC cells) | CDP | |
| Unsupported ADR (coded LCC cells) | CDP | |
| Unsupported RPC (coded LCC cells) | CDP | |

TABLE 9

Checks and Actions on service cells (also first cell in a concatenated stream)

| fault detection check slogan | action receiving entity | action sending entity |
|---|---|---|
| FBP or SBP fault | LSP, $CIR_0$ | CDP, $CIR_3$ |
| Unsupported PRI | CDP, $CIR_1$ | None |
| Unsupported CBQ | CDP | None |
| Unsupported SCS | LSP, $CIR_1$ | CDP, $CIR_1$ |
| Attempt to write over cell in crosspoint buffer. | CDP, $CIR_1$ | |
| Single- and multicast. Note 1 Attempt to write over cell in | | None |

TABLE 9-continued

Checks and Actions on service cells (also first cell in a concatenated stream)

| fault detection check slogan | action receiving entity | action sending entity |
|---|---|---|
| crosspoint buffer. Broadcast. Note 1 | | |
| Exceeded accumulated maximum cell size (includes also first cell in a concatenated stream if the crosspoint buffer size cannot hold succeeding cell). Note 2. | AIP + CDP, $CIR_1$ | CDP, $CIR_1$ |
| Unload of abort signal from buffer in XPU. | | CDP |

TABLE 10

Checks and actions on succeeding concatenated cells and last cell in a concatenated stream

| Fault detection check (faults discovered in a succeeding concatenated marked cell after first cell is processed, for first cell see table above). Slogan: | action receiving entity | action receiving entity |
|---|---|---|
| FBP, SBP fault | LSP, AIP, $CIR_0$ | CDP, $CIR_3$ |
| LCC-cell or LSC-cell following instead | AIP + CDP, $CIR_1$ | No action. |
| Changed PRI with respect to preceding cell | | Only actions on the first cell in a concentrated stream according to the table above. |
| Changed PRI value with respect to preceding cell. Note 1 | | |
| Changed CBQ-value with respect to preceding cell | | |
| Unsupported SCS | LSP, $CIR_1$ | CDP, $CIR_1$ |
| Exceeded accumulated maximum cell size | AIP + CDP, $CIR_1$ | CDP, $CIR_1$ |
| Unload of abort signal from crosspoint buffer | | CDP |

What is claimed is:

1. An asynchronous transfer mode (ATM) switch comprising:
a switch core;
plural switch ports, each switch port connected to the switch core by a corresponding bidirectional link;
wherein cells carried on the bidirectional link include service cells and control cells;
wherein the control cells include non-service information which is either (1) transmitted from the switch port to the switch core for storage in a control register of the switch core; or (2) obtained from the control register of the switch core for transmission to the switch port; and
wherein at least some of the control cells include both an address of the control register of the switch core and non-service data to be stored in the control register of the switch core.

2. The ATM switch of claim 1, wherein at least some of the control cells include an indication whether non-service data included in the control cells is to be written to the control register of the switch core or read from the control register of the switch core.

3. An asynchronous transfer mode (ATM) switch comprising:
a switch core;
plural switch ports, each switch port connected to the switch core by a corresponding bidirectional link;
wherein cells carried on the bidirectional link include service cells and control cells;
wherein the control cells include non-service information which is either (1) transmitted from the switch port to the switch core for storage in a control register of the switch core; or (2) obtained from the control register of the switch core for transmission to the switch port; and
wherein the switch core comprises a plurality of control registers, and wherein the control cells include an address field having a value corresponding to an addressed one of the plurality of control registers of the switch core.

4. The ATM switch of claims 1 or 3, wherein the switch core has plural cross point units, and wherein the control register in the switch core has bit positions corresponding to predetermined cross point units of the switch core.

5. An asynchronous transfer mode (ATM) switch comprising:
a switch core;
plural switch ports, each switch port connected to the switch core by a corresponding bidirectional link;
wherein cells carried on the bidirectional link include service cells and control cells;
wherein the control cells include non-service information which is either (1) transmitted from the switch port to the switch core for storage in a control register of the switch core; or (2) obtained from the control register of the switch core for transmission to the switch port; and
wherein the switch core comprises two matrices of cross point units, and wherein the switch core has a first control register for containing information for the cross point units of the first matrix and a second control register for containing information for the cross point units of the second matrix, and wherein the control cells include an indication of whether the non-service information pertains to the first control register or the second control register.

6. The ATM switch of claims 1, 3, or 5, wherein the control cells are of at least a first control cell type and a second control cell type, control cells of the first control cell type having a differing format than control cells of the second control cell type.

7. The ATM switch of claim 6, wherein control cells of the first control cell type and control cells of the second control cell type have a same predetermined control cell size.

8. The ATM switch of claim 7, wherein the predetermined control cell size is four bytes.

9. The ATM switch of claim 6, wherein control cells of the first control cell type include information for synchronizing operation of the switch port and the switch core.

10. The ATM switch of claim 9, wherein the control cells of the first control cell type have a control cell first format, the control cell first format including a field which indicates one of a plurality of synchronization states of one of the switch core and the switch port.

11. An asynchronous transfer mode (ATM) switch comprising:
   a switch core;
   plural switch ports, each switch port connected to the switch core by a corresponding bidirectional link;
   wherein cells carried on the bidirectional link include service cells and control cells, the service cells and the control cells having a commonly formatted field, wherein a cell is indicated as being a service cell when any of a first set of pre-established values are stored in the commonly formatted field, and wherein a cell is indicated as being a control cell when any of a second set of pre-established values are stored in the commonly formatted field; and,
   wherein the first set of pre-established values indicative of the service cell has a predefined relationship with a numbering scheme of the plural switch ports.

12. An asynchronous transfer mode (ATM) switch comprising:
   a switch core;
   plural switch ports, each switch port connected to the switch core by a corresponding bidirectional link;
   wherein cells carried on the bidirectional link include service cells and control cells, the service cells and the control cells having a commonly formatted field, wherein a cell is indicated as being a service cell when any of a first set of pre-established values are stored in the commonly formatted field, and wherein a cell is indicated as being a control cell when any of a second set of pre-established values are stored in the commonly formatted field; and,
   wherein the switch core has a plurality of control registers, and wherein at least some of the second set of pre-established values indicative of the control cell have a predefined relationship with a numbering scheme of at least some of the plurality of control registers.

13. An asynchronous transfer mode (ATM) switch comprising:
   a switch core;
   plural switch ports, each switch port connected to the switch core by a corresponding bidirectional link;
   wherein cells carried on the bidirectional link include service cells and control cells, wherein at least some of the control cells include non-service information which is either (1) transmitted from the switch port to the switch core for storage in a control register of the switch core; or (2) obtained from the control register of the switch core for transmission to the switch port; and
   wherein at least some of the control cells include both an address of the control register of the switch core and non-service data to be stored in the control register of the switch core.

14. An asynchronous transfer mode (ATM) switch comprising:
   a switch core;
   plural switch ports, each switch port connected to the switch core by a corresponding bidirectional link;
   wherein cells carried on the bidirectional link include service cells and control cells, wherein at least some of the control cells include non-service information which is either (1) transmitted from the switch port to the switch core for storage in a control register of the switch core; or (2) obtained from the control register of the switch core for transmission to the switch port; and
   wherein the switch core comprises a plurality of control registers, and wherein the control cells include an address field having a value corresponding to an addressed one of the plurality of control registers of the switch core.

15. An asynchronous transfer mode (ATM) switch comprising:
   a switch core;
   plural switch ports, each switch port connected to the switch core by a corresponding bidirectional link;
   wherein cells carried on the bidirectional link include service cells and control cells, wherein at least some of the control cells include non-service information which is either (1) transmitted from the switch port to the switch core for storage in a control register of the switch core; or (2) obtained from the control register of the switch core for transmission to the switch port; and
   wherein the switch core has plural cross point units, and wherein the control register in the switch core has bit positions corresponding to predetermined cross point units of the switch core.

16. A method of operating an ATM switch, the ATM switch having plural switch ports each of which is connected to a switch core by a corresponding bidirectional link, the method comprising:
   transmitting on the bidirectional link both service cells and control cells;
   including in the control cells non-service information which is either (1) transmitted from the switch port to the switch core for storage in a control register of the switch core; or (2) obtained from the control register of the switch core for transmission to the switch port; and
   wherein at least some of the control cells include both an address of the control register of the switch core and non-service data to be stored in the control register of the switch core.

17. A method of operating an ATM switch, the ATM switch having plural switch ports each of which is connected to a switch core by a corresponding bidirectional link, the method comprising:
   transmitting on the bidirectional link both service cells and control cells;
   including in the control cells non-service information which is either (1) transmitted from the switch port to the switch core for storage in a control register of the switch core; or (2) obtained from the control register of the switch core for transmission to the switch port; and
   wherein the switch core comprises a plurality of control registers, and wherein the control cells include an address field having a value corresponding to an addressed one of the plurality of control registers of the switch core.

18. A method of operating an ATM switch, the ATM switch having plural switch ports each of which is connected to a switch core by a corresponding bidirectional link, the method comprising:
   transmitting on the bidirectional link both service cells and control cells;
   including in the control cells non-service information which is either (1) transmitted from the switch port to the switch core for storage in a control register of the switch core; or (2) obtained from the control register of the switch core for transmission to the switch port; and wherein the switch core comprises two matrices of cross point units, and wherein the switch core has a first control register for containing information for the cross point units of the first matrix and a second control register for containing information for the cross point units of the second matrix, and wherein the control cells of the second control cell type include an indication of whether the non-service information pertains to the first control register or the second control register.

19. A method of operating an ATM switch, the ATM switch having plural switch ports each of which is connected to a switch core by a corresponding bidirectional link, the method comprising:

transmitting on the bidirectional link both service cells and control cells;

including in the control cells non-service information which is either (1) transmitted from the switch port to the switch core for storage in a control register of the switch core; or (2) obtained from the control register of the switch core for transmission to the switch port; and wherein the switch core has plural cross point units, and wherein the control register in the switch core has bit positions corresponding to predetermined cross point units of the switch core.

20. The method of claims 16, 17, 18, or 19, wherein the service cells and the control cells have a commonly formatted field, and wherein a cell is indicated as being a service cell when any of a first set of pre-established values are stored in the commonly formatted field, and wherein a cell is indicated as being a control cell when any of a second set of pre-established values are stored in the commonly formatted field.

21. A method of operating an ATM switch, the ATM switch having plural switch ports each of which is connected to a switch core by a corresponding bidirectional link, the method comprising:

transmitting on the bidirectional link both service cells and control cells;

including in the service cells and the control cells a commonly formatted field, wherein a cell being indicated as being a service cell when any of a first set of pre-established values are stored in the commonly formatted field, a cell being indicated as being a control cell when any of a second set of pre-established values are stored in the commonly formatted field;

wherein the first set of pre-established values indicative of the service cell has a predefined relationship with a numbering scheme of the plural switch ports.

22. The method of claim 21, wherein the switch core has a plurality of control registers, and wherein at least some of the second set of pre-established values indicative of the control cell have a predetermined relationship with a numbering scheme of at least some of the plurality of control registers.

23. A method of operating an ATM switch, the ATM switch having plural switch ports each of which is connected to a switch core by a corresponding bidirectional link, the method comprising:

transmitting on the bidirectional link both service cells and control cells;

including a commonly formatted field in each of the service cells and the control cells;

storing in the commonly formatted field any of a first set of pre-established values for a service cell; and storing in the commonly formatted field any of a second set of pre-established values for a control cell;

wherein the first set of pre-established values indicative of the service cell has a predefined relationship with a numbering scheme of the plural switch ports.

24. A method of operating an ATM switch, the ATM switch having plural switch ports each of which is connected to a switch core by a corresponding bidirectional link, the method comprising:

transmitting on the bidirectional link both service cells and control cells;

including a commonly formatted field in each of the service cells and the control cells;

storing in the commonly formatted field any of a first set of pre-established values for a service cell; and storing in the commonly formatted field any of a second set of pre-established values for a control cell;

wherein the switch core has a plurality of control registers, and wherein at least some of the second set of pre-established values indicative of the control cell have a predefined relationship with a numbering scheme of at least some of the plurality of control registers.

25. A method of operating an ATM switch, the ATM switch having plural switch ports each of which is connected to a switch core by a corresponding bidirectional link, the method comprising:

transmitting both service cells and control cells on the bidirectional link;

including, in at least some of the control cells, non-service information;

storing the non-service information in a control register of the switch core;

including in at least some of the control cells both an address of the control register of the switch core and non-service data to be stored in the control register of the switch core.

26. A method of operating an ATM switch, the ATM switch having plural switch ports each of which is connected to a switch core by a corresponding bidirectional link, the method comprising:

transmitting both service cells and control cells on the bidirectional link;

including, in at least some of the control cells, non-service information;

storing the non-service information in a control register of the switch core;

wherein the switch core has plural cross point units, and wherein the control register in the switch core has bit positions corresponding to predetermined cross point units of the switch core.

\* \* \* \* \*